United States Patent
Menéndez Buján et al.

(10) Patent No.: US 12,522,666 B2
(45) Date of Patent: Jan. 13, 2026

(54) CD22 TARGETING-MOIETY FOR THE TREATMENT OF B-CELL ACUTE LYMPHOBLASTIC LEUKEMIA (B-ALL)

(71) Applicants: FUNDACIÓ INSTITUT DE RECERCA CONTRA LA LEUCÈMIA JOSEP CARRERAS, Badalona (ES); INSTITUCIÓ CATALANA DE RECERCA I ESTUDIS AVANÇATS (ICREA), Barcelona (ES); UNIVERSITAT DE BARCELONA, Barcelona (ES); FUNDACIÓ INSTITUT D'INVESTIGACIÓ EN CIÈNCIES DE LA SALUT GERMANS TRIAS I PUJOL (IGTP), Badalona (ES); ONECHAIN IMMUNOTHERAPEUTICS, S.L, Barcelona (ES)

(72) Inventors: Pablo Menéndez Buján, Barcelona (ES); Talía Velasco Hernández, Barcelona (ES); Samanta Romina Zanetti, Barcelona (ES); Pablo Engel Rocamora, Barcelona (ES); Diego Sánchez Martínez, Barcelona (ES); Francisco Gutierrez Agüera, Barcelona (ES); Adrián Fernández Martín, Barcelona (ES); Victor Manuel Díaz Cortés, Barcelona (ES)

(73) Assignees: FUNDACIÓ INSTITUT DE RECERCA CONTRA LA LEUCÈMIA JOSEP CARRERAS, Badalona (ES); INSTITUCIÓ CATALANA DE RECERCA I ESTUDIS AVANÇATS (ICREA), Barcelona (ES); UNIVERSITAT DE BARCELONA, Barcelona (ES); FUNDACIÓ INSTITUT D'INVESTIGACIÓ EN CIÈNCIES DE LA SALUT GERMANS TRIAS I PUJOL (IGTP), Badalona (ES); ONECHAIN IMMUNOTHERAPEUTICS, S.L, Barcelona (ES)

( * ) Notice: Subject to any disclaimer, the term of this patent is extended or adjusted under 35 U.S.C. 154(b) by 575 days.

(21) Appl. No.: 17/910,564

(22) PCT Filed: Mar. 11, 2021

(86) PCT No.: PCT/EP2021/056262
§ 371 (c)(1),
(2) Date: Sep. 9, 2022

(87) PCT Pub. No.: WO2021/180890
PCT Pub. Date: Sep. 16, 2021

(65) Prior Publication Data
US 2023/0139885 A1    May 4, 2023

(30) Foreign Application Priority Data
Mar. 11, 2020    (EP) ..................... 20382175

(51) Int. Cl.
*C07K 16/28*    (2006.01)
*A61K 40/11*    (2025.01)
(Continued)

(52) U.S. Cl.
CPC .......... *C07K 16/2896* (2013.01); *A61K 40/11* (2025.01); *A61K 40/31* (2025.01);
(Continued)

(58) Field of Classification Search
CPC .. C07K 16/2896; A61P 35/00; A61K 40/4214
(Continued)

(56) References Cited

FOREIGN PATENT DOCUMENTS

| WO | 2016102965 A1 | 6/2016 |
|---|---|---|
| WO | 2016164731 A2 | 10/2016 |
| WO | 2017216561 A1 | 12/2017 |

OTHER PUBLICATIONS

Engel et al., "Identification of the Ligand-binding Domains of CD22, a Member of the Immunoglobulin Superfamily that Uniquely Binds a Sialic Acid-dependent Ligand," J. Exp. Med. 181:1581-1586, Apr. 1995. (6 pages).
(Continued)

*Primary Examiner* — Sue X Liu
(74) *Attorney, Agent, or Firm* — Seed Intellectual Property Law Group LLP

(57) ABSTRACT

The present invention provides therapeutics for the treatment of CD22-positive cancers such as B-cell acute lym-
(Continued)

phoblastic leukemia (B-ALL). In particular, the present invention provides an anti-CD22 monoclonal antibody whose scFv as a part of chimeric antigen receptors (CAR) T-cells can target the fcst Ig extracellular domain of the CD22 antigen, the farthest domain from the membrane, for use in the treatment of CD22-positive cancers.

19 Claims, 24 Drawing Sheets
Specification includes a Sequence Listing.

(51) Int. Cl.
    *A61K 40/31*     (2025.01)
    *A61K 40/42*     (2025.01)
    *A61P 35/00*     (2006.01)
    *C12N 5/0783*     (2010.01)

(52) U.S. Cl.
CPC .......... *A61K 40/4212* (2025.01); *A61P 35/00* (2018.01); *C12N 5/0636* (2013.01); *A61K 2239/31* (2023.05); *A61K 2239/38* (2023.05); *A61K 2239/48* (2023.05); *C07K 2317/622* (2013.01); *C07K 2319/02* (2013.01); *C07K 2319/03* (2013.01)

(58) Field of Classification Search
USPC ...................................................... 424/133.1
See application file for complete search history.

(56) References Cited

OTHER PUBLICATIONS

Fry et al., "CD22-CAR T Cells Induce Remissions in CD19-CAR Naïve and Resistant B-ALL," Nat. Med. 24(1):20-28, Jan. 2018. (28 pages).
Haso et al., "Anti-CD22-chimeric antigen receptors targeting B-cell precursor acute lymphoblastic leukemia," Blood 121(7):1165-1174, Dec. 14, 2012. (29 pages).
Long et al., "Lessons learned from a highly-active CD22-specific chimeric antigen receptor," OncoImmunology 2(4):e23621, Apr. 2013. (3 pages).
Pan et al., "CD22 CAR T-cell therapy in refractory or relapsed B acute lymphoblastic leukemia," Leukemia 33:2854-2866, 2019. (13 pages).

Zanetti SR et al. Figure 4

SEQUENCE LISTING

```
<160> NUMBER OF SEQ ID NOS: 39

<210> SEQ ID NO 1
<211> LENGTH: 11
<212> TYPE: PRT
<213> ORGANISM: Artificial Sequence
<220> FEATURE:
<223> OTHER INFORMATION: LCDR1
<220> FEATURE:
<221> NAME/KEY: PEPTIDE
<222> LOCATION: (1)..(11)

<400> SEQUENCE: 1

Gln Ser Leu Leu Asp Ser Asp Gly Lys Thr Tyr
1               5                   10

<210> SEQ ID NO 2

<400> SEQUENCE: 2

000

<210> SEQ ID NO 3
<211> LENGTH: 9
<212> TYPE: PRT
<213> ORGANISM: Artificial Sequence
<220> FEATURE:
<223> OTHER INFORMATION: LCDR3

<400> SEQUENCE: 3

Trp Gln Gly Thr His Phe Pro Trp Thr
1               5

<210> SEQ ID NO 4
<211> LENGTH: 8
<212> TYPE: PRT
<213> ORGANISM: Artificial Sequence
<220> FEATURE:
<223> OTHER INFORMATION: HCDR1
<220> FEATURE:
<221> NAME/KEY: PEPTIDE
<222> LOCATION: (1)..(8)

<400> SEQUENCE: 4

Gly Asp Ser Ile Thr Ser Gly Tyr
1               5

<210> SEQ ID NO 5
<211> LENGTH: 7
<212> TYPE: PRT
<213> ORGANISM: Artificial Sequence
<220> FEATURE:
<223> OTHER INFORMATION: HCDR2
<220> FEATURE:
<221> NAME/KEY: PEPTIDE
<222> LOCATION: (1)..(7)

<400> SEQUENCE: 5

Ile Ser Tyr Ser Gly Ser Thr
1               5

<210> SEQ ID NO 6
<211> LENGTH: 11
<212> TYPE: PRT
<213> ORGANISM: Artificial Sequence
<220> FEATURE:
<223> OTHER INFORMATION: HCDR3
<220> FEATURE:
<221> NAME/KEY: PEPTIDE
```

<222> LOCATION: (1)..(11)

<400> SEQUENCE: 6

Ala Arg Tyr Pro Ser Pro Asp Ala Met Asn Tyr
1               5                   10

<210> SEQ ID NO 7
<211> LENGTH: 114
<212> TYPE: PRT
<213> ORGANISM: Artificial Sequence
<220> FEATURE:
<223> OTHER INFORMATION: VL domain
<220> FEATURE:
<221> NAME/KEY: PEPTIDE
<222> LOCATION: (1)..(114)

<400> SEQUENCE: 7

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
            20                  25                  30

Asp Gly Lys Thr Tyr Leu Asn Trp Leu Leu Gln Arg Pro Gly Gln Ser
        35                  40                  45

Pro Lys Arg Leu Ile Tyr Leu Val Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Glu Asp Leu Gly Val Tyr Tyr Cys Trp Gln Gly
                85                  90                  95

Thr His Phe Pro Trp Thr Phe Gly Gly Gly Thr Lys Leu Glu Ile Lys
            100                 105                 110

Arg Ala

<210> SEQ ID NO 8
<211> LENGTH: 117
<212> TYPE: PRT
<213> ORGANISM: Artificial Sequence
<220> FEATURE:
<223> OTHER INFORMATION: VH domain
<220> FEATURE:
<221> NAME/KEY: PEPTIDE
<222> LOCATION: (1)..(117)

<400> SEQUENCE: 8

Glu Val Gln Leu Gln Glu Ser Gly Pro Ser Leu Val Lys Pro Ser Gln
1               5                   10                  15

Thr Leu Ser Leu Thr Cys Ser Val Thr Gly Asp Ser Ile Thr Ser Gly
            20                  25                  30

Tyr Trp Asn Trp Ile Arg Lys Phe Pro Gly Asn Lys Leu Glu Tyr Met
        35                  40                  45

Gly Tyr Ile Ser Tyr Ser Gly Ser Thr Tyr Tyr Asn Pro Ser Leu Lys
    50                  55                  60

Ser Arg Ile Ser Ile Thr Arg Asp Thr Ser Lys Asn Gln Tyr Tyr Met
65                  70                  75                  80

Gln Leu Lys Ser Val Thr Thr Glu Asp Thr Ala Thr Tyr Tyr Cys Ala
                85                  90                  95

Arg Tyr Pro Ser Pro Asp Ala Met Asn Tyr Trp Gly Gln Gly Thr Ser
            100                 105                 110

Val Thr Val Ser Ser
            115

```
<210> SEQ ID NO 9
<211> LENGTH: 251
<212> TYPE: PRT
<213> ORGANISM: Artificial Sequence
<220> FEATURE:
<223> OTHER INFORMATION: scFv derived from clone hCD22.7
<220> FEATURE:
<221> NAME/KEY: PEPTIDE
<222> LOCATION: (1)..(251)

<400> SEQUENCE: 9
```

Glu Val Gln Leu Gln Glu Ser Gly Pro Ser Leu Val Lys Pro Ser Gln
1               5                   10                  15

Thr Leu Ser Leu Thr Cys Ser Val Thr Gly Asp Ser Ile Thr Ser Gly
            20                  25                  30

Tyr Trp Asn Trp Ile Arg Lys Phe Pro Gly Asn Lys Leu Glu Tyr Met
        35                  40                  45

Gly Tyr Ile Ser Tyr Ser Gly Ser Thr Tyr Tyr Asn Pro Ser Leu Lys
    50                  55                  60

Ser Arg Ile Ser Ile Thr Arg Asp Thr Ser Lys Asn Gln Tyr Tyr Met
65                  70                  75                  80

Gln Leu Lys Ser Val Thr Thr Glu Asp Thr Ala Thr Tyr Tyr Cys Ala
                85                  90                  95

Arg Tyr Pro Ser Pro Asp Ala Met Asn Tyr Trp Gly Gln Gly Thr Ser
            100                 105                 110

Val Thr Val Ser Ser Gly Gly Gly Gly Ser Gly Gly Gly Gly Ser Gly
        115                 120                 125

Gly Gly Gly Ser Gly Gly Gly Ser Asp Val Val Met Thr Gln Thr
    130                 135                 140

Pro Leu Thr Leu Ser Val Thr Ile Gly Gln Pro Ala Ser Ile Ser Cys
145                 150                 155                 160

Lys Ser Ser Gln Ser Leu Leu Asp Ser Asp Gly Lys Thr Tyr Leu Asn
                165                 170                 175

Trp Leu Leu Gln Arg Pro Gly Gln Ser Pro Lys Arg Leu Ile Tyr Leu
            180                 185                 190

Val Ser Lys Leu Asp Ser Gly Val Pro Asp Arg Phe Thr Gly Ser Gly
        195                 200                 205

Ser Gly Thr Asp Phe Thr Leu Lys Ile Ser Arg Val Glu Ala Glu Asp
    210                 215                 220

Leu Gly Val Tyr Tyr Cys Trp Gln Gly Thr His Phe Pro Trp Thr Phe
225                 230                 235                 240

Gly Gly Gly Thr Lys Leu Glu Ile Lys Arg Ala
                245                 250

```
<210> SEQ ID NO 10
<211> LENGTH: 69
<212> TYPE: PRT
<213> ORGANISM: Artificial Sequence
<220> FEATURE:
<223> OTHER INFORMATION: Transmembrane domain derived from CD8
<220> FEATURE:
<221> NAME/KEY: PEPTIDE
<222> LOCATION: (1)..(69)

<400> SEQUENCE: 10
```

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly

```
                    20                  25                  30

Gly Ala Val His Thr Arg Gly Leu Asp Phe Ala Cys Asp Ile Tyr Ile
            35                  40                  45

Trp Ala Pro Leu Ala Gly Thr Cys Gly Val Leu Leu Leu Ser Leu Val
    50                  55                  60

Ile Thr Leu Tyr Cys
65

<210> SEQ ID NO 11
<211> LENGTH: 113
<212> TYPE: PRT
<213> ORGANISM: Artificial Sequence
<220> FEATURE:
<223> OTHER INFORMATION: Intracellular signaling domain derived from CD3
<220> FEATURE:
<221> NAME/KEY: PEPTIDE
<222> LOCATION: (1)..(113)

<400> SEQUENCE: 11

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 12
<211> LENGTH: 42
<212> TYPE: PRT
<213> ORGANISM: Artificial Sequence
<220> FEATURE:
<223> OTHER INFORMATION: Costimulatory signaling domain derived from
      CD137
<220> FEATURE:
<221> NAME/KEY: PEPTIDE
<222> LOCATION: (1)..(42)

<400> SEQUENCE: 12

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
        35                  40

<210> SEQ ID NO 13
<211> LENGTH: 475
<212> TYPE: PRT
<213> ORGANISM: Artificial Sequence
<220> FEATURE:
<223> OTHER INFORMATION: Full sequence of the CAR
<220> FEATURE:
<221> NAME/KEY: PEPTIDE
```

<222> LOCATION: (1)..(475)

<400> SEQUENCE: 13

Glu Val Gln Leu Gln Glu Ser Gly Pro Ser Leu Val Lys Pro Ser Gln
1               5                   10                  15

Thr Leu Ser Leu Thr Cys Ser Val Thr Gly Asp Ser Ile Thr Ser Gly
            20                  25                  30

Tyr Trp Asn Trp Ile Arg Lys Phe Pro Gly Asn Lys Leu Glu Tyr Met
        35                  40                  45

Gly Tyr Ile Ser Tyr Ser Gly Ser Thr Tyr Tyr Asn Pro Ser Leu Lys
50                  55                  60

Ser Arg Ile Ser Ile Thr Arg Asp Thr Ser Lys Asn Gln Tyr Tyr Met
65                  70                  75                  80

Gln Leu Lys Ser Val Thr Thr Glu Asp Thr Ala Thr Tyr Tyr Cys Ala
            85                  90                  95

Arg Tyr Pro Ser Pro Asp Ala Met Asn Tyr Trp Gly Gln Gly Thr Ser
            100                 105                 110

Val Thr Val Ser Ser Gly Gly Gly Gly Ser Gly Gly Gly Gly Ser Gly
            115                 120                 125

Gly Gly Ser Gly Gly Gly Gly Ser Asp Val Val Met Thr Gln Thr
130                 135                 140

Pro Leu Thr Leu Ser Val Thr Ile Gly Gln Pro Ala Ser Ile Ser Cys
145                 150                 155                 160

Lys Ser Ser Gln Ser Leu Leu Asp Ser Asp Gly Lys Thr Tyr Leu Asn
            165                 170                 175

Trp Leu Leu Gln Arg Pro Gly Gln Ser Pro Lys Arg Leu Ile Tyr Leu
            180                 185                 190

Val Ser Lys Leu Asp Ser Gly Val Pro Asp Arg Phe Thr Gly Ser Gly
            195                 200                 205

Ser Gly Thr Asp Phe Thr Leu Lys Ile Ser Arg Val Glu Ala Glu Asp
210                 215                 220

Leu Gly Val Tyr Tyr Cys Trp Gln Gly Thr His Phe Pro Trp Thr Phe
225                 230                 235                 240

Gly Gly Gly Thr Lys Leu Glu Ile Lys Arg Ala Thr Thr Thr Pro Ala
            245                 250                 255

Pro Arg Pro Pro Thr Pro Ala Pro Thr Ile Ala Ser Gln Pro Leu Ser
            260                 265                 270

Leu Arg Pro Glu Ala Cys Arg Pro Ala Ala Gly Gly Ala Val His Thr
            275                 280                 285

Arg Gly Leu Asp Phe Ala Cys Asp Ile Tyr Ile Trp Ala Pro Leu Ala
            290                 295                 300

Gly Thr Cys Gly Val Leu Leu Leu Ser Leu Val Ile Thr Leu Tyr Cys
305                 310                 315                 320

Lys Arg Gly Arg Lys Lys Leu Leu Tyr Ile Phe Lys Gln Pro Phe Met
            325                 330                 335

Arg Pro Val Gln Thr Thr Gln Glu Glu Asp Gly Cys Ser Cys Arg Phe
            340                 345                 350

Pro Glu Glu Glu Glu Gly Gly Cys Glu Leu Arg Val Lys Phe Ser Arg
            355                 360                 365

Ser Ala Asp Ala Pro Ala Tyr Gln Gln Gly Gln Asn Gln Leu Tyr Asn
            370                 375                 380

Glu Leu Asn Leu Gly Arg Arg Glu Glu Tyr Asp Val Leu Asp Lys Arg
385                 390                 395                 400

```
Arg Gly Arg Asp Pro Glu Met Gly Gly Lys Pro Gln Arg Arg Lys Asn
            405                 410                 415

Pro Gln Glu Gly Leu Tyr Asn Glu Leu Gln Lys Asp Lys Met Ala Glu
        420                 425                 430

Ala Tyr Ser Glu Ile Gly Met Lys Gly Glu Arg Arg Arg Gly Lys Gly
    435                 440                 445

His Asp Gly Leu Tyr Gln Gly Leu Ser Thr Ala Thr Lys Asp Thr Tyr
    450                 455                 460

Asp Ala Leu His Met Gln Ala Leu Pro Pro Arg
465                 470                 475

<210> SEQ ID NO 14
<211> LENGTH: 119
<212> TYPE: PRT
<213> ORGANISM: Artificial Sequence
<220> FEATURE:
<223> OTHER INFORMATION: The first Ig extracellular domain of the CD22
      antigen, the farthest domain from the membrane
<220> FEATURE:
<221> NAME/KEY: PEPTIDE
<222> LOCATION: (1)..(119)

<400> SEQUENCE: 14

Asp Ser Ser Lys Trp Val Phe Glu His Pro Glu Thr Leu Tyr Ala Trp
1               5                   10                  15

Glu Gly Ala Cys Val Trp Ile Pro Cys Thr Tyr Arg Ala Leu Asp Gly
            20                  25                  30

Asp Leu Glu Ser Phe Ile Leu Phe His Asn Pro Glu Tyr Asn Lys Asn
        35                  40                  45

Thr Ser Lys Phe Asp Gly Thr Arg Leu Tyr Glu Ser Thr Lys Asp Gly
    50                  55                  60

Lys Val Pro Ser Glu Gln Lys Arg Val Gln Phe Leu Gly Asp Lys Asn
65                  70                  75                  80

Lys Asn Cys Thr Leu Ser Ile His Pro Val His Leu Asn Asp Ser Gly
                85                  90                  95

Gln Leu Gly Leu Arg Met Glu Ser Lys Thr Glu Lys Trp Met Glu Arg
            100                 105                 110

Ile His Leu Asn Val Ser Glu
        115

<210> SEQ ID NO 15
<211> LENGTH: 9
<212> TYPE: PRT
<213> ORGANISM: Artificial Sequence
<220> FEATURE:
<223> OTHER INFORMATION: The epitope from the first Ig extracellular
      domain of the CD22 antigen, the farthest domain from the membrane
<220> FEATURE:
<221> NAME/KEY: PEPTIDE
<222> LOCATION: (1)..(9)

<400> SEQUENCE: 15

Glu Ser Thr Lys Asp Gly Lys Val Pro
1               5

<210> SEQ ID NO 16
<211> LENGTH: 20
<212> TYPE: DNA
<213> ORGANISM: Artificial Sequence
<220> FEATURE:
<223> OTHER INFORMATION: CD19-exon 2.1
<220> FEATURE:
<221> NAME/KEY: misc_feature
```

```
<222> LOCATION: (1)..(20)

<400> SEQUENCE: 16
caggcctggg aatccacatg                                                    20

<210> SEQ ID NO 17
<211> LENGTH: 20
<212> TYPE: DNA
<213> ORGANISM: Artificial Sequence
<220> FEATURE:
<223> OTHER INFORMATION: CD19-exon 14.1
<220> FEATURE:
<221> NAME/KEY: misc_feature
<222> LOCATION: (1)..(20)

<400> SEQUENCE: 17
agaacatgga taatcccgat                                                    20

<210> SEQ ID NO 18
<211> LENGTH: 20
<212> TYPE: DNA
<213> ORGANISM: Artificial Sequence
<220> FEATURE:
<223> OTHER INFORMATION: CD22-exon 3.2
<220> FEATURE:
<221> NAME/KEY: misc_feature
<222> LOCATION: (1)..(20)

<400> SEQUENCE: 18
tcaatgacag tggtcagctg                                                    20

<210> SEQ ID NO 19
<211> LENGTH: 20
<212> TYPE: DNA
<213> ORGANISM: Artificial Sequence
<220> FEATURE:
<223> OTHER INFORMATION: CD22-exon 9
<220> FEATURE:
<221> NAME/KEY: misc_feature
<222> LOCATION: (1)..(20)

<400> SEQUENCE: 19
caggtgtagt gggagacggg                                                    20

<210> SEQ ID NO 20
<211> LENGTH: 117
<212> TYPE: PRT
<213> ORGANISM: Artificial Sequence
<220> FEATURE:
<223> OTHER INFORMATION: Sequence-based (and structure-assisted)
      CDR-grafting approach: Heavy chain

<400> SEQUENCE: 20

Gln Val Gln Leu Gln Glu Ser Gly Pro Gly Leu Val Lys Pro Ser Gln
1               5                   10                  15

Thr Leu Ser Leu Thr Cys Ser Val Thr Gly Asp Ser Ile Thr Ser Gly
            20                  25                  30

Tyr Trp Asn Trp Ile Arg Lys Phe Pro Gly Asn Lys Leu Glu Trp Ile
        35                  40                  45

Gly Tyr Ile Ser Tyr Ser Gly Ser Thr Tyr Tyr Asn Pro Ser Leu Lys
    50                  55                  60

Ser Arg Ile Thr Ile Ser Arg Asp Thr Ser Lys Asn Gln Tyr Ser Leu
65                  70                  75                  80

Lys Leu Ser Ser Val Thr Thr Glu Asp Thr Ala Thr Tyr Tyr Cys Ala
                85                  90                  95
```

```
Arg Tyr Pro Ser Pro Asp Ala Met Asn Tyr Trp Gly Gln Gly Thr Ser
                100                 105                 110

Val Thr Val Ser Ser
        115

<210> SEQ ID NO 21
<211> LENGTH: 113
<212> TYPE: PRT
<213> ORGANISM: Artificial Sequence
<220> FEATURE:
<223> OTHER INFORMATION: Sequence-based (and structure-assisted)
      CDR-grafting approach: Light chain

<400> SEQUENCE: 21

Asp Val Val Met Thr Gln Thr Pro Leu Thr Leu Pro Val Thr Leu Gly
1               5                   10                  15

Gln Pro Ala Ser Ile Ser Cys Lys Ser Gln Ser Leu Leu Asp Ser
            20                  25                  30

Asp Gly Lys Thr Tyr Leu Asn Trp Leu Gln Gln Arg Pro Gly Gln Ser
            35                  40                  45

Pro Lys Arg Leu Ile Tyr Leu Val Ser Lys Leu Asp Ser Gly Val Pro
50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Trp Gln Gly
                85                  90                  95

Thr His Phe Trp Thr Phe Gly Gly Gly Thr Lys Leu Glu Ile Lys Arg
            100                 105                 110

Ala

<210> SEQ ID NO 22
<211> LENGTH: 117
<212> TYPE: PRT
<213> ORGANISM: Artificial Sequence
<220> FEATURE:
<223> OTHER INFORMATION: The De-murinenization approach, Heavy chain

<400> SEQUENCE: 22

Gln Val Gln Leu Gln Glu Ser Gly Pro Ser Leu Val Lys Pro Gly Gln
1               5                   10                  15

Thr Leu Ser Leu Thr Cys Ser Val Thr Gly Asp Ser Ile Thr Ser Gly
            20                  25                  30

Tyr Trp Asn Trp Ile Arg Gln Ser Pro Gly Asn Lys Leu Glu Tyr Met
            35                  40                  45

Gly Tyr Ile Ser Tyr Ser Gly Ser Thr Tyr Tyr Asn Pro Thr Leu Lys
50                  55                  60

Gly Arg Ile Ser Ile Thr Arg Asp Asn Ser Ser Gln Tyr Tyr Leu
65                  70                  75                  80

Gln Leu Lys Ser Val Thr Ser Glu Asp Thr Ala Thr Phe Tyr Cys Ala
                85                  90                  95

Arg Tyr Pro Ser Pro Asp Ala Met Asn Tyr Trp Gly Gln Gly Thr Ser
                100                 105                 110

Val Thr Val Ser Ser
        115

<210> SEQ ID NO 23
<211> LENGTH: 113
<212> TYPE: PRT
```

-continued

<213> ORGANISM: Artificial Sequence
<220> FEATURE:
<223> OTHER INFORMATION: De-murinenization approach, Light chain

<400> SEQUENCE: 23

```
Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
            20                  25                  30

Asp Gly Lys Thr Tyr Leu Asn Trp Leu Leu Gln Arg Pro Gly Gln Ser
        35                  40                  45

Pro Lys Leu Leu Ile Tyr Leu Val Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Asp Asp Leu Gly Val Tyr Phe Cys Trp Gln Gly
                85                  90                  95

Thr His Phe Trp Thr Phe Gly Gly Gly Thr Lys Leu Glu Ile Lys Arg
            100                 105                 110

Ala
```

<210> SEQ ID NO 24
<211> LENGTH: 61
<212> TYPE: PRT
<213> ORGANISM: Artificial Sequence
<220> FEATURE:
<223> OTHER INFORMATION: CAR22 CDR1 CDR2 heavy chain

<400> SEQUENCE: 24

```
Glu Val Gln Leu Gln Glu Ser Gly Pro Ser Leu Val Lys Pro Ser Gln
1               5                   10                  15

Thr Leu Ser Leu Thr Cys Ser Val Thr Gly Asp Ser Ile Thr Ser Gly
            20                  25                  30

Tyr Trp Asn Trp Ile Arg Lys Phe Pro Gly Asn Lys Leu Glu Tyr Met
        35                  40                  45

Gly Tyr Ile Ser Tyr Ser Gly Ser Thr Tyr Tyr Asn Pro
    50                  55                  60
```

<210> SEQ ID NO 25
<211> LENGTH: 62
<212> TYPE: PRT
<213> ORGANISM: Artificial Sequence
<220> FEATURE:
<223> OTHER INFORMATION: m5/55 CDR1 CDR2 heavy chain

<400> SEQUENCE: 25

```
Glu Val Gln Leu Gln Gln Ser Gly Thr Val Leu Ala Arg Pro Gly Ala
1               5                   10                  15

Ser Val Lys Met Ser Cys Lys Ala Ser Gly Tyr Arg Phe Thr Asn Tyr
            20                  25                  30

Trp Ile His Trp Val Lys Gln Arg Pro Gly Gln Gly Leu Glu Trp Ile
        35                  40                  45

Gly Gly Ile Asn Pro Gly Asn Asn Tyr Thr Thr Tyr Lys Arg
    50                  55                  60
```

<210> SEQ ID NO 26
<211> LENGTH: 62
<212> TYPE: PRT
<213> ORGANISM: Artificial Sequence
<220> FEATURE:

<223> OTHER INFORMATION: g5/44 CDR1 CDR2 heavy chain

<400> SEQUENCE: 26

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Arg Phe Thr Asn Tyr
            20                  25                  30

Trp Ile His Trp Val Arg Gln Ala Pro Gly Gln Gly Leu Glu Trp Ile
        35                  40                  45

Gly Gly Ile Asn Pro Gly Asn Asn Tyr Ala Thr Tyr Arg Arg
    50                  55                  60

<210> SEQ ID NO 27
<211> LENGTH: 59
<212> TYPE: PRT
<213> ORGANISM: Artificial Sequence
<220> FEATURE:
<223> OTHER INFORMATION: CAR22 CDR3 heavy chain

<400> SEQUENCE: 27

Tyr Asn Pro Ser Leu Lys Ser Arg Ile Ser Ile Thr Arg Asp Thr Ser
1               5                   10                  15

Lys Asn Gln Tyr Tyr Met Gln Leu Lys Ser Val Thr Thr Glu Asp Thr
            20                  25                  30

Ala Thr Tyr Tyr Cys Ala Arg Tyr Pro Ser Pro Asp Ala Met Asn Tyr
        35                  40                  45

Trp Gly Gln Gly Thr Ser Val Thr Val Ser Ser
    50                  55

<210> SEQ ID NO 28
<211> LENGTH: 62
<212> TYPE: PRT
<213> ORGANISM: Artificial Sequence
<220> FEATURE:
<223> OTHER INFORMATION: m5/55 CDR3 heavy chain

<400> SEQUENCE: 28

Tyr Lys Arg Asn Leu Lys Gly Lys Ala Thr Leu Thr Ala Val Thr Ser
1               5                   10                  15

Ala Ser Thr Ala Tyr Met Asp Leu Ser Ser Leu Thr Ser Glu Asp Ser
            20                  25                  30

Ala Val Tyr Tyr Cys Thr Arg Glu Gly Tyr Gly Asn Tyr Gly Ala Trp
        35                  40                  45

Phe Ala Tyr Trp Gly Gln Gly Thr Leu Val Thr Val Ser Ser
    50                  55                  60

<210> SEQ ID NO 29
<211> LENGTH: 62
<212> TYPE: PRT
<213> ORGANISM: Artificial Sequence
<220> FEATURE:
<223> OTHER INFORMATION: g5/44 CDR3 heavy chain

<400> SEQUENCE: 29

Tyr Arg Arg Lys Phe Gln Gly Arg Val Thr Met Thr Ala Asp Thr Ser
1               5                   10                  15

Thr Ser Thr Val Tyr Met Glu Leu Ser Ser Leu Arg Ser Glu Asp Thr
            20                  25                  30

Ala Val Tyr Tyr Cys Thr Arg Glu Gly Tyr Gly Asn Tyr Gly Ala Trp
        35                  40                  45

Phe Ala Tyr Trp Gly Gln Gly Thr Leu Val Thr Val Ser Ser
      50              55                  60

<210> SEQ ID NO 30
<211> LENGTH: 63
<212> TYPE: PRT
<213> ORGANISM: Artificial Sequence
<220> FEATURE:
<223> OTHER INFORMATION: CAR22 CDR1 CDR2 light chain

<400> SEQUENCE: 30

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
            20                  25                  30

Asp Gly Lys Thr Tyr Leu Asn Trp Leu Leu Gln Arg Pro Gly Gln Ser
        35                  40                  45

Pro Lys Arg Leu Ile Tyr Leu Val Ser Lys Leu Asp Ser Gly Val
    50                  55                  60

<210> SEQ ID NO 31
<211> LENGTH: 63
<212> TYPE: PRT
<213> ORGANISM: Artificial Sequence
<220> FEATURE:
<223> OTHER INFORMATION: m5/55 CDR1 CDR2 light chain

<400> SEQUENCE: 31

Asp Val Val Val Thr Gln Thr Pro Leu Ser Leu Pro Val Ser Phe Gly
1               5                   10                  15

Asp Gln Val Ser Ile Ser Cys Arg Ser Ser Gln Ser Leu Ala Asn Ser
            20                  25                  30

Tyr Gly Asn Thr Phe Leu Ser Trp Tyr Leu His Lys Pro Gly Gln Ser
        35                  40                  45

Pro Gln Leu Leu Ile Tyr Gly Ile Ser Asn Arg Phe Ser Gly Val
    50                  55                  60

<210> SEQ ID NO 32
<211> LENGTH: 63
<212> TYPE: PRT
<213> ORGANISM: Artificial Sequence
<220> FEATURE:
<223> OTHER INFORMATION: g5/44 CDR1 CDR2 light chain

<400> SEQUENCE: 32

Asp Val Gln Val Thr Gln Ser Pro Ser Ser Leu Ser Ala Ser Val Gly
1               5                   10                  15

Asp Arg Val Thr Ile Thr Cys Arg Ser Ser Gln Ser Leu Ala Asn Ser
            20                  25                  30

Tyr Gly Asn Thr Phe Leu Ser Trp Tyr Leu His Lys Pro Gly Lys Ala
        35                  40                  45

Pro Gln Leu Leu Ile Tyr Gly Ile Ser Asn Arg Phe Ser Gly Val
    50                  55                  60

<210> SEQ ID NO 33
<211> LENGTH: 53
<212> TYPE: PRT
<213> ORGANISM: Artificial Sequence
<220> FEATURE:
<223> OTHER INFORMATION: CAR22 CDR3 light chain

<400> SEQUENCE: 33

```
Ser Gly Val Pro Asp Arg Phe Thr Gly Ser Gly Ser Gly Thr Asp Phe
1               5                   10                  15

Thr Leu Lys Ile Ser Arg Val Glu Ala Glu Asp Leu Gly Val Tyr Tyr
                20                  25                  30

Cys Trp Gln Gly Thr His Phe Trp Thr Phe Gly Gly Gly Thr Lys Leu
            35                  40                  45

Glu Ile Lys Arg Ala
    50
```

<210> SEQ ID NO 34
<211> LENGTH: 53
<212> TYPE: PRT
<213> ORGANISM: Artificial Sequence
<220> FEATURE:
<223> OTHER INFORMATION: m5/55 CDR3 light chain

<400> SEQUENCE: 34

```
Ser Gly Val Pro Asp Arg Phe Thr Gly Ser Gly Ser Gly Thr Asp Phe
1               5                   10                  15

Thr Leu Lys Ile Ser Thr Ile Lys Pro Glu Asp Leu Gly Met Tyr Tyr
                20                  25                  30

Cys Leu Gln Gly Thr His Gln Pro Tyr Thr Phe Gly Gly Gly Thr Lys
            35                  40                  45

Leu Glu Ile Lys Arg
    50
```

<210> SEQ ID NO 35
<211> LENGTH: 52
<212> TYPE: PRT
<213> ORGANISM: Artificial Sequence
<220> FEATURE:
<223> OTHER INFORMATION: g5/44 CDR3 light chain

<400> SEQUENCE: 35

```
Ser Gly Val Pro Asp Arg Phe Ser Gly Ser Gly Ser Gly Thr Asp Phe
1               5                   10                  15

Thr Leu Thr Ile Ser Ser Leu Gln Pro Glu Asp Phe Ala Thr Tyr Tyr
                20                  25                  30

Cys Leu Gln Gly Thr His Gln Pro Tyr Thr Phe Gly Gln Gly Thr Lys
            35                  40                  45

Val Glu Ile Lys
    50
```

<210> SEQ ID NO 36
<211> LENGTH: 115
<212> TYPE: PRT
<213> ORGANISM: Artificial Sequence
<220> FEATURE:
<223> OTHER INFORMATION: human heavy chain

<400> SEQUENCE: 36

```
Gln Val Gln Leu Gln Glu Ser Gly Pro Gly Leu Val Lys Pro Ser Gln
1               5                   10                  15

Thr Leu Ser Leu Thr Cys Thr Val Ser Gly Gly Ser Ile Ser Ser Gly
                20                  25                  30

Gly Tyr Tyr Trp Ser Trp Ile Arg Gln His Pro Gly Lys Gly Leu Glu
            35                  40                  45

Trp Ile Gly Tyr Ile Tyr Tyr Ser Gly Ser Thr Tyr Tyr Asn Pro Ser
        50                  55                  60

Leu Lys Ser Arg Val Thr Ile Ser Val Asp Thr Ser Lys Asn Gln Phe
```

65                  70                  75                  80
Ser Leu Lys Leu Ser Ser Val Thr Ala Ala Asp Thr Ala Val Tyr Tyr
                    85                  90                  95

Cys Ala Arg Asn Trp Phe Asp Ser Trp Gly Gln Gly Thr Leu Val Thr
                100                 105                 110

Val Ser Ser
        115

<210> SEQ ID NO 37
<211> LENGTH: 113
<212> TYPE: PRT
<213> ORGANISM: Artificial Sequence
<220> FEATURE:
<223> OTHER INFORMATION: murine light chain

<400> SEQUENCE: 37

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
                20                  25                  30

Asp Gly Lys Thr Tyr Leu Asn Trp Leu Leu Gln Arg Pro Gly Gln Ser
            35                  40                  45

Pro Lys Arg Leu Ile Tyr Leu Val Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Glu Asp Leu Gly Val Tyr Tyr Cys Trp Gln Gly
                85                  90                  95

Thr His Phe Trp Thr Phe Gly Gly Gly Thr Lys Leu Glu Ile Lys Arg
                100                 105                 110

Ala

<210> SEQ ID NO 38
<211> LENGTH: 111
<212> TYPE: PRT
<213> ORGANISM: Artificial Sequence
<220> FEATURE:
<223> OTHER INFORMATION: IMGT light chain

<400> SEQUENCE: 38

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Leu Val His Ser
                20                  25                  30

Asp Gly Asn Thr Tyr Leu Asn Trp Phe Gln Gln Arg Pro Gly Gln Ser
            35                  40                  45

Pro Arg Arg Leu Ile Tyr Lys Val Ser Asn Arg Asp Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Gly
                85                  90                  95

Thr His Trp Pro Thr Phe Gly Gly Gly Thr Lys Val Glu Ile Lys
                100                 105                 110

<210> SEQ ID NO 39
<211> LENGTH: 113
<212> TYPE: PRT

```
<213> ORGANISM: Artificial Sequence
<220> FEATURE:
<223> OTHER INFORMATION: murine_1_free/1-11 light chain

<400> SEQUENCE: 39

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
            20                  25                  30

Asp Gly Lys Thr Tyr Leu Asn Trp Leu Leu Gln Arg Pro Gly Gln Ser
        35                  40                  45

Pro Lys Leu Leu Ile Tyr Leu Val Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Asp Asp Leu Gly Val Tyr Phe Cys Trp Gln Gly
                85                  90                  95

Thr His Phe Trp Thr Phe Gly Gly Thr Lys Leu Glu Ile Lys Arg
                100                 105                 110

Ala
```

CD22 TARGETING-MOIETY FOR THE TREATMENT OF B-CELL ACUTE LYMPHOBLASTIC LEUKEMIA (B-ALL)

CROSS-REFERENCE TO RELATED APPLICATION

The present application is filed under 35 U.S.C 371 of PCT/EP2021/056262 (filed on Mar. 11, 2021), which claims priority to a foreign application, EP 20382175.6 (filed on Mar. 11, 2020).

STATEMENT REGARDING SEQUENCE LISTING

The Sequence Listing associated with this application is provided in text format in lieu of a paper copy, and is hereby incorporated by reference into the specification. The name of the text file containing the Sequence Listing is 370110-401USPC-SL-V2. The text file is 31.2 KB, was created on Aug. 11, 2025, and is being submitted electronically via Patent Center.

TECHNICAL FIELD OF THE INVENTION

The present invention provides therapeutics for the treatment of CD22-positive cancers such as B-cell acute lymphoblastic leukemia (B-ALL). In particular, the present invention provides an anti-CD22 monoclonal antibody whose F(AB')2, particularly the scFv fragment, can target the CD22 antigen, for use in the treatment of CD22-positive cancers.

BACKGROUND OF THE INVENTION

B-cell acute lymphoblastic leukemia (B-ALL) is an aggressive cancer, diagnosed at any age throughout the lifespan of an individual, being the most common malignancy in children. Despite current 5-year disease-free survival rates of ~80%, refractory and relapsed (R/R) patients have a dismal prognosis. Adult B-ALL is less frequent but is commonly associated with an unfavorable clinical outcome even after the use of high-dose chemotherapy regimens and allogenic stem cell transplantation.

Immunotherapy has generated unprecedented expectations in cancer treatment. Adoptive cellular immunotherapy, based on the genetic engineering of human T cells with chimeric antigen receptors (CARs) redirected against cell surface tumor antigens, has shown great potential in R/R B-ALL due to the high efficacy and specificity of CD19⁻ CAR T cells, with ~90% response rates and ~50% complete remission rates after 12 months. However, CD19-CAR T cells are not always curative and ~60% of patients inevitably relapse, mainly because of poor CAR T cell persistance or the emergence of CD19⁻ B-ALL clones. Therefore, unfortunately, there are very few therapeutic options for patients with B-ALL relapsing as CD19⁻ after either chemotherapy or CD19-directed immunotherapy and, therefore, novel strategies are being explored to enhance CAR T cell function and persistence, including the development of novel target antigens, costimulatory domains or effector cells.

Like CD19, CD22 is expressed in a B-cell lineage-restricted fashion. CD22-directed T cells are an attractive addition to the current CD19-directed T cell strategies because i) they constitute an alternative for CD19⁻/dim B-ALL relapses as CD22 is retained in such relapses, and ii) they would target the earliest pre-VDJ CD19⁻ B-lineage progenitors, which potentially can escape in CD19-CAR T cell therapy. Indeed, CD22 has been employed as a target for B-ALL in clinical trials using anti-CD22 monoclonal antibodies (moAb) linked to immunotoxins, and several CD22-CARs have also been reported. CD22-CAR T cells induce clinical remission in ~70% of R/R B-ALL patients either naïve or resistant to CD19-CAR T cells.

However, these studies reported conflicting results with regard to whether B-ALL blasts escape CD22-CAR T cells-mediated lysis with subsequent CD22−/dim relapses (Fry T J, Shah N N, Orentas R J, Stetler-Stevenson M, Yuan C M, Ramakrishna S, et al. CD22-targeted CAR T cells induce remission in B-ALL that is naive or resistant to CD19-targeted CAR immunotherapy. Nature medicine. 2018; 24 (1): 20-8; and Pan J, Niu Q, Deng B, Liu S, Wu T, Gao Z, et al. CD22 CAR T-cell therapy in refractory or relapsed B acute lymphoblastic leukemia. Leukemia. 2019). Interestingly, comparative studies from the Orentas laboratory (Blood. 2013 Feb. 14; 121 (7): 1165-74. doi: 10.1182/blood-2012-06-438002. Epub 2012 Dec. 14; and Adrienne H. Long, Waleed M. Haso & Rimas J. Orentas (2013) Lessons learned from a highly-active CD22-specific chimeric antigen receptor, OncoImmunology, 2:4, e23621) reported that maximal efficacy of CD22-CAR T cells is obtained when using anti-CD22 antibodies that target cell surface proximal epitopes or that display a high-binding affinity for CD22.

Here, we have developed and characterized a novel CD22-CAR targeting a membrane-distal CD22 epitope, reporting an efficient elimination of primary B-ALL cells.

(PBMCs from n=3 healthy donors). CD22 expression in the different cell lines is shown previously in a histogram. (E) Absolute counts of alive target cells measured by FACS in 48 h cytotoxicity assays at 1:1 E:T ratio (PBMCs from n=3 healthy donors). (F) ELISA showing robust secretion of pro-inflammatory cytokines by CD22-CAR T cells after 48 h exposure to B-ALL and AML cell lines (upper panels) and CD22-KO or CD19-KO SEM cell lines (bottom panels) (PBMCs from n=3 healthy donors). FSC, forward scatter; SSC, side scatter; FSC-H, forward scatter-high; FSC-A, forward scatter area; E:T, effector: target ratio; KO, knockout; wt, wild-type; MFI, median fluorescence intensity. Data are presented as mean±SEM (n=3 healthy donors). *p<0.05, p<0.01, *p<0.001.

Figure 3:
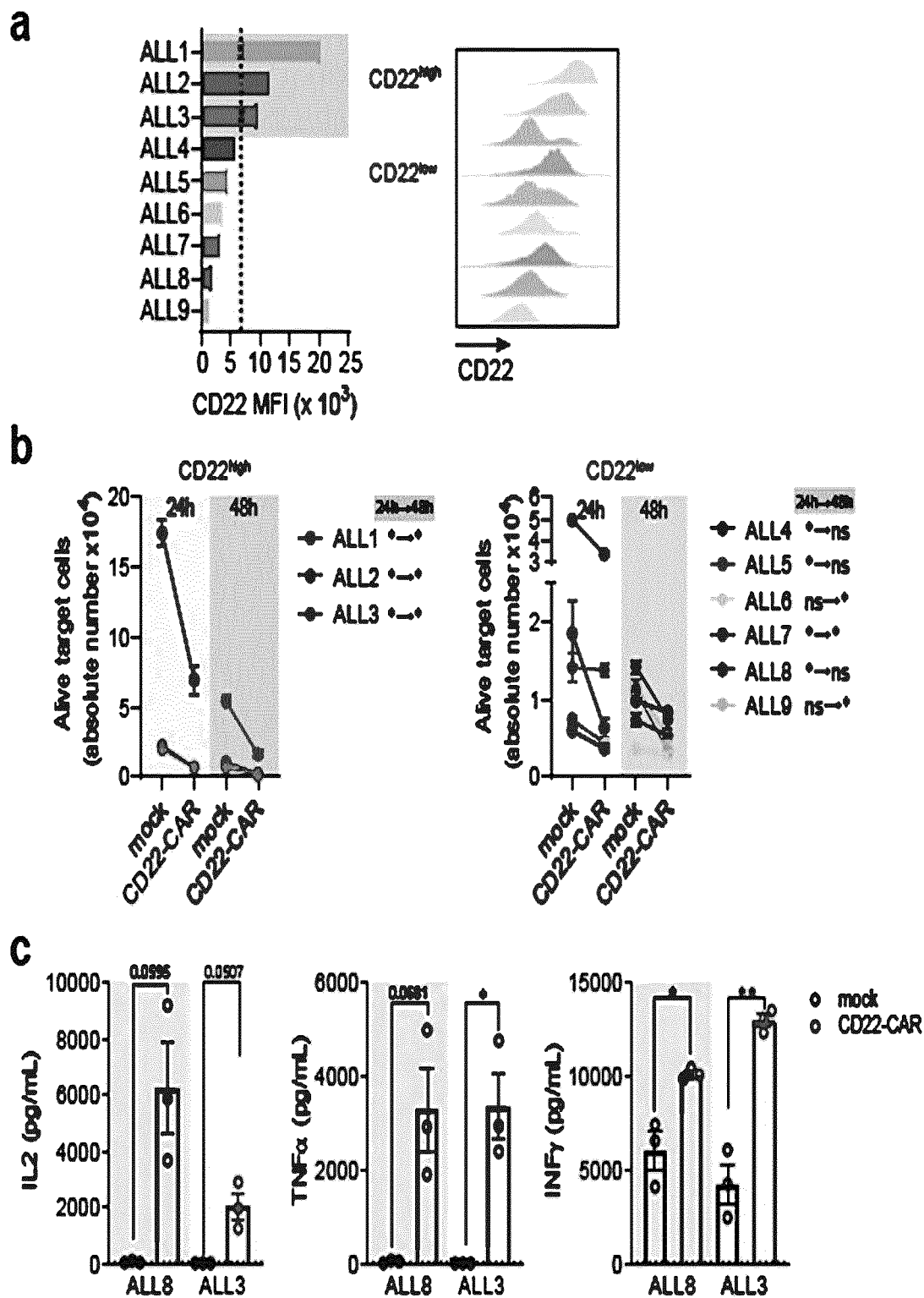

FIG. 3. CD22-CAR T cells efficiently target and eliminate primary B-ALL cells in vitro although the expression level of CD22 impacts their efficacy. (A) Median fluorescence intensity (MFI) of CD22 in the different primary B-ALL samples used (n=9). The mean value for CD22 MFI was used to classify primary B-ALL samples as CD22high (ALL #1 to ALL #3) or CD22low (ALL #4 to ALL #9). (B) Absolute counts of alive target CD22high and CD22low cells measured by FACS in 24 h and 48 h cytotoxicity assays at 1:1 E:T ratio. The statistical significance is indicated for each sample. A 2-way analysis of variance (Sidak's multiple comparison test) was used. (C) ELISA showing similar robust secretion of pro-inflammatory cytokines by CD22-CAR T cells after 48 h exposure irrespective of the expression levels of CD22. Data are presented as mean±SEM (PBMCs from n=3 healthy donors). *p<0.05, **p<0.01.

Figure 4:
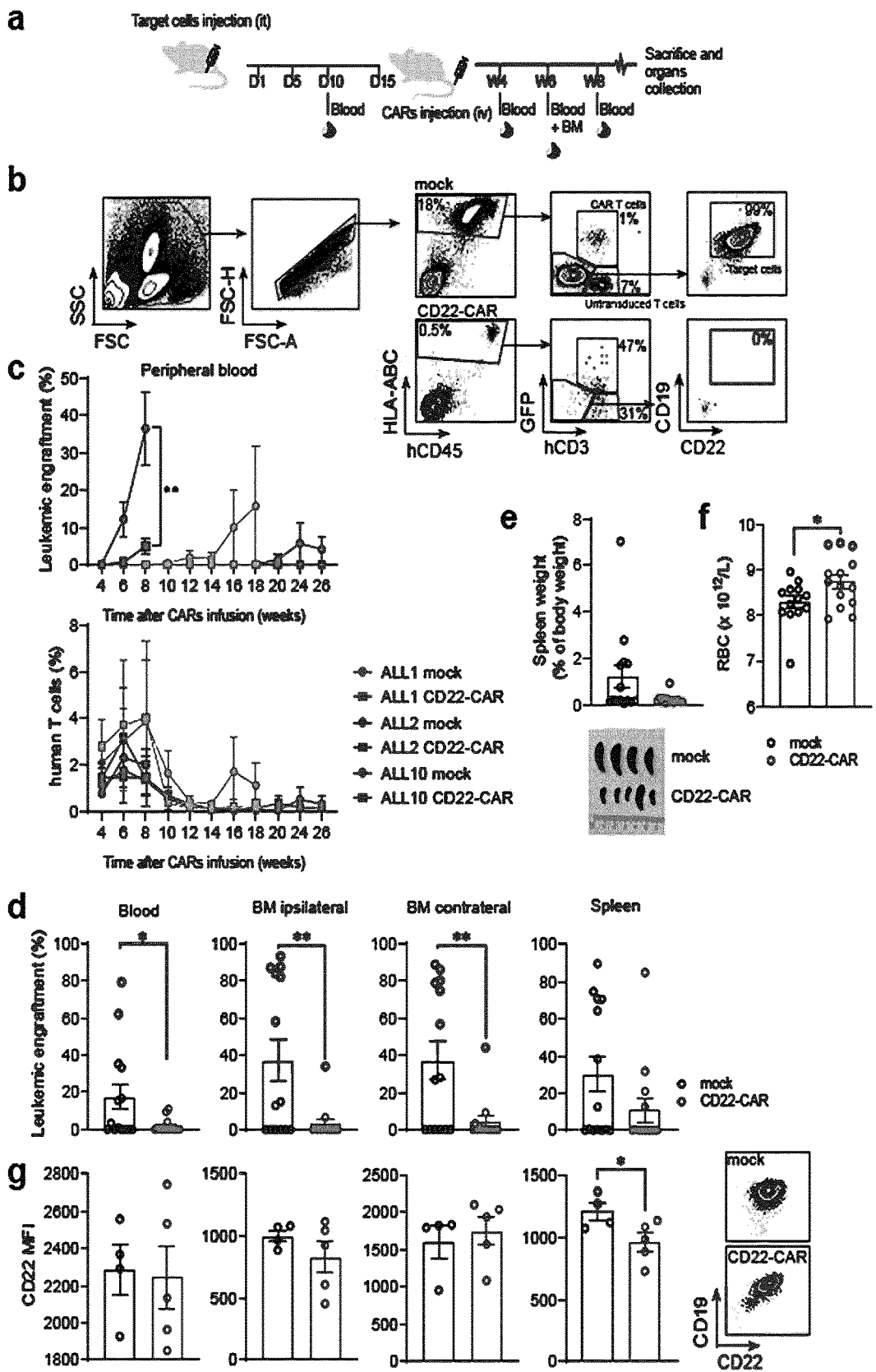

FIG. 4. CAR T cells directed against a distal membrane CD22 epitope efficiently eliminate differentially aggressive PDX B-ALL blasts in vivo. (A) Experimental design of the in vivo experiments. (B) Gating strategy used to analyze FACS data from the in vivo experiments. Leukemic cells were identified as hCD45+hHLA−ABC+hCD3−hCD19+hCD10+. CD22 was excluded from the identification to avoid confounding analysis due to potential antigen loss. CAR T cells were identified based on CD3 and GFP expression. Duplets were removed from the analysis. (C) Leukemic burden (upper panel) and T cell persistence (bottom panel) measured in PB over a 26-week follow-up period (n=4-5 mice/group; n=3 PDXs, CD22high (ALL #1 and ALL #2) and CD22low (ALL #10)). (D) Leukemic burden at sacrifice in PB, ipsilateral and contralateral BM and spleen (n=14 mice from the three PDXs are shown pooled). (E) Weight (total animals, n=14) and macroscopic images of spleens (ALL #2 mice) from mock-IC and CD22-CAR T cell-treated mice at sacrifice. (F) PB red blood cell counts in mock-IC and CD22-CAR T cell-treated mice at sacrifice (n=14). (G) CD22 MFI of persistent primary B-ALL in mock-IC- and CD22-CAR T cell treated mice at sacrifice (ALL #2 mice, n=4-5) and representative FACS plots of contralateral BM samples showing the levels of CD22 of a mock-IC and a CD22-CAR T cell-treated mouse within the target cell population. D, day; W, week; it, intratibia; iv, intravenous; BM, bone marrow; RBC, red blood cells; MFI, median fluorescence intensity. Plot shows mean±SEM. *p<0.05, p<0.01, *p<0.001.

Figure 5:
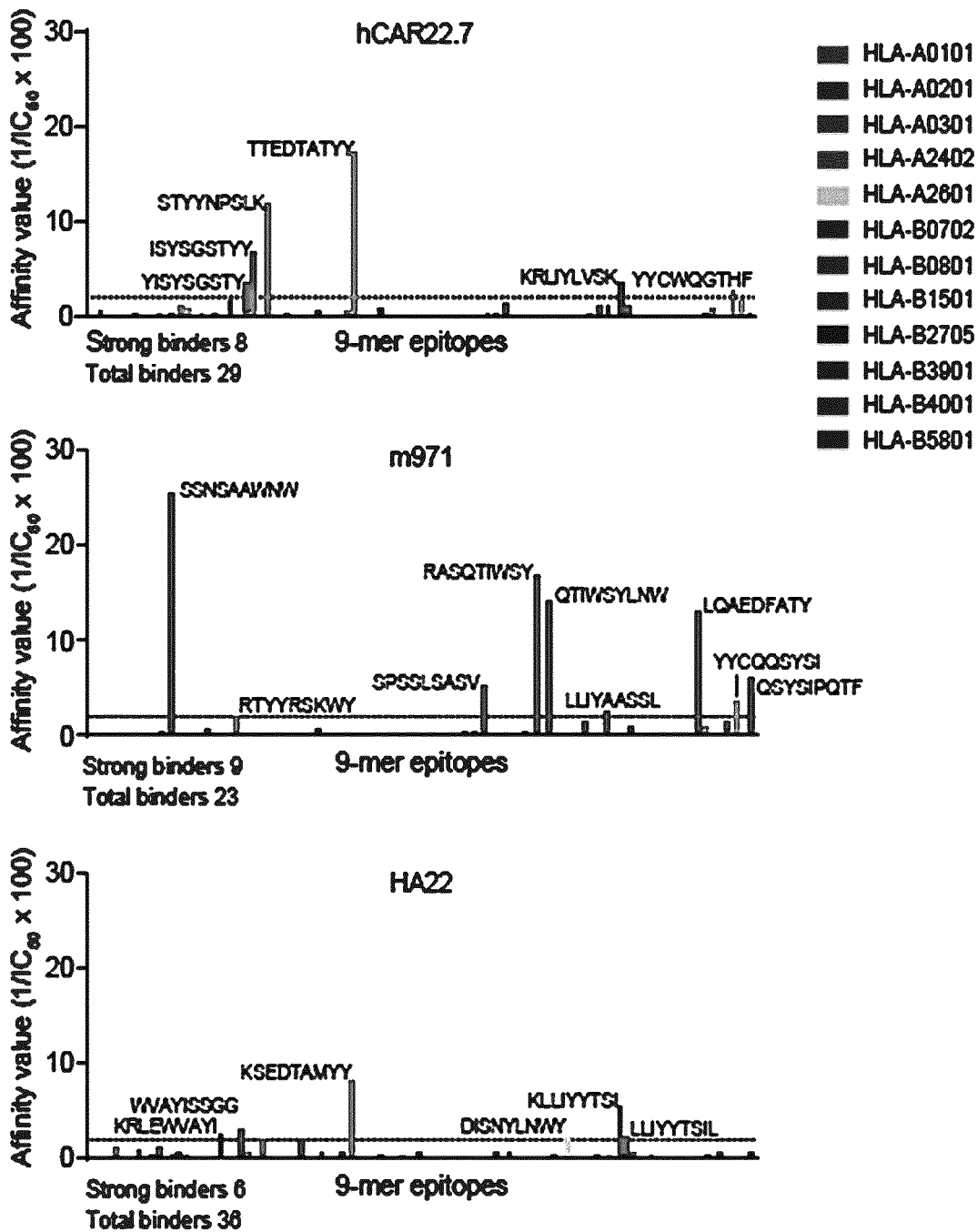

FIG. 5. Immunogenic prediction of hCD22.7-scFv. The immunogenic potential of hCD22.7, m971 and HA22 CD22-scFvs was compared by in silico prediction analysis. CD22-scFvs were broken in 9-mer peptides, length for which HLA molecules have a strong preference. Peptides are considered to bind MHC class-I when a half-maximum inhibitory concentration (IC50) is <500 nM, being considered strong binders when IC50<50 nM (affinity value>2, dotted line) and aminoacid sequence is shown in the figure. Only the most representative HLA supertypes were analysed. The predicted epitope-binding affinity was calculated as (1/IC50×100). Predicted epitopes are distributed along the x-axis according to their distribution in the protein.

Figure 6:
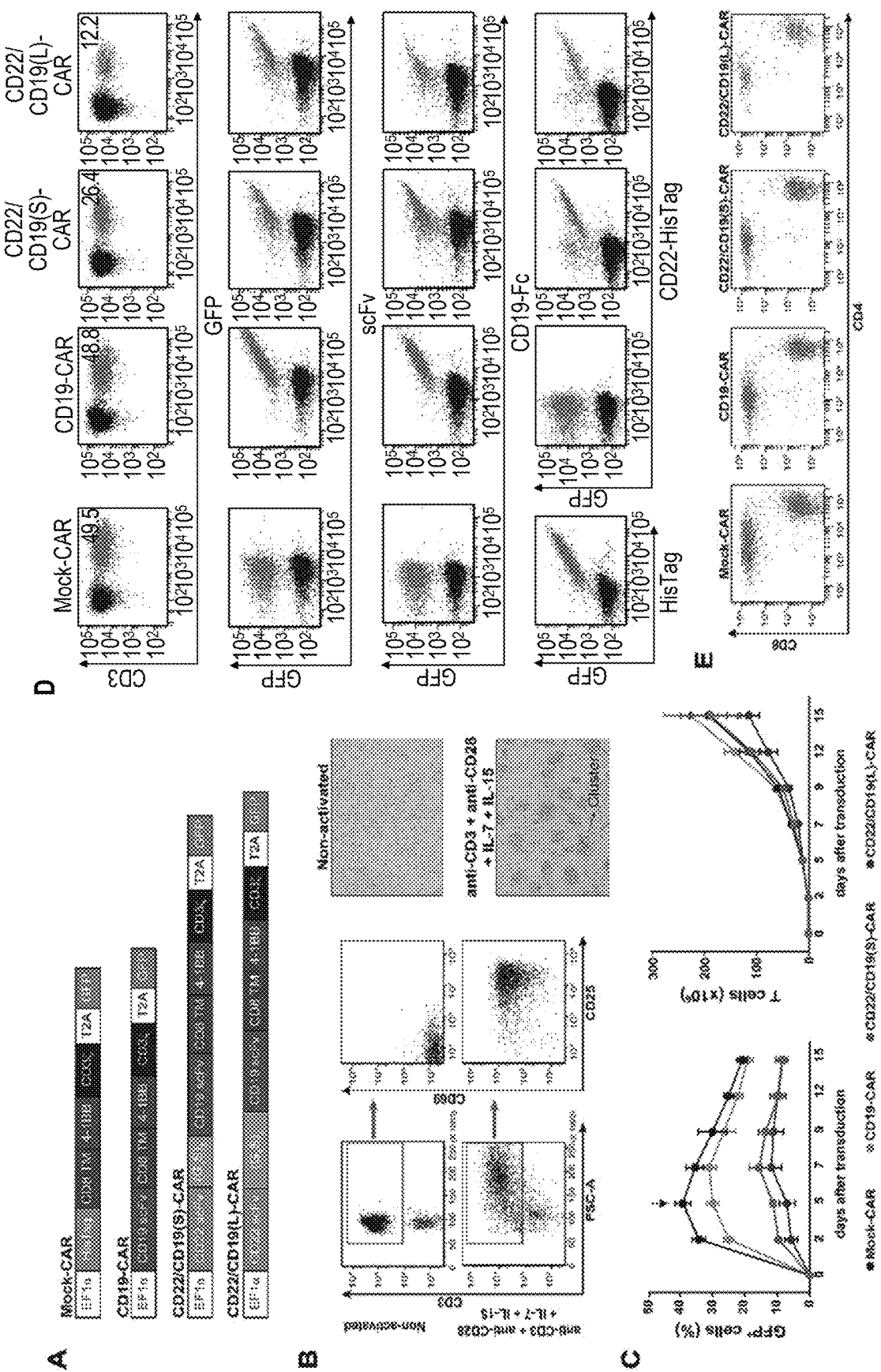

FIG. 6. Generation, transduction, expansion and detection of CD22/CD19-biCAR T cells. A) Scheme of the CAR constructs used. (S) and (L) denote short-$(G_4S)_4$- and long-$(G_4S)_7$- size for the inter-scFv linker, respectively. B) T-cell activation after 48 h exposure to anti-CD3/CD28 plus IL-7 and IL-15 determined by CD25 and CD69 expression by FACS (left panel) and by activated T-cell clusters by light microscopy (right panels) (n=5). C) Transduction efficiency (left panels) and expansion (right panels) of activated T cells transduced with the indicated CARs (n=5). The arrow represents the time when CAR T cells were harvested for CAR surface detection on human T cells. D) Representative flow-cytometry plots of CAR expression on human T cells detected as GFP+ (top panels), anti-scFv (second row), CD19-Fc/anti-Fc (third row), and CD22-HisTag (bottom panels). CAR-transduced T cells are shown in green. E) Representative CAR transduction in CD4+ and $CD8^+$ T cells (n=5). Data are shown as mean±SEM.

Figure 7:
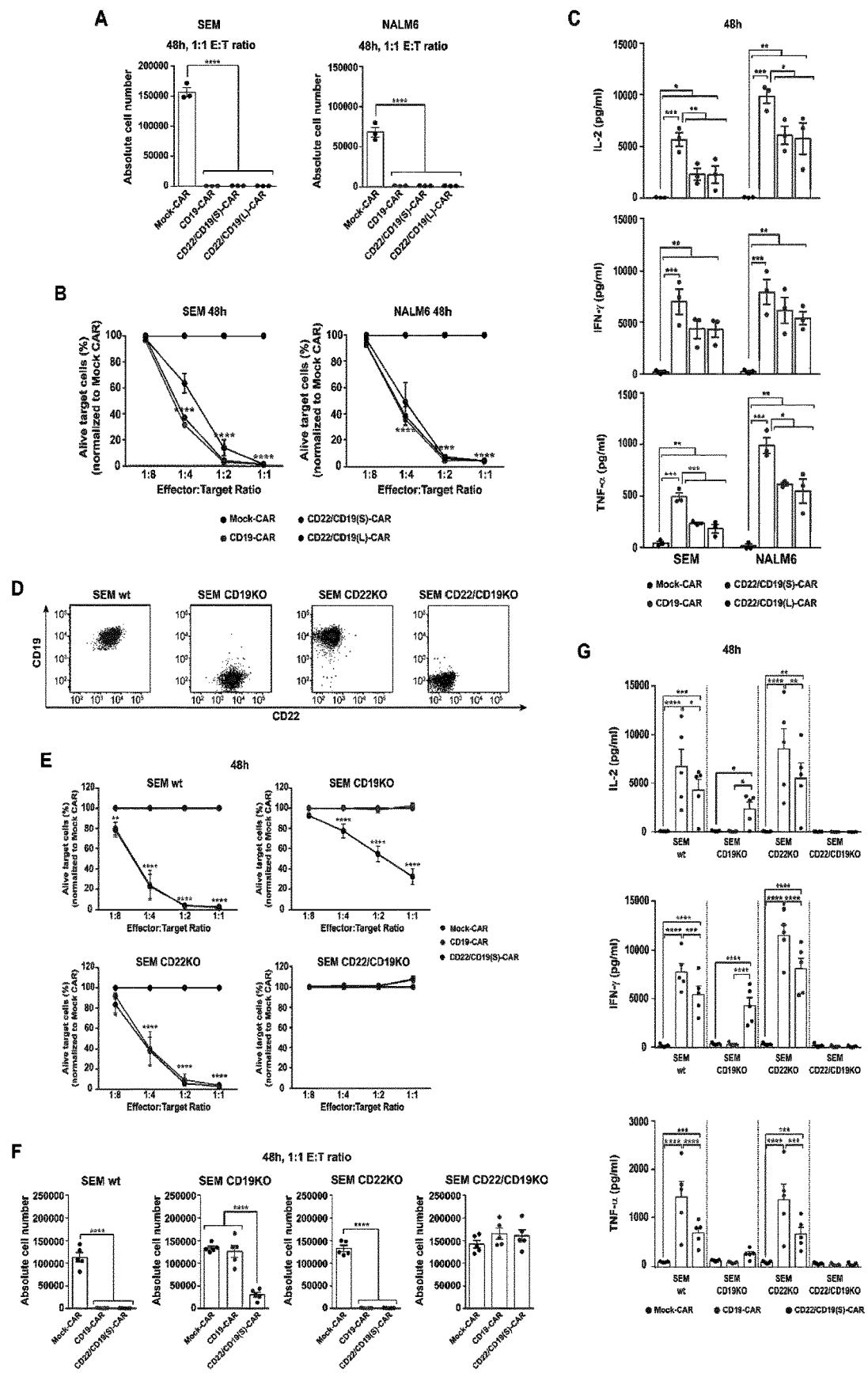

FIG. 7. Robust antileukemic efficacy and specificity of CD22/CD19-biCAR T cells in vitro. A-B) Absolute number (A) and (B) percentage of alive target cells (SEM or NALM6) after 48 h incubation with the indicated CAR T cells and E:T ratios. Results in A are normalized to Mock-CAR data (n=3 independent healthy donors' PBMCs). C) Production of the pro-inflammatory cytokines IL-2, IFN-γ and TNF-α by CAR T cells after 48 h exposure to SEM or NALM6 target cells at 1:1 E:T ratio (n=3 independent healthy donors' PBMCs). D) Different CD22/CD19 combinatorial phenotypes of CRISPR/cas9-edited SEM cells. E-F) Percentage (E) and absolute number (F) of alive target cells after 48 h incubation with the indicated CAR T cells and E:T ratios. Results in E are normalized to Mock-CAR data (n=5 independent healthy donors' PBMCs). G) Production of IL-2, IFN-γ and TNF-α by CAR T cells after 48 h exposure to the indicated SEM phenotypes (n=5). Data are shown as mean±SEM *p<0.05, p<0.01, *p<0.001, ****p<0.0001; one-way ANOVA test with Tukey post hoc test.

Figure 8:
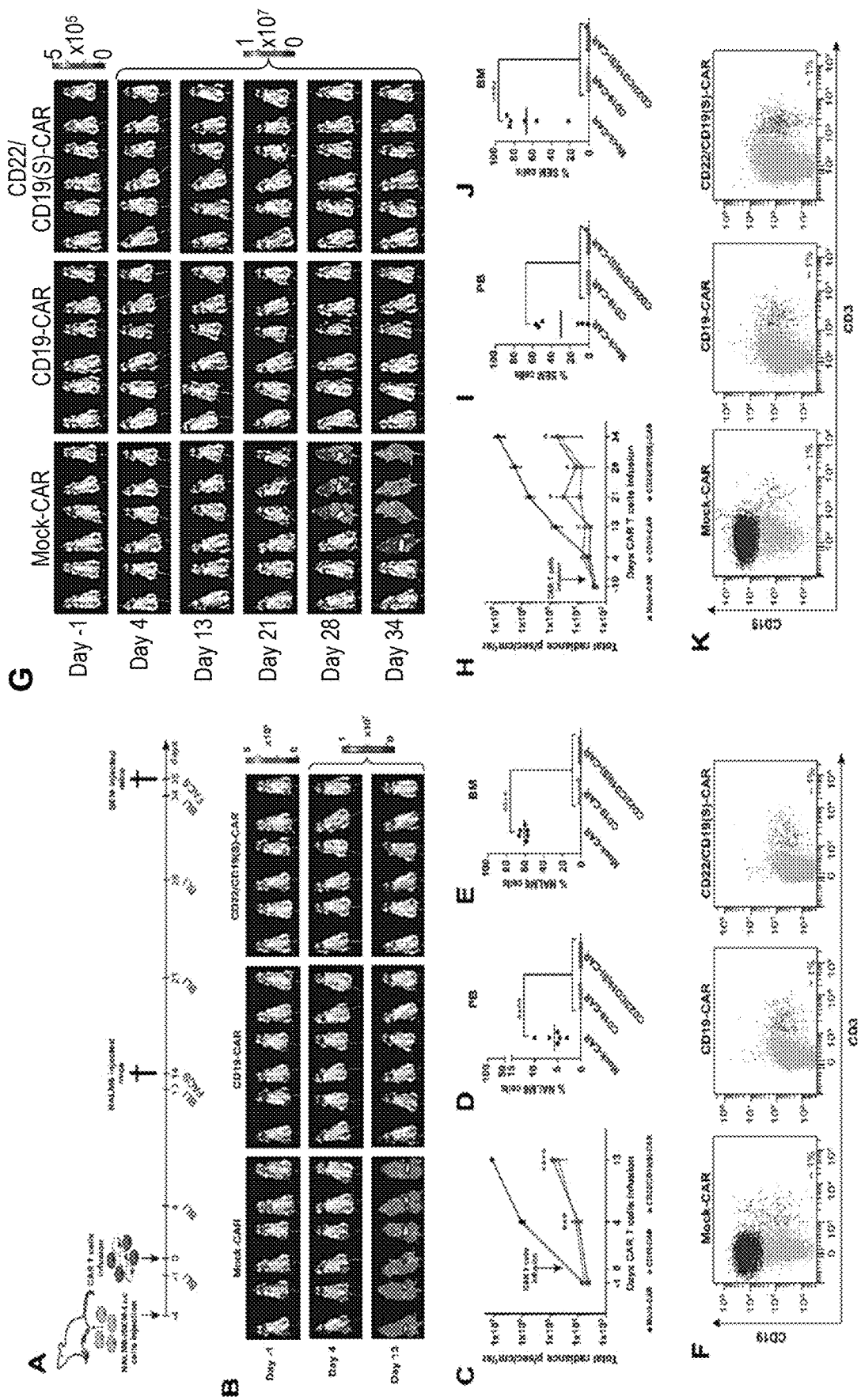

FIG. 8. CD22/CD19(S)-CAR T cells are as efficient as CD19-CAR T cells in vivo using both NALM6 and SEM B-ALL cell lines. A) Experimental design of the in vivo experiment. NSG mice (n=6/group) were intra-BM transplanted with $1×10^5$ Luc-expressing NALM6/SEM cells. Four days after, $4×10^6$ Mock-CAR, CD19-CAR or CD22/CD19(S)-CAR T cells were i.v. injected. Leukemic burden was monitored weekly by bioluminescence (BLI) using In Vivo Imaging System (IVIS). Mice were sacrificed and FACS-analysed for leukemic burden and CAR T-cell persistence when Mock-CAR-treated mice were fully leukemic by BLI. B) IVIS imaging of NALM6 leukemic burden monitored by BLI at the indicated time points. C) Total radiance quantification (p/sec/cm2/sr) for NALM6 at the indicated time points. D, E) NALM6 leukemic burden in peripheral blood (PB) (D) and in contralateral bone marrow (BM) (E) at sacrifice of mice treated with Mock-CAR, CD19-CAR, and CD22/CD19(S)-CAR, respectively. F) Representative FACS plots showing NALM6 cells (blue) and human T-cell persistence (red) in BM at sacrifice of mice treated with Mock-CAR, CD19-CAR, and CD22/CD19(S)-CAR, respectively. G-K) Idem to B-F for SEM target cells.

Each dot represents a mouse. Data are shown as mean±SEM, *p<0.05, *p<0.001, **p<0.0001; one-way ANOVA test with Tukey post hoc test.

Figure 9:
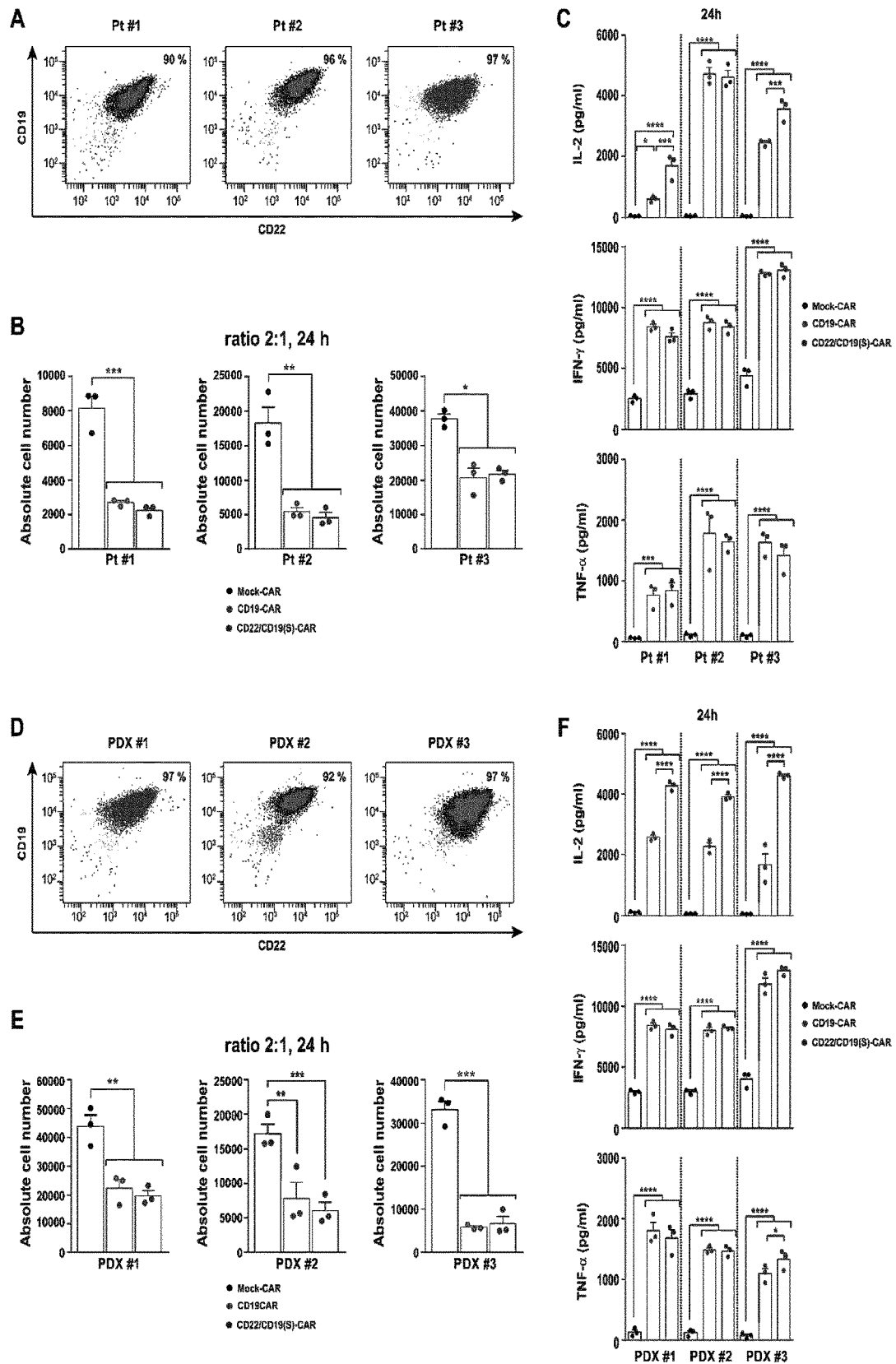

FIG. 9. CD22/CD19(S)-CAR T cells eliminate primary and PDX B-ALL cells. A) CD22 and CD19 FACS expression in primary B-ALL blasts (n=3). B) Absolute number of alive primary B-ALL blasts after 24 h incubation with CAR T cells at 2:1 E:T ratio. C) Production of the pro-inflammatory cytokines IL-2, IFN-γ and TNF-α by CAR T cells after 24 h exposure to primary B-ALL blasts at 2:1 E:T ratio (n=3 independent healthy donors' PBMCs). D-F) Idem to A-B for PDX B-ALL samples. Data are shown as meant SEM *p<0.05, **p<0.01, p<0.001; two-way ANOVA test with Tukey post hoc test.

Figure 10:
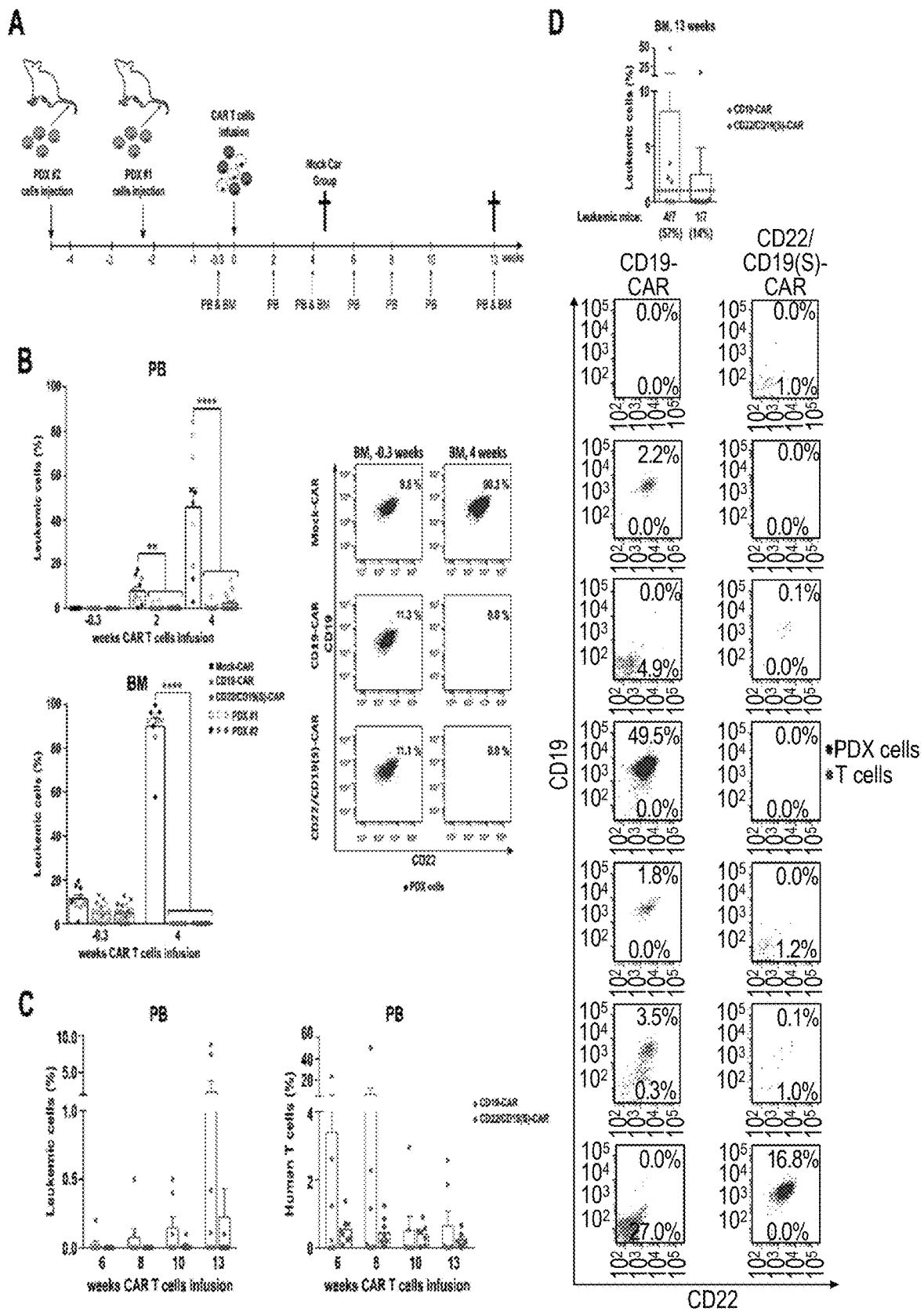

FIG. 10. CD22/CD19(S)-CAR is effective in delaying relapse in long-term follow-up B-ALL PDXs. A) Scheme showing the experimental design. NSG mice (n=6-8/group) were i.v. transplanted with $0.5 \times 10^6$ B-ALL PDX #1 and $1 \times 10^6$ B-ALL PDX #2 cells. Upon B-ALL engraftment in BM, mice were randomized and at day 17 or 31, $5 \times 10^6$ Mock-CAR, CD19-CAR or CD22/CD19(S)-CAR T cells were i.v. injected. Leukemic burden and human T-cell persistence were monitored in PB biweekly by FACS. BM aspirates were FACS analysed when Mock-CAR-treated mice were sacrificed (week 4) and at endpoint analysis (week 13). B) Leukemic burden in PB (upper left panel) and BM (bottom left panel) at the indicated time points after CAR T-cell infusion. Right panels show representative BM FACS analysis prior CAR T cells infusion (3 days prior CAR T-cell infusion) and at the time Mock-CAR-treated mice were sacrificed (week 4). C) Follow-up in PB of leukemic engraftment/relapse (left panel) and persistent T cells (right panels) of CD19-CAR-vs CD22/CD19(S)-CAR-treated mice at the indicated timepoints (n=7-8 animals/group). D) Leukemic burden at sacrifice/endpoint (week 13 after CAR T-cell infusion) in BM for CD19-CAR-vs CD22/CD19(S)-CAR-treated mice (n=7 mice/group). A mouse is considered in relapse when the % of blasts in BM is >1% (horizontal dotted line). Bottom panels show the FACS analysis showing B-ALL cells (blue) and human T-cell persistence (red) for each independent CD19-CAR- and CD22/CD19(S)-CAR-treated mouse. Each dot represents a mouse. Data are shown as mean±SEM p<0.01, *p<0.001, ****p<0.0001; one-way ANOVA test with Tukey post hoc test.

Figure 11:
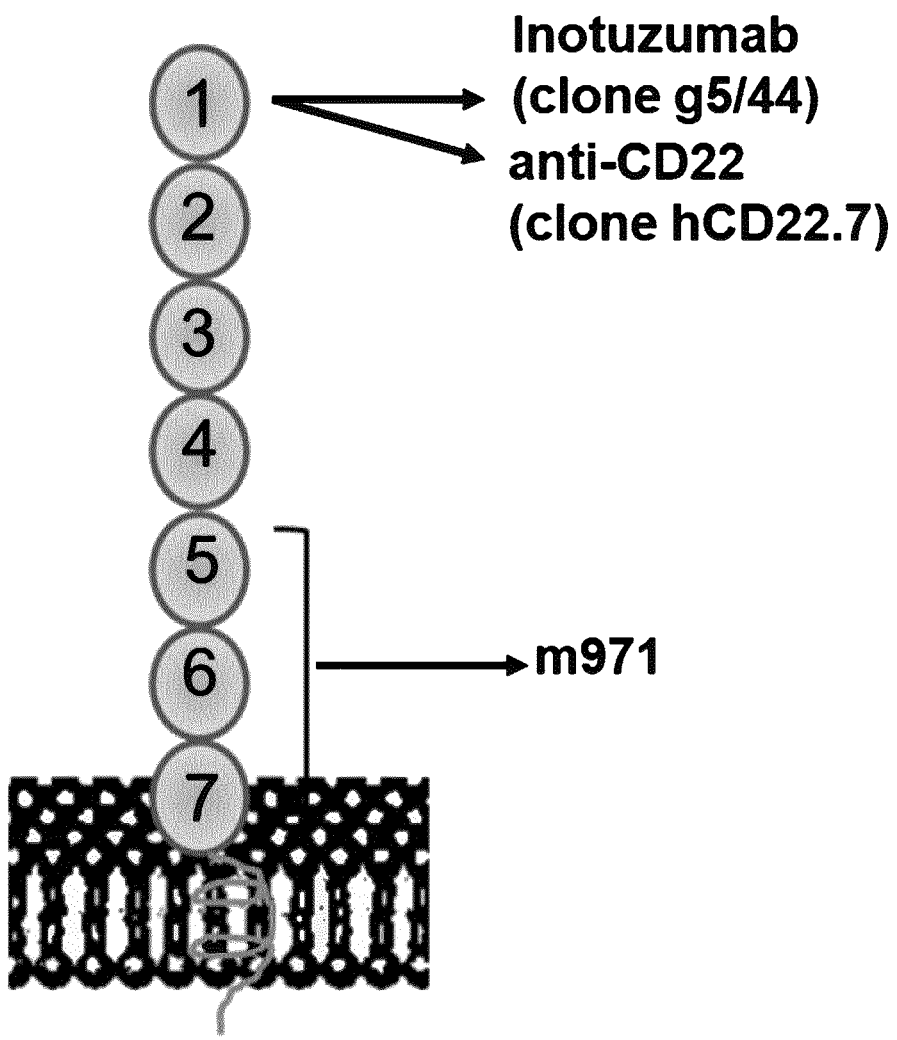

FIG. 11. CD22 structure with the 7 domains. Binding of anti CD22 antibodies is indicated.

Figure 12:
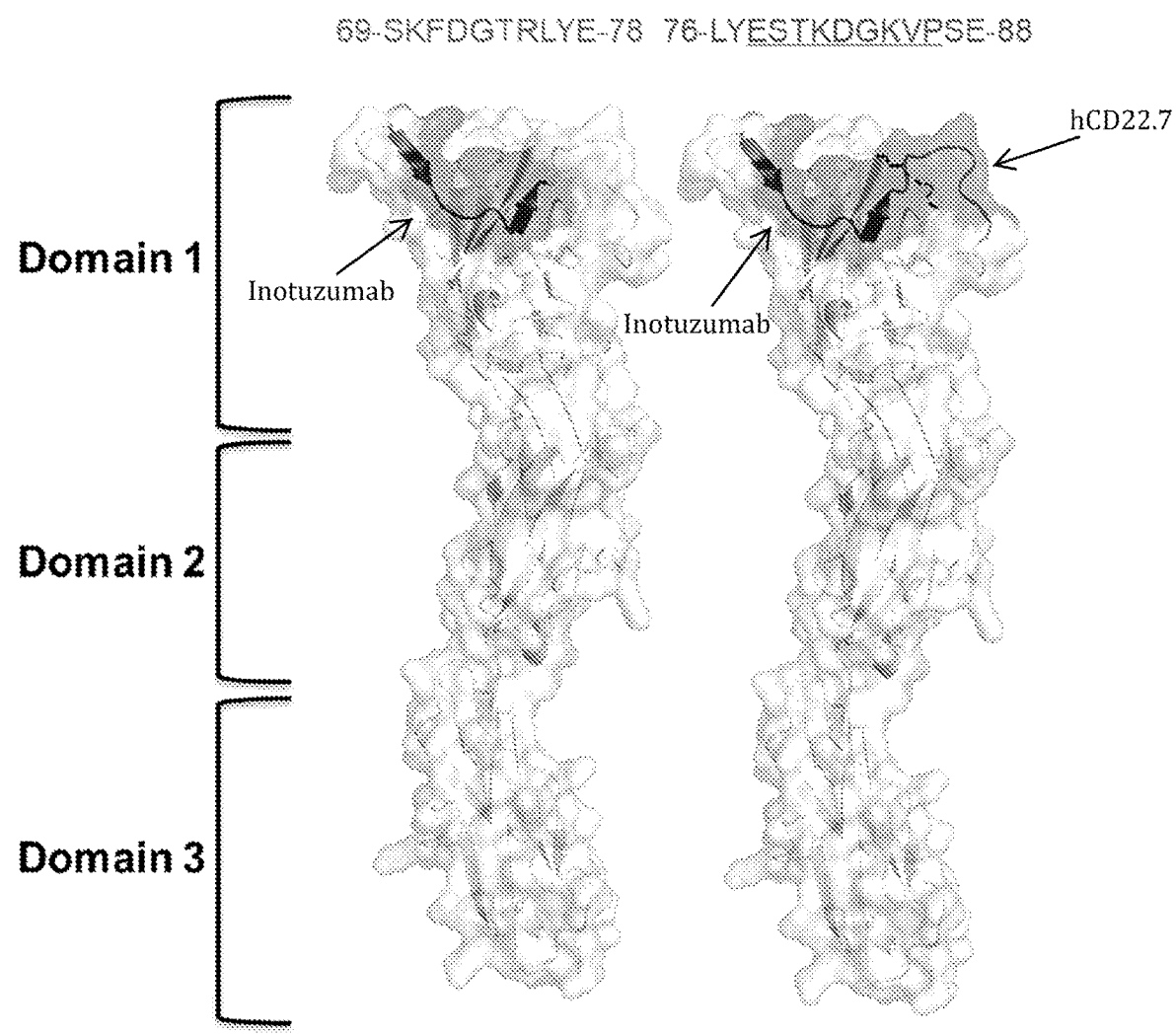

FIG. 12. Binding domain of inotuzumab (domain distal), hCD22.7 (domain 1, distal) The detected epitope for inotuzumab coincides with an exposed region adjacent to the one identified to hCD22.7. Inotuzumab epitope is slightly more extended than the one recognized by hCD22.7 and is mainly composed of acid/basic residues. Currently there is only structural information on the 3 first domains of CD22 (1-300) which have been shown in this figure.

Figure 13:
Figure 13:
Figure 13:
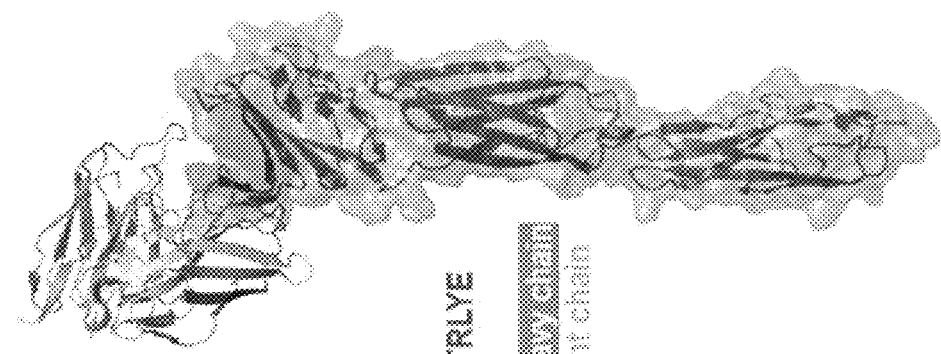

FIG. 13. Structural model of the CD22-Inotuzumab scFv and CD22-hCD22.7 scFv complexes. For hCD22.7 the structure is predicted based on the identified binding epitope of CD22 (in red) and the sequence of the heavy and light chains of the hCD22.7 scFv (blue and pink, respectively). For inotuzumab the structure is predicted based on the identified binding epitope of CD22 (in blue) and the sequence of the heavy and light chains of the inotuzumab scFv (yellow and green, respectively). Inotuzumab modelling have been donw based on the structures 5czx available on the PDB databank that have high sequence identity to both the heavy and light chain (Heavy chain: 90%; Light chain: 92%).

Figure 14:
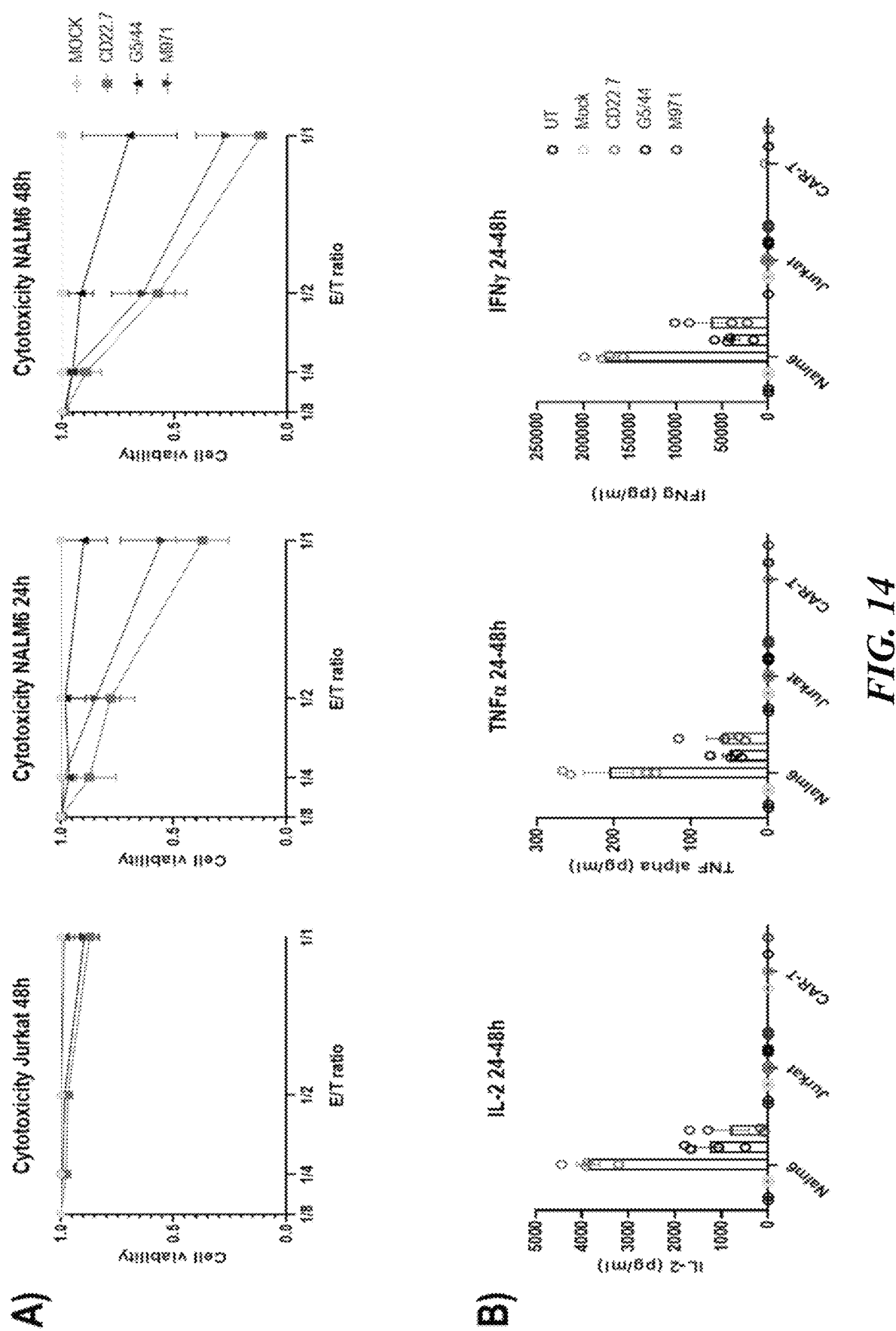

FIG. 14. A) Cytotoxicity assays. Percentage of alive target NALM6 (CD1a+) and Jurkat (CD1a−, as a control) cells after 24-48 hours incubation of $1 \times 10^5$ NALM6 cells with CD22− CAR T cells at the indicated numbers (E:T ratios 1/1, 1/2, 1/4 and 1/8). Results are normalized respect to mock data (data with PBMCs from n=3 healthy donors and from two independent experiments). B) ELISA showing secretion of proinflammatory cytokines by different CD22-CAR T cells after 24-48 hours exposure to NALM6 cells. Data are presented as mean±SEM (n=3 healthy donors).

Figure 15:
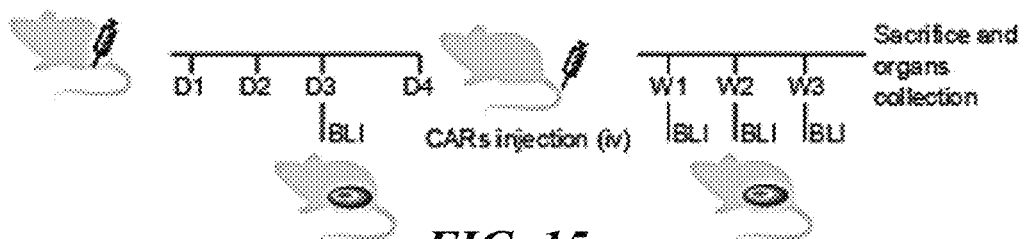

FIG. 15. NSG mice n=4 group were intratibial (IT) injected with 2 $5 \times 10^6$ Luc/GFP expressing NALM 6 (FIGS. 16-18) or SEM (FIGS. 20-22) cells followed 3 days after by a single IV (intra vein) injection of $5 \times 10^6$ MOCK or different CD 22 CARTs. Tumor burden was monitored every 4 days according to BLI (using IVIS imaging). When MOCK treated animals were fully leukemic animals were euthanized and analyzed by using FACS for leukemic burden and CART persistence.

Figure 16:
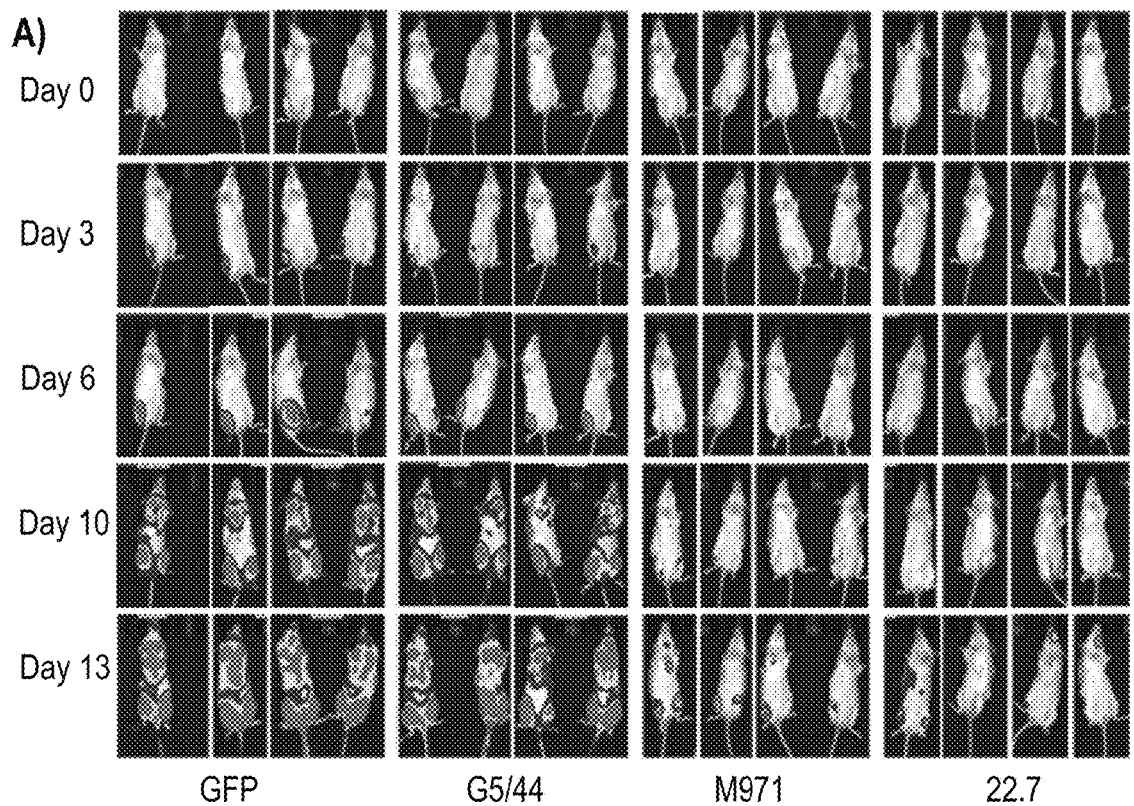

FIG. 16. A) IVIS imaging of tumor burden from NALM6-Luc cells monitored by BLI at the indicated time points. B) Average radiance quantification at the indicated time points. Left, linear scale. Right, logarithmic scale.

Figure 17:
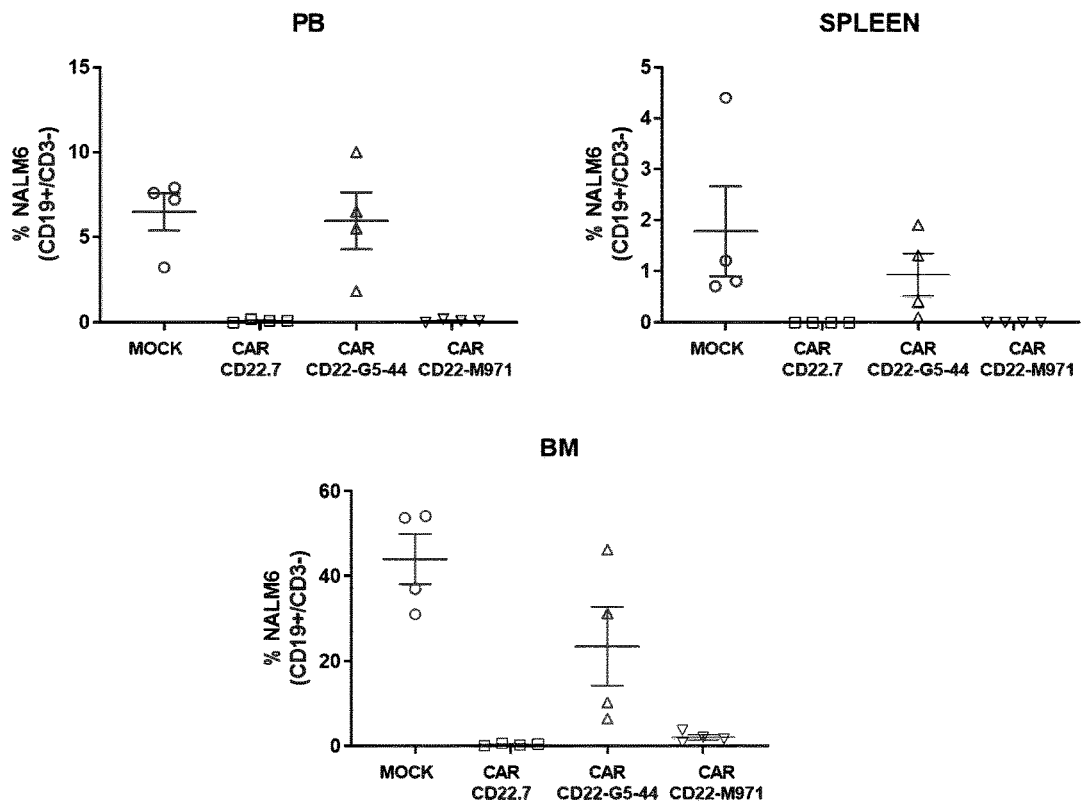

FIG. 17. Leukemic burden (NALM6-Luc cells) at sacrifice in peripheral blood (PB), bone marrow (BM) and spleen.

Figure 18:
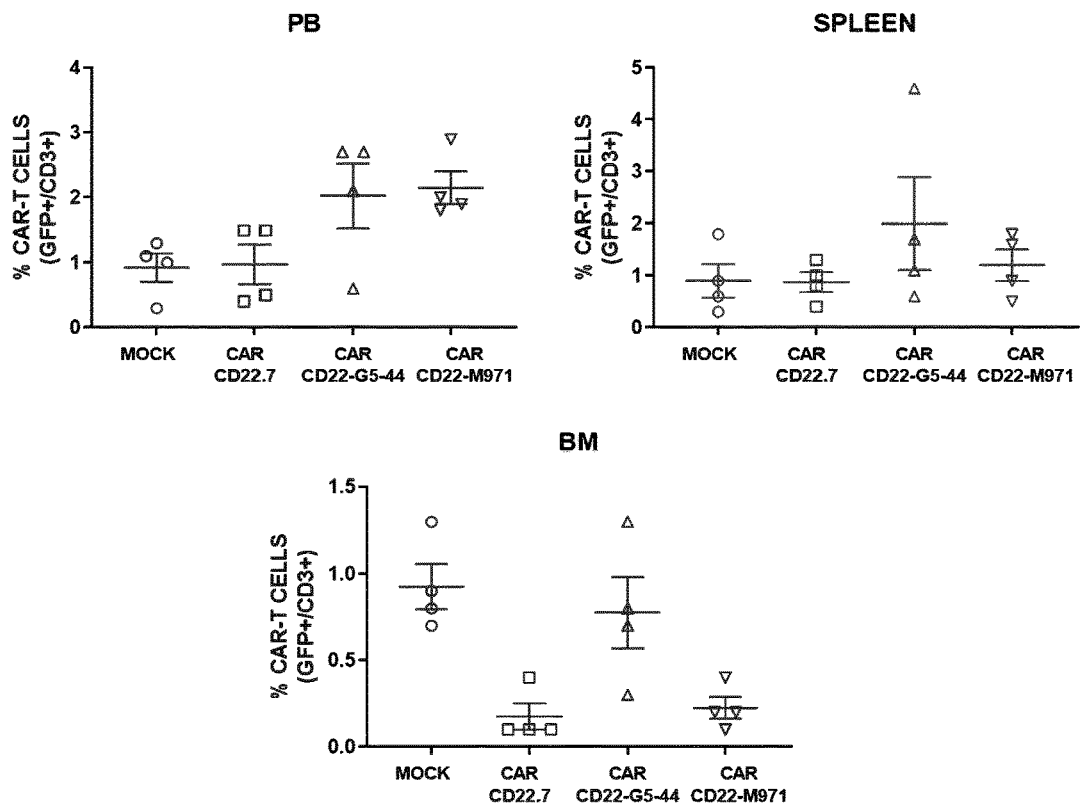

FIG. 18. T-cell persistence in PB, BM and spleen at sacrifice (NALM6-Luc cells).

Figure 19:
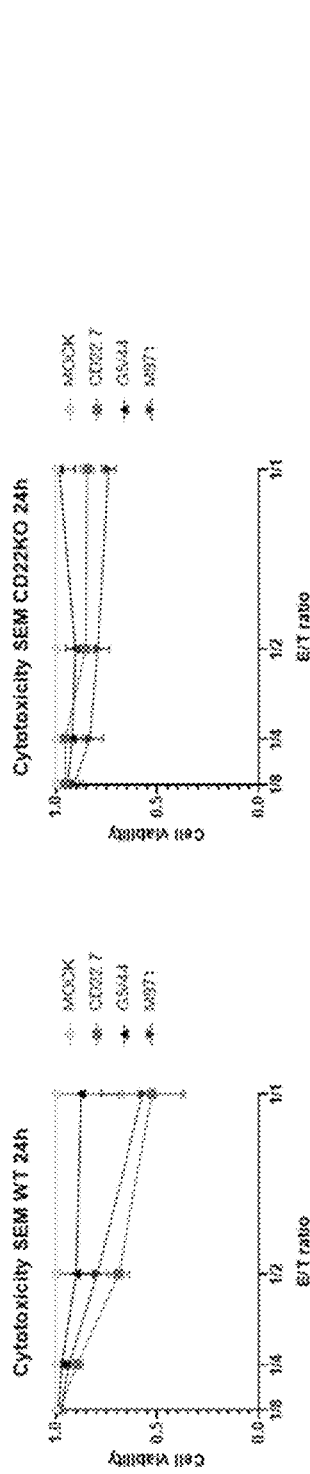
Figure 19:
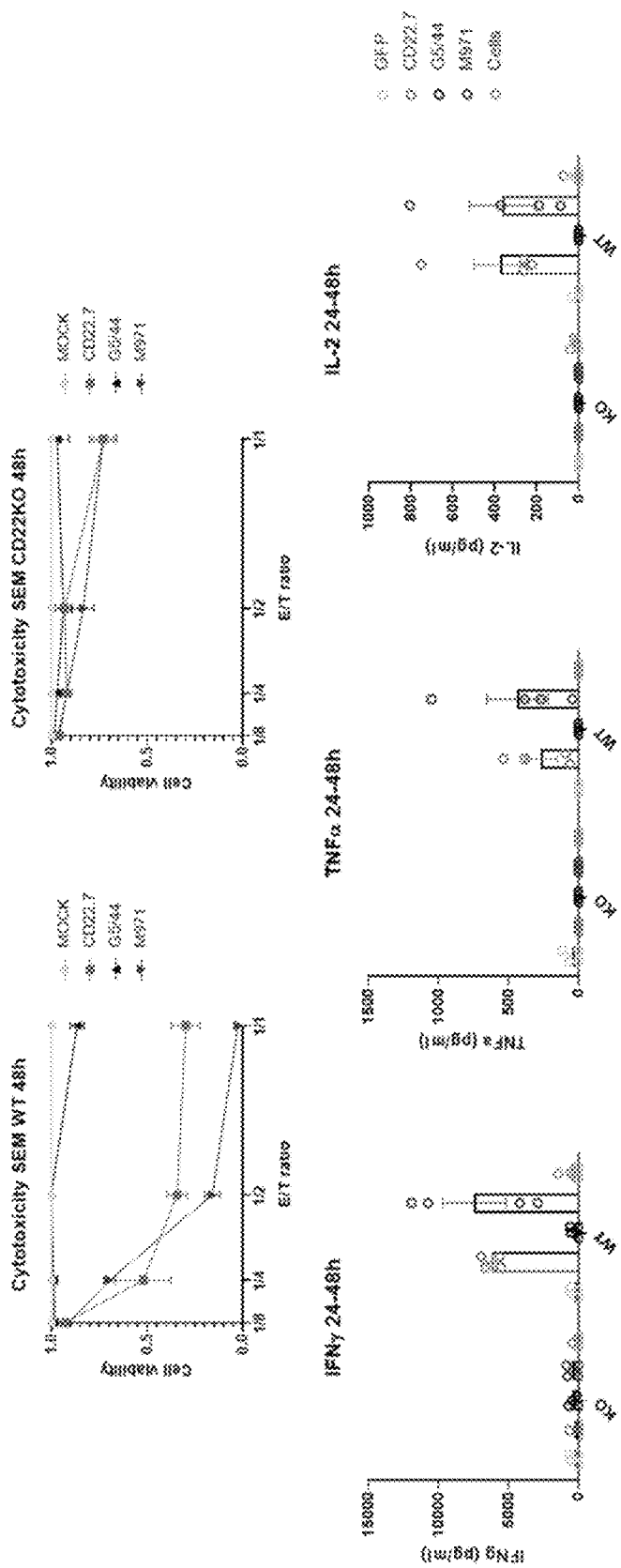

FIG. 19. A) Cytotoxicity assays with $1 \times 10^5$ SEM WT cells (left) and SEM cells KO for CD22 (CD22 KO) as target cells (T) at the indicated times. Percentage of alive target cells after 24 h and 48 hours incubation with effector (E, CD22-CAR T) cells at the indicated cells numbers (E:T ratios 1/1, 1/2, 1/4 and 1/8). Results are normalized respect to mock data (PBMCs from n=3 healthy donors and from one experiment). B) ELISA showing secretion of proinflammatory cytokines by different CD22-CAR T cells after 24-48 hours exposure to SEM cells. Data are presented as mean±SEM (n=3 healthy donors).

Figure 20:
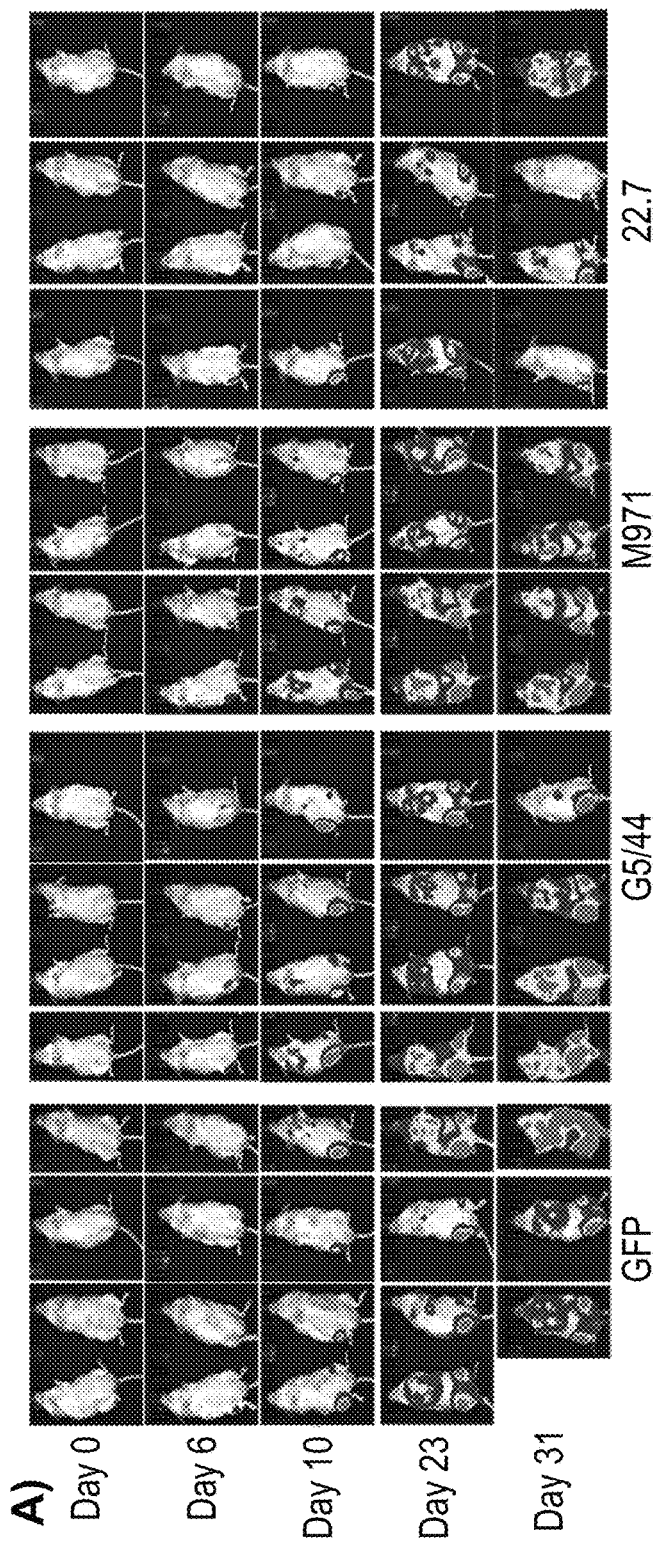
Figure 20:
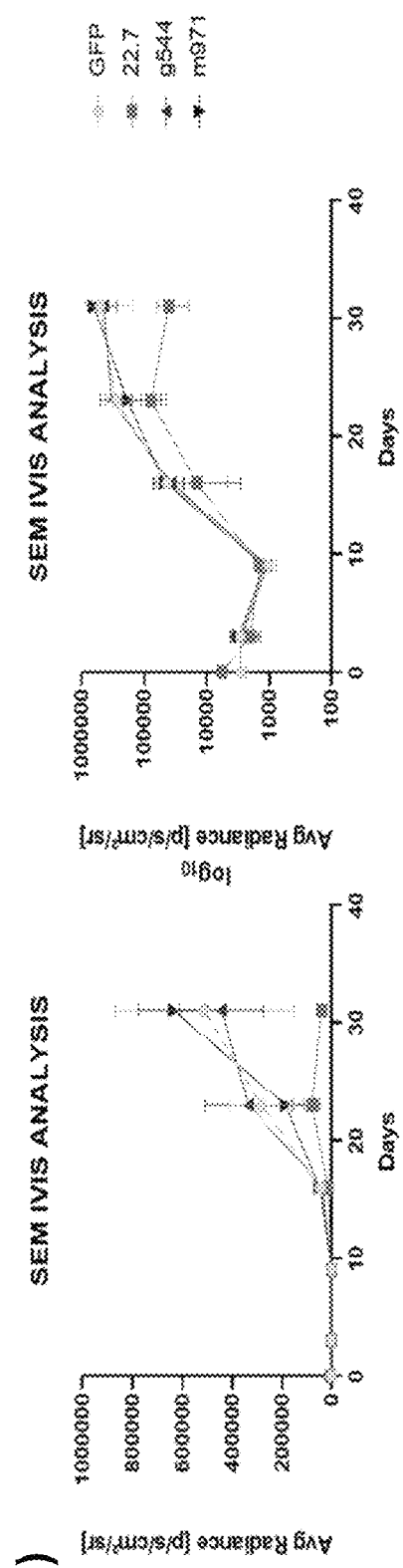

FIG. 20. A) IVIS imaging of tumor burden from SEM-luc cells monitored by BLI at the indicated time points. (B) Average radiance quantification at the indicated time points. Left, linear scale. Right, logarithmic scale.

Figure 21:
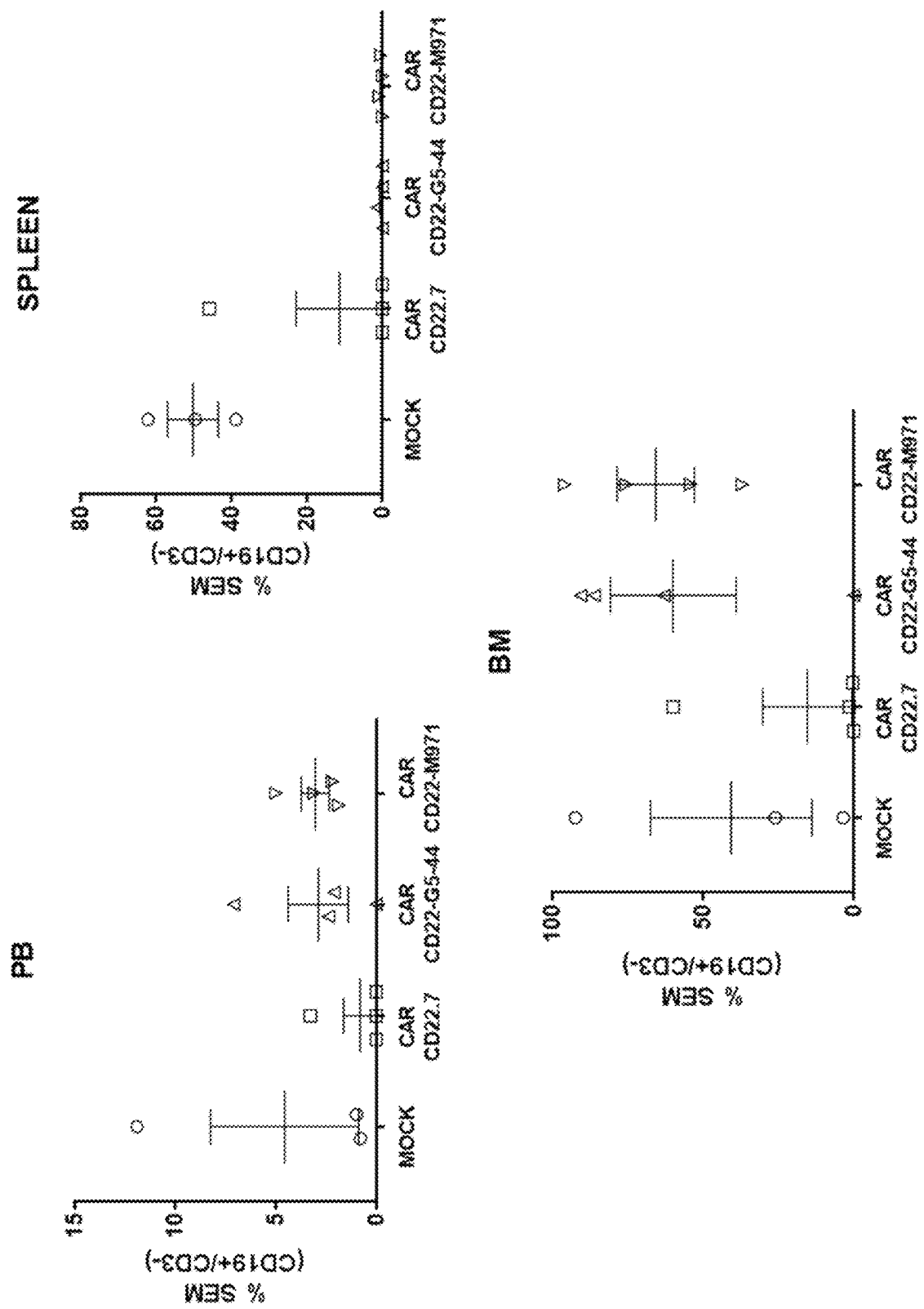

FIG. 21. Leukemic burden at sacrifice in PB, BM and spleen (SEM-Luc cells).

Figure 22:
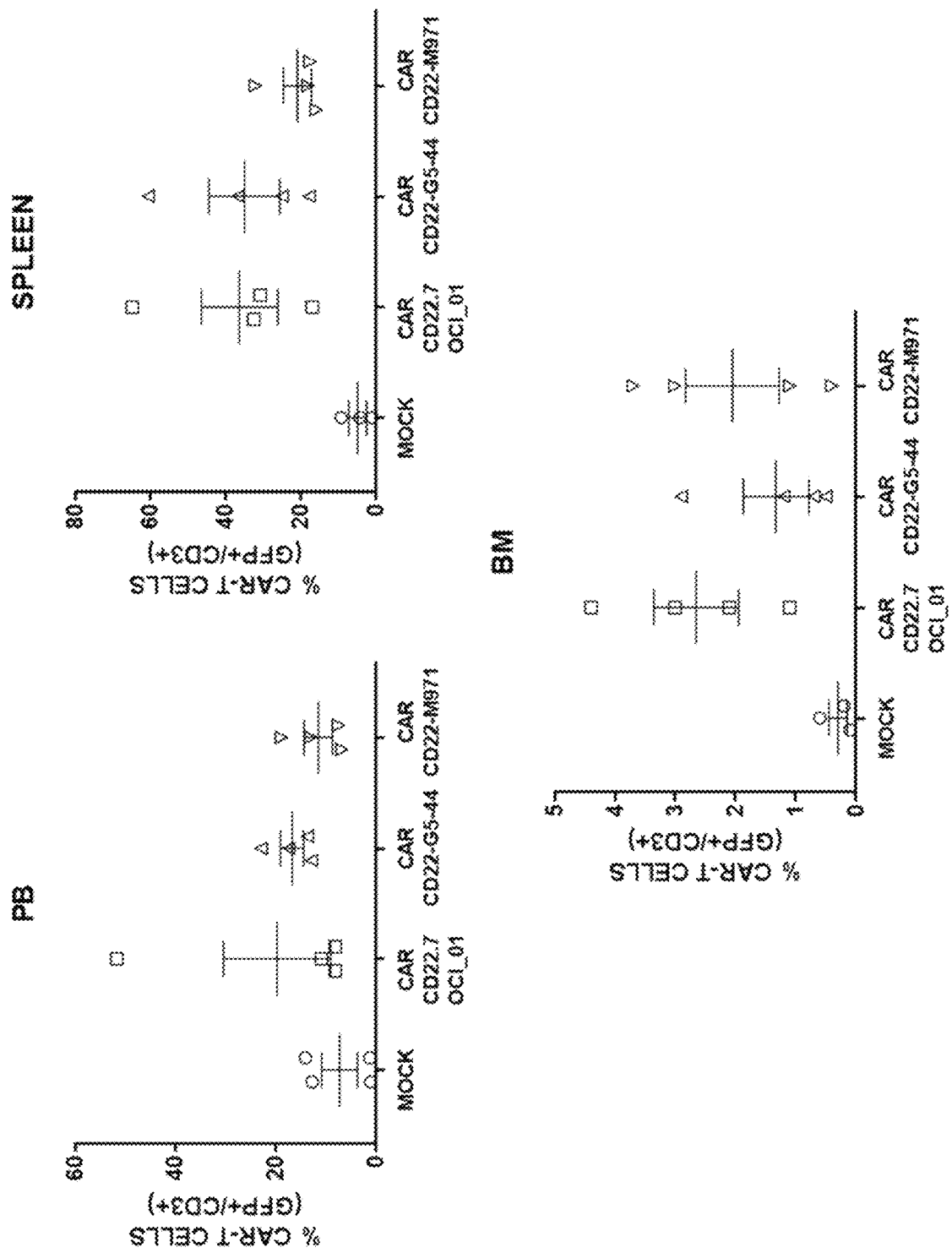

FIG. 22. T-cell persistence in burden at sacrifice in PB, BM and spleen at sacrifice (SEM-Luc cells).

Figure 23:
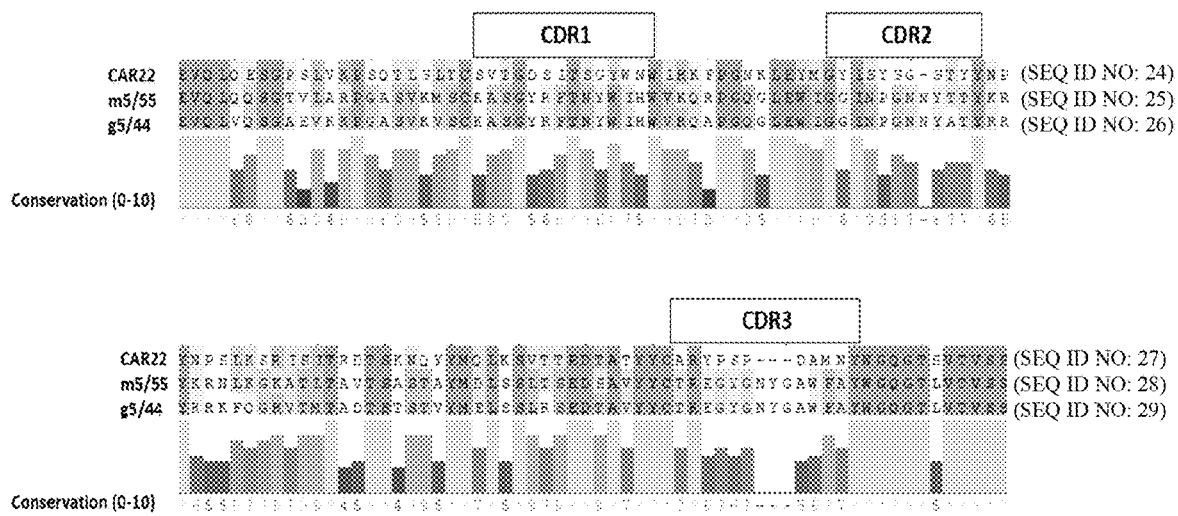
Figure 23:
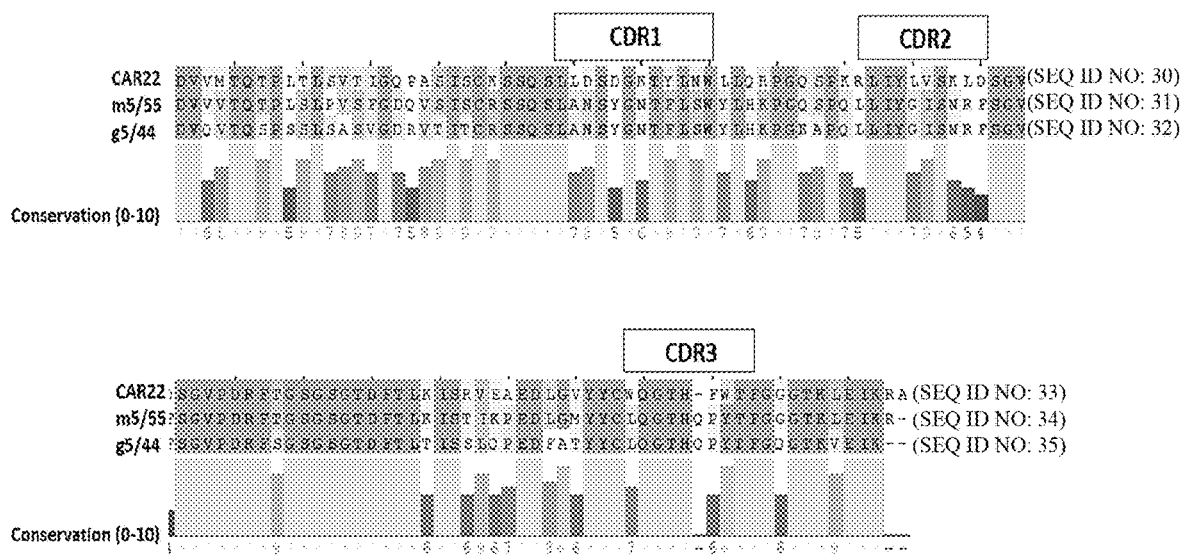

FIG. 23. The scFvs of g5/44 and CD22.7 protein sequencences have been aligned for comparison. A) Comparison of the heavy chains; B) comparison of the light chains of each of these scFvs. The degree of homology is indicated with a score of 1 to 10 for each amino acid (10 is *). As illustrated in this figure, the CDRs of each of these scFvs, g5/44 and CD22.7, are indicated with squares. G5/44 and m5/44 are the human and murine versions of the same antibody (inotuzumab).

Figure 24:
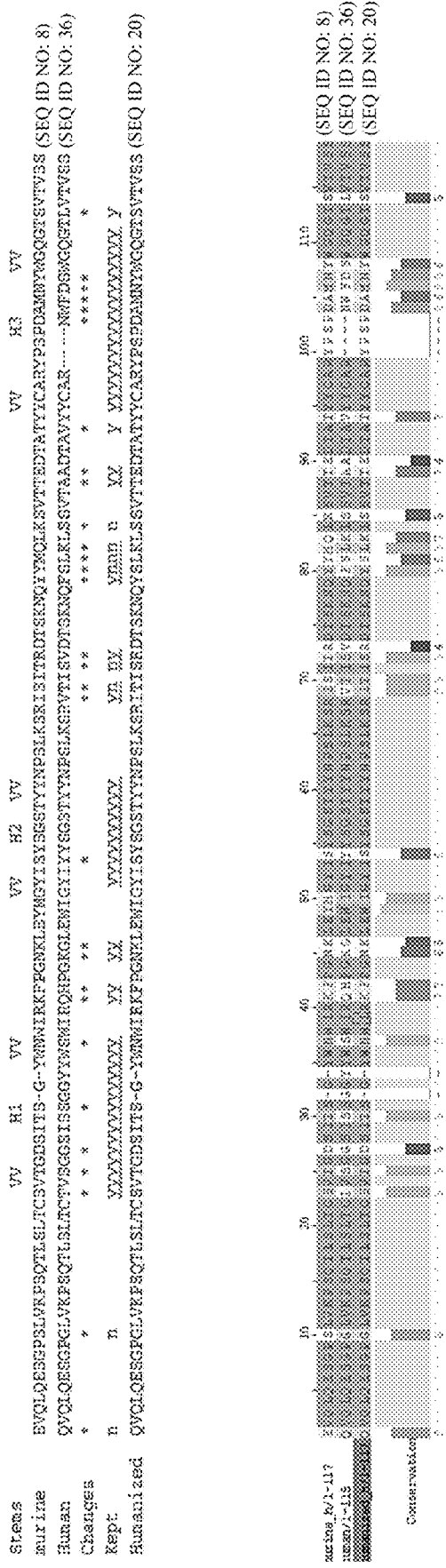
Figure 24:
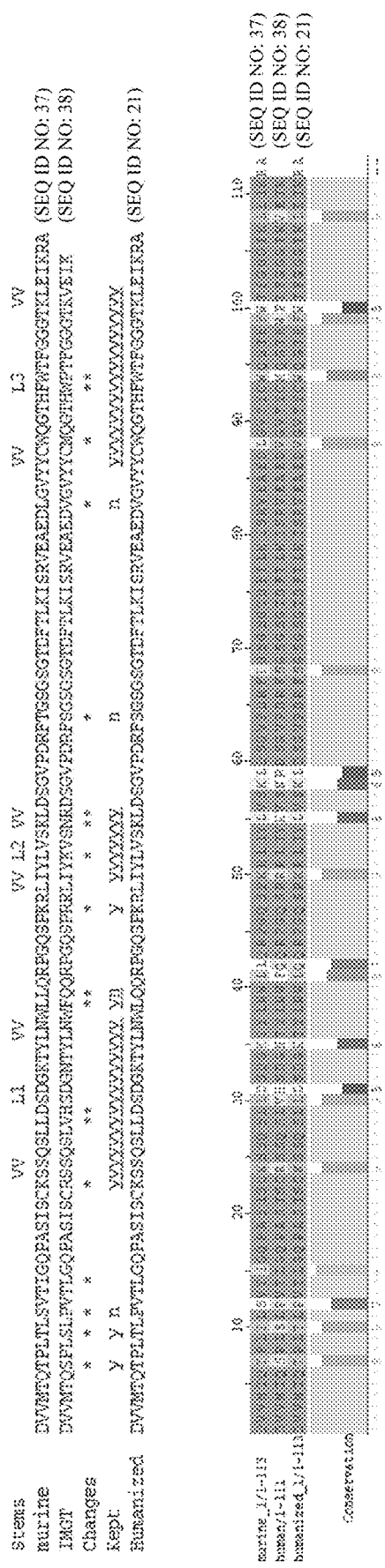
Figure 25:
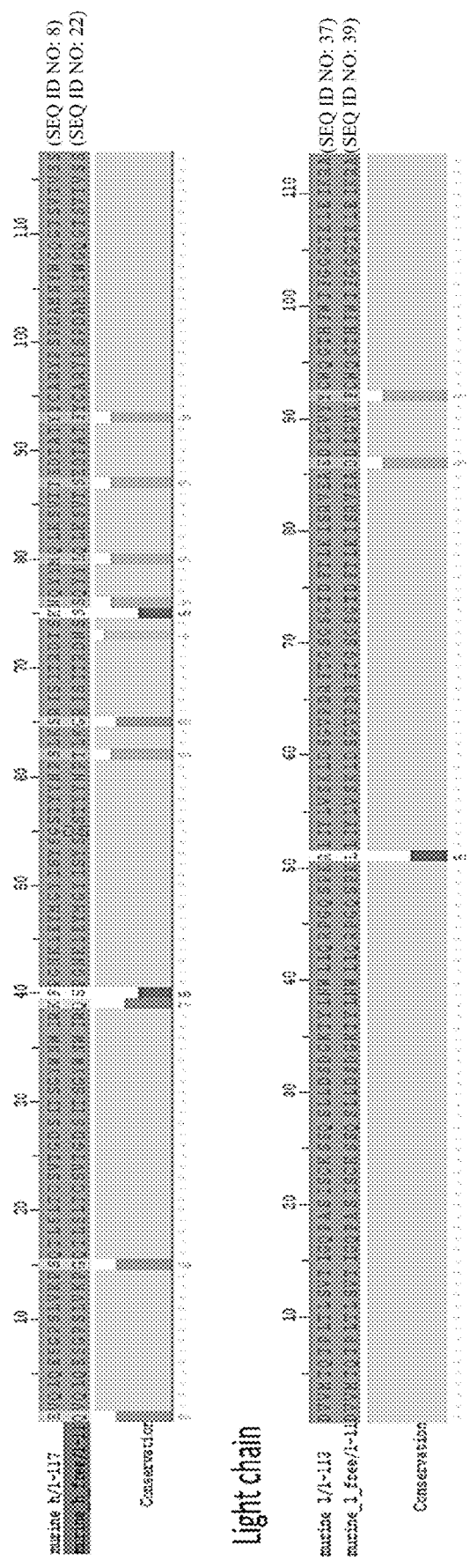

FIG. 24. Humanitation process following the sequence-based (and structure-assisted) CDR-grafting approach. FIG. 24 illustrates a comparison between the murine and humanized verion of the the heavy and light chains of the novel anti-CD22 (clone hCD22.7). FIG. 25A) shows the Humanized heavy chain and FIG. 25 B) shows the Humanized Light chain.

FIG. 25. Humanitation process following the 'De-murinenization' approach. FIG. 25 illustrates the identification of those regions on the murine sequence that are immunologically liable and the individual changes (i.e. point-mutations) on the sequence to remove such liability.

DESCRIPTION OF THE INVENTION

Definitions

"Administering" or "administration of" a medicament to a patient (and grammatical equivalents of this phrase) refers to direct administration, which may be administration to a patient by a medical professional or may be self-administration, and/or indirect administration, which may be the act of prescribing a drug. E.g., a physician who instructs a patient to self-administer a medicament or provides a patient with a prescription for a drug is administering the drug to the patient.

The term "affibody" refers to a protein that is derived from the Z domain of protein A and that been engineered to bind to a specific target (see Frejd & Kim, 2017. Exp Mol Med. 49 (3): e306).

The term "antibody" refers to a molecule comprising at least one immunoglobulin domain that binds to, or is immunologically reactive with, a particular target. The term includes whole antibodies and any antigen binding portion or single chains thereof and combinations thereof; for instance, the term "antibody" in particular includes bivalent antibodies and bivalent bispecific antibodies.

A typical type of antibody comprises at least two heavy chains ("HC") and two light chains ("LC") interconnected by disulfide bonds.

Each "heavy chain" comprises a "heavy chain variable domain" (abbreviated herein as "VH") and a "heavy chain constant domain" (abbreviated herein as "CH"). The heavy chain constant domain typically comprises three constants domains, CH1, CH2, and CH3.

Each "light chain" comprises a "light chain variable domain" (abbreviated herein as "VL") and a "light chain constant domain" ("CL"). The light chain constant domain (CL) can be of the kappa type or of the lambda type. The VH and VL domains can be further subdivided into regions of hypervariability, termed Complementarity Determining Regions ("CDR"), interspersed with regions that are more conserved, termed "framework regions" ("FW").

Each VH and VL is composed of three CDRs and four FWs, arranged from amino-terminus to carboxy-terminus in the following order: FW1, CDR1, FW2, CDR2, FW3, CDR3, FW4. The present disclosure inter alia presents VH and VL sequences as well as the subsequences corresponding to CDR1, CDR2, and CDR3.

The precise amino acid sequence boundaries of a given CDR can be determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme), Al-Lazikani et al., (1997) JMB 273,927-948 ("Chothia" numbering scheme).

Accordingly, a person skilled in the art would understand that the sequences of FW1, FW2, FW3 and FW4 are equally disclosed. For a particular VH, FW1 is the subsequence between the N-terminus of the VH and the N-terminus of H-CDR1, FW2 is the subsequence between the C-terminus of H-CDR1 and the N-terminus of H-CDR2, FW3 is the subsequence between the C-terminus of H-CDR2 and the N-terminus of H-CDR3, and FW4 is the subsequence between the C-terminus of H-CDR3 and the C-terminus of the VH. Similarly, for a particular VL, FW1 is the subsequence between the N-terminus of the VL and the N-terminus of L-CDR1, FW2 is the subsequence between the C-terminus of L-CDR1 and the N-terminus of L-CDR2. FW3 is the subsequence between the C-terminus of L-CDR2 and the N-terminus of L-CDR3, and FW4 is the subsequence between the C-terminus of L-CDR3 and the C-terminus of the VL.

The variable domains of the heavy and light chains contain a region that interacts with a binding target, and this region interacting with a binding target is also referred to as an "antigen-binding site" or "antigen binding site" herein. The constant domains of the antibodies can mediate the binding of the antibody to host tissues or factors, including various cells of the immune system (e.g., effector cells) and the first component (C1q) of the classical complement system. Exemplary antibodies of the present disclosure include typical antibodies, but also bivalent fragments and variations thereof such as a F(ab')2.

As used herein, the term "antibody" encompasses intact polyclonal antibodies, intact monoclonal antibodies, bivalent antibody fragments (such as F(ab')2), multispecific antibodies such as bispecific antibodies, chimeric antibodies, humanized antibodies, human antibodies, and any other modified immunoglobulin molecule comprising an antigen binding site.

An antibody can be of any the five major classes (isotypes) of immunoglobulins: IgA, IgD, IgE, IgG, and IgM, or subclasses thereof (e.g. IgG1, IgG2, IgG3, IgG4, IgA1 and IgA2), based on the identity of their heavy-chain constant domains referred to as alpha, delta, epsilon, gamma, and mu, respectively. The different classes of immunoglobulins have different and well-known subunit structures and three-dimensional configurations.

Antibodies can be naked or conjugated to other molecules such as therapeutic agents or diagnostic agents to form immunoconjugates.

The term "antigen-binding fragment" or "Fab" refers to an antibody fragment comprising one constant and one variable domain of each of the heavy and light chain. A Fab fragment may be obtained by digesting an intact monoclonal antibody with papain.

The term "cancer" refers to a group of diseases, which can be defined as any abnormal benign or malignant new growth of tissue that possesses no physiological function and arises from uncontrolled usually rapid cellular proliferation and has the potential to invade or spread to other parts of the body.

"CD22-positive" cancer, including a "CD22-positive" cancerous disease, is one comprising cells, which have CD22 present at their cell surface. The term "CD22-positive" also refers to a cancer that produces sufficient levels of CD22 at the surface of cells thereof, such that a CAR-comprising cell of the present invention has a therapeutic effect, mediated by the binding of the CAR to CD22. In some embodiments, the CD22-positive cancer is B-cell acute lymphoblastic leukemia (B-ALL), more particularly a CD19⁻ B-ALL relapse.

The term "chimeric antigen receptor" or "CAR" refers to a synthetic receptor that targets T cells to a chosen antigen and reprograms T cell function, metabolism and persistence (see Rivière & Sadelain, 2017. Mol Ther. 25 (5): 1117-1124). Similarly, the term "CART" refers to a T cell that comprises a CAR.

"Combination therapy", "in combination with" or "in conjunction with" as used herein denotes any form of concurrent, parallel, simultaneous, sequential or intermittent treatment with at least two distinct treatment modalities (i.e., compounds, components, targeted agents or therapeutic agents). As such, the terms refer to administration of one treatment modality before, during, or after administration of the other treatment modality to the subject. The modalities in combination can be administered in any order. The therapeutically active modalities are administered together (e.g., simultaneously in the same or separate compositions, formulations or unit dosage forms) or separately (e.g., on the same day or on different days and in any order as according to an appropriate dosing protocol for the separate compositions, formulations or unit dosage forms) in a manner and dosing regimen prescribed by a medical care taker or according to a regulatory agency. In general, each treatment modality will be administered at a dose and/or on a time schedule determined for that treatment modality. Optionally, three or more modalities may be used in a combination therapy. Additionally, the combination therapies provided herein may be used in conjunction with other types of treatment. For example, other anti-cancer treatment may be selected from the group consisting of chemotherapy, surgery, radiotherapy (radiation) and/or hormone therapy, amongst other treatments associated with the current standard of care for the subject.

A "complete response" or "complete remission" or "CR" indicates the disappearance of all target lesions as defined in the RECIST v1.1 guideline. This does not always mean the cancer has been cured.

The term "costimulatory signaling domain" refers to a signaling moiety that provides to T cells a signal which, in addition to the primary signal provided by for instance the CD3ζ chain of the TCR/CD3 complex, mediates a T cell response, including, but not limited to, activation, proliferation, differentiation, cytokine secretion, and the like. A co-stimulatory domain can include all or a portion of, but is not limited to, CD27, CD28, 4-1BB (CD137), OX40 (CD134), CD30, CD40, 1COS, lymphocyte function-associated antigen-1 (LFA-1), CD2, CD7, LIGHT, NKG2C, B7-H3, and a ligand that specifically binds with CD83. In some embodiments, the co-stimulatory signaling domain is an intracellular signaling domain that interacts with other intracellular mediators to mediate a cell response including activation, proliferation, differentiation and cytokine secretion, and the like.

As used herein, the term "effective amount" of an agent, e.g., a therapeutic agent such as a CART, is that amount sufficient to effect beneficial or desired results, for example, clinical results, and, as such, an "effective amount" depends upon the context in which it is being applied. For example, in the context of administering a therapeutic agent that treats T-ALL, an effective amount can reduce the number of cancer cells; reduce the tumor size or burden; inhibit (i.e., slow to some extent and in a certain embodiment, stop) cancer cell infiltration into peripheral organs; inhibit (i.e., slow to some extent and in a certain embodiment, stop) tumor metastasis; inhibit, to some extent, tumor growth; relieve to some extent one or more of the symptoms associated with the cancer; and/or result in a favorable response such as increased progression-free survival (PFS), disease-free survival (DFS), or overall survival (OS), complete response (CR), partial response (PR), or, in some cases, stable disease (SD), a decrease in progressive disease (PD), a reduced time to progression (TTP) or any combination thereof. The term "effective amount" can be used interchangeably with "effective dose," "therapeutically effective amount," or "therapeutically effective dose".

The terms "individual", "patient" or "subject" are used interchangeably in the present application to designate a human being and are not meant to be limiting in any way. The "individual", "patient" or "subject" can be of any age, sex and physical condition. The term "patient in need thereof" usually refers to a patient who suffers from a CD22-positive cancer.

"Infusion" or "infusing" refers to the introduction of a therapeutic agent-containing solution into the body through a vein for therapeutic purposes. Generally, this is achieved via an intravenous bag.

"Intracellular signaling domain" as used herein refers to all or a portion of one or more domains of a molecule (here the chimeric receptor molecule) that provides for activation of a lymphocyte. Intracellular domains of such molecules mediate a signal by interacting with cellular mediators to result in proliferation, differentiation, activation and other effector functions. Examples of intracellular signaling domains for use in a CAR of the invention include the intracellular sequences of the CD3ζ chain, and/or co-receptors that act in concert to initiate signal transduction following CAR engagement, as well as any derivative or variant of these sequences and any synthetic sequence that has the same functional capability. T cell activation can be said to be mediated by two distinct classes of cytoplasmic signaling sequence: those that initiate antigen-dependent primary activation and provide a T cell receptor like signal (primary cytoplasmic signaling sequences) and those that act in an antigen-independent manner to provide a secondary or co-stimulatory signal (secondary cytoplasmic signaling sequences).

Primary cytoplasmic signaling sequences that act in a stimulatory manner may contain signaling motifs which are known as receptor tyrosine-based activation motifs or ITAMs. Examples of ITAM containing primary cytoplasmic signaling sequences include those derived from CD3ζ, FcRγ, CD3γ, CD3δ, CD3ε, CD5, CD22, CD79a, CD79b, and CD66d.

A "partial response" or "PR" refers to at least a 30% decrease in the sum of diameters of target lesions, taking as reference the baseline sum diameter, in response to treatment, as defined in the RECIST v1.1 guideline.

As used herein, "pharmaceutically acceptable carrier" or "pharmaceutically acceptable diluent" means any and all solvents, dispersion media, coatings, antibacterial and antifungal agents, isotonic and absorption delaying agents, compatible with pharmaceutical administration. The use of such media and agents for pharmaceutically active substances is well known in the art. Acceptable carriers, excipients, or stabilizers are nontoxic to recipients at the dosages and concentrations employed and, without limiting the scope of the present invention, include: additional buffering agents; preservatives; co-solvents; antioxidants, including ascorbic acid and methionine; chelating agents such as EDTA; metal complexes (e.g., Zn-protein complexes); biodegradable polymers, such as polyesters; salt-forming counterions, such as sodium, polyhydric sugar alcohols; amino acids, such as alanine, glycine, glutamine, asparagine, histidine, arginine, lysine, ornithine, leucine, 2-phenylalanine, glutamic acid, and threonine; organic sugars or sugar alcohols, such as lactitol, stachyose, mannose, sorbose, xylose, ribose, ribitol, myoinisitose, myoinisitol, galactose, galactitol, glycerol, cyclitols (e.g., inositol), polyethylene glycol; sulfur containing reducing agents, such as urea, glutathione, thioctic acid, sodium thioglycolate, thioglycerol, [alpha]-monothioglycerol, and sodium thio sulfate; low molecular weight proteins, such as human serum albumin, bovine serum albumin, gelatin, or other immunoglobulins; and hydrophilic polymers, such as polyvinylpyrrolidone. Other pharmaceutically acceptable carriers, excipients, or stabilizers, such as those described in Remington's Pharmaceutical Sciences 16th edition, Osol, A. Ed. (1980) may also be included in a pharmaceutical composition described herein, provided that they do not adversely affect the desired characteristics of the pharmaceutical composition.

"Progressive disease" or "disease that has progressed" refers to the appearance of one more new lesions or tumors and/or the unequivocal progression of existing non-target lesions as defined in the RECIST v1.1 guideline. Progressive disease or disease that has progressed can also refer to a tumor growth of more than 20 percent since treatment began, either due to an increase in mass or in spread of the tumor.

"Progression free survival" (PFS) refers to the time from enrollment to disease progression or death. PFS is generally measured using the Kaplan-Meier method and Response Evaluation Criteria in Solid Tumors (RECIST) 1.1 standards. Generally, progression free survival refers to the situation wherein a patient remains alive, without the cancer getting worse.

The term "RECIST" means Response Evaluation Criteria in Solid Tumours. RECIST guideline, criteria, or standard, describes a standard approach to solid tumor measurement and definitions for objective assessment of change in tumor size for use in adult and pediatric cancer clinical trials. RECIST v1.1 means version 1.1 of the revised RECIST guideline and it is published in European Journal of Cancers 45 (2009) 228-247.

The term "respond favorably" generally refers to causing a beneficial state in a subject. With respect to cancer treatment, the term refers to providing a therapeutic effect on the subject. Positive therapeutic effects in cancer can be measured in a number of ways (See, Weber, 2009. J Nucl Med. 50 Suppl 1: 1S-10S). For example, tumor growth inhibition, molecular marker expression, serum marker expression, and molecular imaging techniques can all be used to assess therapeutic efficacy of an anti-cancer therapeutic. With respect to tumor growth inhibition, according to NCI standards, a T/C≤42% is the minimum level of anti-tumor activity. A T/C<10% is considered a high anti-tumor activity level, with T/C (%)=Median tumor volume of the treated/Median tumor volume of the control×100. A favorable response can be assessed, for example, by increased progression-free survival (PFS), disease-free survival (DFS), or overall survival (OS), complete response (CR), partial response (PR), or, in some cases, stable disease (SD), a decrease in progressive disease (PD), a reduced time to progression (TTP) or any combination thereof.

The term "sequence identity" refers to a percentage value obtained when two sequences are compared using a pairwise sequence alignment tool. In the present case, the sequence identity is obtained using the global alignment tool "EMBOSS Needle" using the default settings (Rice et al., 2000. Trends Genet. 16 (6): 276-7; Li et al., 2015. Nucleic Acids Res. 43 (W1): W580-4).

The term "single-chain antigen-binding fragment" or "scFab" refers to a fusion protein comprising one variable and one constant domain of the light chain of an antibody attached to one variable and one constant domain of the heavy chain of an antibody, wherein the heavy and light chains are linked together through a short peptide.

The term "single-chain variable fragment" or "scFv" refers to a fusion protein comprising the variable domains of the heavy chain and light chain of an antibody linked to one another with a peptide linker. The term also includes a disulfide stabilized Fv (dsFv). Methods of stabilizing scFvs with disulfide bonds are disclosed in Reiter et al., 1996. Nat Biotechnol. 14 (10): 1239-45.

"Stable disease" refers to disease without progression or relapse as defined in the RECIST v1.1 guideline. In stable disease there is neither sufficient tumor shrinkage to qualify for partial response, nor sufficient tumor increase to qualify as progressive disease.

"Time to Tumor Progression" (TTP) is defined as the time from enrollment to disease progression. TTP is generally measured using the RECIST v1.1 criterion.

The terms "treatment" and "therapy", as used in the present application, refer to a set of hygienic, pharmacological, surgical and/or physical means used with the intent to cure and/or alleviate a disease and/or symptom with the goal of remediating the health problem. The terms "treatment" and "therapy" include preventive and curative methods, since both are directed to the maintenance and/or reestablishment of the health of an individual or animal. Regardless of the origin of the symptoms, disease and disability, the administration of a suitable medicament to alleviate and/or cure a health problem should be interpreted as a form of treatment or therapy within the context of this application.

DESCRIPTION

CD19-CAR T cell therapy has shown indisputable potential in R/R B-ALL. Unfortunately, however, 40-60% of patients ultimately relapse because of poor CAR T cell persistence or the emergence of CD19⁻ B-ALL clones. Very few therapeutic options exist for CD19⁻ B-ALL relapse, and so novel strategies, including the development of new target antigens, should be explored to enhance CAR T cell function and persistence. CD22 is a pan B-cell antigen, and is an attractive alternative to CD19 for CAR T cell therapy because it will target CD19⁻ relapses, which usually retain CD22 expression.

In this line, several CD22-CARs have been reported to induce clinical remission in 70% of R/R B-ALL patients either naïve or resistant to CD19-CAR T cells. But, phase I clinical studies based on different CD22 scFvs (m971 vs YK-CD22BB-002) have reported conflicting results concerning CD22 loss and immune escape upon CD22-CAR T cell contact. A previous comprehensive comparison of several anti-CD22 moAb indicated that epitope selection is crucial for the antileukemic activity of the CD22-CAR, and that the m971 scFv, which targets the most membrane-proximal Ig extracellular domains of CD22 (5 to 7), seems more potent than BL22 and HA22 scFvs, which target the proximal Ig domain 3.

In this invention, we report the pre-clinical development of a new CD22 targeting-moiety, preferably an antiCD22-antibody, more preferably an antiCD22-antibody fragment selected from the list consisting of scFv, Fab, and scFab, that can contribute to the widening of the limited state-of-the-art arsenal of CD22-CARs. For this purpose, three CD22 reactive hybridomas were generated using conventional moAb generation techniques, rendering three very specific IgG1 isotype anti-CD22 moAbs, finally selecting the hCD22.7 clone for the construction of the CAR. To the best of our knowledge, this hCD22.7 scFv is the first used for CD22-CAR development that recognizes the epitope listed in SEQ ID NO 15 from the most membrane-distal Ig extracellular domain 1 of CD22. These membrane-distal epitope CD22-CAR T cells showed high-performance in vitro and in vivo using clinically relevant primary B-ALL cells. In fact, they were very efficient in controlling several B-ALL PDXs with diverse aggressiveness, coupled to long-term (up to 26 weeks) T cell persistence. Importantly, our experimental design used a rigorous "mock" control where all the structural, cytolytic and co-stimulatory motifs are expressed in the effector T cells, but without the extracellular anti-CD22 scFv region. This intracellular mock (mock-IC) validates the high specificity and sensitivity of our CD22-CAR.

As shown in the example provided herein, the expression level of CD22 was used to classify nine primary B-ALL samples as $CD22^{high}$ and $CD22^{low}$, and we show that all B-ALL primary cells were efficiently recognized and eliminated in vitro by CD22-CAR. Furthermore, the CD22-CAR T cells performed competently in controlling in vivo several B-ALL PDXs with varied aggressiveness for a long period (up to 26 weeks), which was coupled to long-term T cell persistence, and without signs of CD22 antigen loss by the few surviving/resistant B-ALL cells.

We have thus generated, ab initio, one CD22-CAR that, unlike the existing CD22-CARS, appears to recognize the first Ig extracellular domain of the CD22 antigen, the farthest domain from the membrane.

In the context of the present invention, "the first Ig extracellular domain of the CD22 antigen, the farthest domain from the membrane" is understood as the CD22 domain with the following aminoacid sequence (SEQ ID NO 14)
[DSSKWVFEHPETLYAWEGACVWIPCTYRALDGDLESFILFHNPEYNKN
TSKFDGTRLYESTKDGKVPSEQKRVQFLGDKNKNCTLSIHPVHLNDSGQ
LGLRMESKTEKWMERIHLNVSE].

In the context of the present invention, "the epitope from the first Ig extracellular domain of the CD22 antigen, the farthest domain from the membrane" is understood as the epitope region with the following aminoacid sequence: [ESTKDGKVP] (SEQ ID NO 15)

Such CD22-CAR performs efficiently in vitro and in vivo using clinically relevant patient samples of B-ALL. In particular, our hCD22.7-derived membrane distal-targeting CAR fully controls the disease in vivo using different PDXs, which coupled to the persistence of CD22-CAR.

Therefore, a first aspect of the invention provides a CD22 targeting-moiety, wherein the CD22 targeting-moiety has binding affinity for the first Ig extracellular domain of the CD22 antigen, the farthest domain from the membrane, specifically it has binding affinity against SEQ ID NO 14, more particularly, it has binding affinity against SEQ ID NO 15.

In a preferred embodiment of the invention, the first aspect of the invention provides a chimeric antigen receptor (CAR) comprising an extracellular domain comprising a CD22 targeting-moiety, a transmembrane domain, and an intracellular signaling domain, wherein the CD22 targeting-moiety has binding affinity for the first Ig extracellular domain of the CD22 antigen, the farthest domain from the membrane, specifically it has binding affinity against SEQ ID NO 14, more particularly, it has binding affinity against SEQ ID NO 15. Binding molecules that bind specifically to the first Ig extracellular domain of the CD22 antigen, the farthest domain from the membrane, more particularly, to SEQ ID NO 15, are deemed to be especially useful or suitable in the diagnosis and treatment of the disorders mentioned above, in particular for B-cell acute lymphoblastic leukemia (B-ALL), more particularly for CD19⁻ B-ALL relapse.

Phage display and combinatorial methods for generating the above mentioned antibodies are known in the art (as described in, e.g., Ladner et al. U.S. Pat. No. 5,223,409; Kang et al. International Publication No. WO 92/18619; Dower et al. International Publication No. WO 91/17271; Winter et al. International Publication WO 92/20791; Markland et al. International Publication No. WO 92/15679; Breitling et al. International Publication WO 93/01288; McCafferty et al. International Publication No. WO 92/01047; Garrard et al. International Publication No. WO 92/09690; Ladner et al. International Publication No. WO 90/02809; Fuchs et al. (1991) Bio/Technology 9:1370-1372; Hay et al. (1992) Hum Antibod Hybridomas 3:81-85; Huse et al. (1989) Science 246:1275-1281; Griffths et al. (1993) EMBO J 12:725-734; Hawkins et al. (1992) J Mol Biol 226:889-896; Clackson et al. (1991) Nature 352:624-628; Gram et al. (1992) PNAS 89:3576-3580; Garrad et al. (1991) Bio/Technology 9:1373-1377; Hoogenboom et al. (1991) Nuc Acid Res 19:4133-4137; and Barbas et al. (1991) PNAS 88:7978-7982, the contents of all of which are incorporated by reference herein).

In some embodiments, the CD22 targeting-moiety is an antibody, scFv, Fab, or scFab comprising a VL domain and VH domain, wherein said VL domain comprises LCDR1, LCDR2 and LCDR3 polypeptides and said VH domain comprises HCDR1, HCDR2 and HCDR3 polypeptides, and LCDR1 consists of [QSLLDSDGKTY] (SEQ ID NO: 1), LCDR2 consists of [LVS] (SEQ ID NO: 2), LCDR3 consists of [WQGTHFPWT] (SEQ ID NO: 3), HCDR1 consists of [GDSITSGY] (SEQ ID NO: 4), HCDR2 consists of [ISYS-GST] (SEQ ID NO: 5), and HCDR3 consists of [ARYPSP-DAMNY] (SEQ ID NO: 6).

In some embodiments, the CD22 targeting-moiety is an antibody, F(AB')2, scFv, Fab, or scFab comprising a VL domain and VH domain, wherein the VL domain consists of SEQ ID NO: 7 and the VH domain consists of SEQ ID NO: 8. In some further embodiments, the CD22 targeting-moiety is an antibody, F(AB')2, scFv, Fab, or scFab comprising a VL domain and VH domain, wherein the VL domain consists of SEQ ID NO: 23 and the VH domain consists of SEQ ID NO: 22. In some further embodiments, the CD22 targeting-moiety is an antibody, F(AB')2, scFv, Fab, or scFab comprising a VL domain and VH domain, wherein the VL domain consists of SEQ ID NO: 21 and the VH domain consists of SEQ ID NO: 20.

In some embodiments, the CD22 targeting-moiety is a scFv comprising a VL domain and VH domain, wherein the VL domain consists of SEQ ID NO: 7 and the VH domain consists of SEQ ID NO: 8. In some further embodiments, the CD22 targeting-moiety is a scFv comprising a VL domain and VH domain, wherein the VL domain consists of SEQ ID NO: 23 and the VH domain consists of SEQ ID NO: 22. In some further embodiments, the CD22 targeting-moiety is a scFv comprising a VL domain and VH domain, wherein the VL domain consists of SEQ ID NO: 21 and the VH domain consists of SEQ ID NO: 20.

VL domain
(SEQ ID NO: 7)
[DVVMTQTPLTLSVTIGQPASISCKSSQSLLDSDGKTYLNWLLQRPGQS
PKRLIYLVSKLDSGVPDRFTGSGSGTDFTLKISRVEAEDLGVYYCWQGT
HFPWTFGGGTKLEIKRA]

```
VH domain
                                          (SEQ ID NO: 8)
[EVQLQESGPSLVKPSQTLSLTCSVTGDSITSGYWNWIRKFPGNKLEYM
GYISYSGSTYYNPSLKSRISITRDTSKNQYYMQLKSVTTEDTATYYCAR
YPSPDAMNYWGQGTSVTVSS]
```

In some embodiments, the CD22 targeting-moiety is a scFv comprising or consisting of SEQ ID NO: 9.

```
scFv derived from clone hCD22.7
                                          (SEQ ID NO: 9)
[EVQLQESGPSLVKPSQTLSLTCSVTGDSITSGYWNWIRKFPGNKLEYM

GYISYSGSTYYNPSLKSRISITRDTSKNQYYMQLKSVTTEDTATYYCAR

YPSPDAMNYWGQGTSVTVSSGGGGSGGGGSGGGGSGGGGSDVVMTQTPL

TLSVTIGQPASISCKSSQSLLDSDGKTYLNWLLQRPGQSPKRLIYLVSK

LDSGVPDRFTGSGSGTDFTLKISRVEAEDLGVYYCWQGTHFPWTFGGGT

KLEIKRA]
```

In a preferred embodiment of the first aspect of the invention, the transmembrane domain of the chimeric antigen receptor (CAR) may be derived either from a natural or a synthetic source. When the source is natural, the domain may be derived from any membrane-bound or transmembrane protein. Transmembrane regions may comprise at least the transmembrane region(s) of the α-, β- or ζ-chain of CD28, CD3, CD45, CD4, CD8, CD9, CD16, CD22, CD33, CD37, CD64, CD80, CD86, CD134, CD137, or CD154.

A transmembrane domain may be synthetic or a variant of a naturally occurring transmembrane domain. In some embodiments, synthetic or variant transmembrane domains comprise predominantly hydrophobic residues such as leucine and valine.

In some embodiments, the transmembrane domain comprises the transmembrane domain of CD28, CD3, CD45, CD4, CD8, CD9, CD16, CD22, CD33, CD37, CD64, CD80, CD86, CD134, CD137, CD154, or a variant thereof, wherein the variant thereof has a 95% sequence identity.

In some embodiments, the transmembrane domain comprises the transmembrane domain of CD28, CD3, CD45, CD4, CD8, CD9, CD16, CD22, CD33, CD37, CD64, CD80, CD86, CD134, CD137, CD154, or a variant thereof, wherein the variant thereof has a 98% sequence identity.

In some embodiments, the transmembrane domain comprises the transmembrane domain of CD28, CD3, CD45, CD4, CD8, CD9, CD16, CD22, CD33, CD37, CD64, CD80, CD86, CD134, CD137, or CD154.

In some embodiments, the transmembrane domain comprises the transmembrane domain of CD8 or a variant thereof, wherein the variant thereof has a 95% sequence identity.

In some embodiments, the transmembrane domain comprises the transmembrane domain of CD8 or a variant thereof, wherein the variant thereof has a 98% sequence identity.

In some embodiments, the transmembrane domain comprises the transmembrane domain of CD8.

In some embodiments, the transmembrane domain comprises SEQ ID NO: 10 or a sequence that has 95% sequence identity to SEQ ID NO: 10.

In some embodiments, the transmembrane domain comprises SEQ ID NO: 10 or a sequence that has 98% sequence identity to SEQ ID NO: 10.

In some embodiments, the transmembrane domain comprises SEQ ID NO: 10. In some embodiments, the transmembrane domain consists of SEQ ID NO: 10.

```
Transmembrane domain derived from CD8
                                          (SEQ ID NO: 10)
[TTTPAPRPPTPAPTIASQPLSLRPEACRPAAGGAVHTRGLDFACDIYI
WAPLAGTCGVLLLSLVITLYC]
```

In another preferred embodiment, the intracellular signaling domain of the chimeric antigen receptor (CAR) provides for the activation of at least one function of the cell expressing the CAR upon binding to the ligand expressed on tumor cells. In some embodiments, the intracellular signaling domain contains one or more intracellular signaling domains. In some embodiments, the intracellular signaling domain is a portion of and/or a variant of an intracellular signaling domain that provides for activation of at least one function of the CAR-comprising cell.

In some embodiments, the intracellular signaling domain comprises the intracellular domain of CD3ζ, FcRγ, CD3γ, CD3δ, CD3ε, CD5, CD22, CD79a, CD79b, CD66b, or a variant thereof, wherein the variant thereof has a 95% sequence identity.

In some embodiments, the intracellular signaling domain comprises the intracellular domain of CD3ζ, FcRγ, CD3γ, CD3δ, CD3ε, CD5, CD22, CD79a, CD79b, CD66b, or a variant thereof, wherein the variant thereof has a 98% sequence identity.

In some embodiments, the intracellular signaling domain comprises the intracellular domain of CD3ζ, FcRγ, CD3γ, CD3δ, CD3ε, CD5, CD22, CD79a, CD79b or CD66b.

In some embodiments, the intracellular signaling domain comprises the intracellular domain of CD3ζ or a variant thereof, wherein the variant thereof has a 95% sequence identity.

In some embodiments, the intracellular signaling domain comprises the intracellular domain of CD3ζ or a variant thereof, wherein the variant thereof has a 98% sequence identity.

In some embodiments, the intracellular signaling domain comprises the intracellular domain of CD3ζ.

In some embodiments, the intracellular signaling domain comprises SEQ ID NO: 11 or a sequence that has 95% sequence identity to SEQ ID NO: 11.

In some embodiments, the intracellular signaling domain comprises SEQ ID NO: 11 or a sequence that has 98% sequence identity to SEQ ID NO: 11.

In some embodiments, the intracellular signaling domain comprises SEQ ID NO: 11 or a sequence that has 99% sequence identity to SEQ ID NO: 11.

In some embodiments, the intracellular signaling domain comprises SEQ ID NO: 11.

In some embodiments, the intracellular signaling domain consists of SEQ ID NO: 11.

```
Intracellular signaling domain derived from CD37
                                          (SEQ ID NO: 11)
[RVKFSRSADAPAYQQGQNQLYNELNLGRREEYDVLDKRRGRDPEMGGK
PQRRKNPQEGLYNELQKDKMAEAYSEIGMKGERRRGKGHDGLYQGLSTA
TKDTYDALHMQALPPR]
```

In some embodiments, the CAR may further comprise a costimulatory signaling domain. In some embodiments, the costimulatory signaling domain comprises the intracellular domain of CD27, CD28, CD137 (also known as human 4-1BB), CD134, CD30, CD40, lymphocyte function-associated antigen-1 (LFA-1), CD2, CD7, LIGHT, NKG2C, CD276 or a variant thereof, wherein the variant thereof has a 95% sequence identity.

In some embodiments, the costimulatory signaling domain comprises the intracellular domain of CD27, CD28, CD137 (also known as human 4-1BB), CD134, CD30, CD40, lymphocyte function-associated antigen-1 (LFA-1), CD2, CD7, LIGHT, NKG2C, CD276 or a variant thereof, wherein the variant thereof has a 98% sequence identity.

In some embodiments, the costimulatory signaling domain comprises the intracellular domain of CD27, CD28, CD137, CD134, CD30, CD40, lymphocyte function-associated antigen-1 (LFA-1), CD2, CD7, LIGHT, NKG2C, or CD276.

In some embodiments, the costimulatory signaling domain comprises the intracellular domain of CD137 or a variant thereof, wherein the variant thereof has a 95% sequence identity.

In some embodiments, the costimulatory signaling domain comprises the intracellular domain of CD137 or a variant thereof, wherein the variant thereof has a 98% sequence identity.

In some embodiments, the costimulatory signaling domain comprises the intracellular domain of CD137.

In some embodiments, the costimulatory signaling domain comprises SEQ ID NO: 12 or a sequence that has 95% sequence identity to SEQ ID NO: 12.

In some embodiments, the costimulatory signaling domain comprises SEQ ID NO: 12 or a sequence that has 98% sequence identity to SEQ ID NO: 12.

In some embodiments, the costimulatory signaling domain comprises SEQ ID NO: 12 or a sequence that has 99% sequence identity to SEQ ID NO: 12.

In some embodiments, the costimulatory signaling domain comprises SEQ ID NO: 12. In some embodiments, the costimulatory signaling domain consists of SEQ ID NO: 12.

```
Costimulatory signaling domain derived from CD137
                                    (SEQ ID NO: 12)
[KRGRKKLLYIFKQPFMRPVQTTQEEDGCSCRFPEEEEGGCEL]
```

In some embodiments, the CAR comprises:
(i) a scFv comprising a VL domain and VH domain, wherein said VL domain comprises LCDR1, LCDR2 and LCDR3 polypeptides and said VH domain comprises HCDR1, HCDR2 and HCDR3 polypeptides, and LCDR1 consists of SEQ ID NO: 1, LCDR2 consists of SEQ ID NO: 2, LCDR3 consists of SEQ ID NO: 3, HCDR1 consists of SEQ ID NO: 4, HCDR2 consists of SEQ ID NO: 5, and HCDR3 consists of SEQ ID NO: 6;
(ii) a transmembrane domain comprising SEQ ID NO: 10 or a sequence that has 95% sequence identity to SEQ ID NO: 10;
(iii) an intracellular signaling domain comprising SEQ ID NO: 11 or a sequence that has 95% sequence identity to SEQ ID NO: 11; and
(iv) a costimulatory signaling domain comprising SEQ ID NO: 12 or a sequence that has 95% sequence identity to SEQ ID NO: 12.

In some embodiments, the CAR comprises:
(i) a scFv comprising a VL domain and VH domain, wherein said VL domain comprises LCDR1, LCDR2 and LCDR3 polypeptides and said VH domain comprises HCDR1, HCDR2 and HCDR3 polypeptides, and LCDR1 consists of SEQ ID NO: 1, LCDR2 consists of SEQ ID NO: 2, LCDR3 consists of SEQ ID NO: 3, HCDR1 consists of SEQ ID NO: 4, HCDR2 consists of SEQ ID NO: 5, and HCDR3 consists of SEQ ID NO: 6;
(ii) a transmembrane domain comprising SEQ ID NO: 10 or a sequence that has 98% sequence identity to SEQ ID NO: 10;
(iii) an intracellular signaling domain comprising SEQ ID NO: 11 or a sequence that has 98% sequence identity to SEQ ID NO: 11; and
(iv) a costimulatory signaling domain comprising SEQ ID NO: 12 or a sequence that has 98% sequence identity to SEQ ID NO: 12.

In some embodiments, the CAR comprises:
(i) a scFv comprising a VL domain and VH domain, wherein said VL domain comprises LCDR1, LCDR2 and LCDR3 polypeptides and said VH domain comprises HCDR1, HCDR2 and HCDR3 polypeptides, and LCDR1 consists of SEQ ID NO: 1, LCDR2 consists of SEQ ID NO: 2, LCDR3 consists of SEQ ID NO: 3, HCDR1 consists of SEQ ID NO: 4, HCDR2 consists of SEQ ID NO: 5, and HCDR3 consists of SEQ ID NO: 6;
(ii) a transmembrane domain comprising SEQ ID NO: 10 or a sequence that has 98% sequence identity to SEQ ID NO: 10;
(iii) an intracellular signaling domain comprising SEQ ID NO: 11 or a sequence that has 99% sequence identity to SEQ ID NO: 11; and
(iv) a costimulatory signaling domain comprising SEQ ID NO: 12 or a sequence that has 99% sequence identity to SEQ ID NO: 12.

In some embodiments, the CAR comprises:
(i) a scFv comprising a VL domain and VH domain, wherein said VL domain comprises LCDR1, LCDR2 and LCDR3 polypeptides and said VH domain comprises HCDR1, HCDR2 and HCDR3 polypeptides, and LCDR1 consists of SEQ ID NO: 1, LCDR2 consists of SEQ ID NO: 2, LCDR3 consists of SEQ ID NO: 3, HCDR1 consists of SEQ ID NO: 4, HCDR2 consists of SEQ ID NO: 5, and HCDR3 consists of SEQ ID NO: 6;
(ii) a transmembrane domain comprising SEQ ID NO: 10;
(iii) an intracellular signaling domain comprising SEQ ID NO: 11; and
(iv) a costimulatory signaling domain comprising SEQ ID NO: 12.

In some embodiments, the CAR comprises:
(i) a scFv comprising a VL domain and VH domain, wherein said VL domain comprises LCDR1, LCDR2 and LCDR3 polypeptides and said VH domain comprises HCDR1, HCDR2 and HCDR3 polypeptides, and LCDR1 consists of SEQ ID NO: 1, LCDR2 consists of SEQ ID NO: 2, LCDR3 consists of SEQ ID NO: 3, HCDR1 consists of SEQ ID NO: 4, HCDR2 consists of SEQ ID NO: 5, and HCDR3 consists of SEQ ID NO: 6;
(ii) a transmembrane domain consisting of SEQ ID NO: 10;
(iii) an intracellular signaling domain consisting of SEQ ID NO: 11; and
(iv) a costimulatory signaling domain consisting of SEQ ID NO: 12.

In some embodiments, the CAR comprises:
(i) a scFv comprising a VL domain and VH domain, wherein the VL domain consists of SEQ ID NO: 7 and the VH domain consists of SEQ ID NO: 8;

(ii) a transmembrane domain comprising SEQ ID NO: 10 or a sequence that has 95% sequence identity to SEQ ID NO: 10;
(iii) an intracellular signaling domain comprising SEQ ID NO: 11 or a sequence that has 95% sequence identity to SEQ ID NO: 11; and
(iv) a costimulatory signaling domain comprising SEQ ID NO: 12 or a sequence that has 95% sequence identity to SEQ ID NO: 12.

In some embodiments, the CAR comprises:
(i) a scFv comprising a VL domain and VH domain, wherein the VL domain consists of SEQ ID NO: 23 and the VH domain consists of SEQ ID NO: 22;
(ii) a transmembrane domain comprising SEQ ID NO: 10 or a sequence that has 95%, 98%, 99% or 100% sequence identity to SEQ ID NO: 10;
(iii) an intracellular signaling domain comprising SEQ ID NO: 11 or a sequence that has 95%, 98%, 99% or 100% sequence identity to SEQ ID NO: 11; and
(iv) a costimulatory signaling domain comprising SEQ ID NO: 12 or a sequence that has 95%, 98%, 99% or 100% sequence identity to SEQ ID NO: 12.

In some embodiments, the CAR comprises:
(i) a scFv comprising a VL domain and VH domain, wherein the VL domain consists of SEQ ID NO: 21 and the VH domain consists of SEQ ID NO: 20;
(ii) a transmembrane domain comprising or consisting of SEQ ID NO: 10 or a sequence that has 95%, 98%, 99% or 100% sequence identity to SEQ ID NO: 10;
(iii) an intracellular signaling domain comprising or consisting of SEQ ID NO: 11 or a sequence that has 95%, 98%, 99% or 100% sequence identity to SEQ ID NO: 11; and (iv) a costimulatory signaling domain comprising or consisting of SEQ ID NO: 12 or a sequence that has 95%, 98%, 99% or 100% sequence identity to SEQ ID NO: 12.

In some embodiments, the CAR comprises:
(i) a scFv comprising a VL domain and VH domain, wherein the VL domain consists of SEQ ID NO: 7 and the VH domain consists of SEQ ID NO: 8;
(ii) a transmembrane domain comprising SEQ ID NO: 10 or a sequence that has 98% sequence identity to SEQ ID NO: 10;
(iii) an intracellular signaling domain comprising SEQ ID NO: 11 or a sequence that has 98% sequence identity to SEQ ID NO: 11; and
(iv) a costimulatory signaling domain comprising SEQ ID NO: 12 or a sequence that has 98% sequence identity to SEQ ID NO: 12.

In some embodiments, the CAR comprises:
(i) a scFv comprising a VL domain and VH domain, wherein the VL domain consists of SEQ ID NO: 7 and the VH domain consists of SEQ ID NO: 8;
(ii) a transmembrane domain comprising SEQ ID NO: 10 or a sequence that has 99% sequence identity to SEQ ID NO: 10;
(iii) an intracellular signaling domain comprising SEQ ID NO: 11 or a sequence that has 99% sequence identity to SEQ ID NO: 11; and
(iv) a costimulatory signaling domain comprising SEQ ID NO: 12 or a sequence that has 99% sequence identity to SEQ ID NO: 12.

In some embodiments, the CAR comprises:
(i) a scFv comprising a VL domain and VH domain, wherein the VL domain consists of SEQ ID NO: 7 and the VH domain consists of SEQ ID NO: 8;
(ii) a transmembrane domain comprising SEQ ID NO: 10;
(iii) an intracellular signaling domain comprising SEQ ID NO: 11; and
(iv) a costimulatory signaling domain comprising SEQ ID NO: 12.

In some embodiments, the CAR comprises:
(i) a scFv comprising a VL domain and VH domain, wherein the VL domain consists of SEQ ID NO: 7 and the VH domain consists of SEQ ID NO: 8;
(ii) a transmembrane domain consisting of SEQ ID NO: 10;
(iii) an intracellular signaling domain consisting of SEQ ID NO: 11; and
(iv) a costimulatory signaling domain consisting of SEQ ID NO: 12.

In some embodiments, the CAR comprises or consists of SEQ ID NO: 13 or a sequence that has 95% sequence identity with SEQ ID NO: 13. In some embodiments, the CAR comprises or consists of SEQ ID NO: 13 or a sequence that has 98% sequence identity with SEQ ID NO: 13. In some embodiments, the CAR comprises or consists of SEQ ID NO: 13 or a sequence that has 99% sequence identity with SEQ ID NO: 13. In some embodiments, the CAR comprises or consists of SEQ ID NO: 13.

```
Full sequence of the CAR
                                         (SEQ ID NO: 13)
[EVQLQESGPSLVKPSQTLSLTCSVTGDSITSGYWNWIRKFPGNKLEYM

GYISYSGSTYYNPSLKSRISITRDTSKNQYYMQLKSVTTEDTATYYCAR

YPSPDAMNYWGQGTSVTVSSGGGGSGGGGSGGGGSGGGGSDVVMTQTPL

TLSVTIGQPASISCKSSQSLLDSDGKTYLNWLLQRPGQSPKRLIYLVSK

LDSGVPDRFTGSGSGTDFTLKISRVEAEDLGVYYCWQGTHFPWTFGGGT

KLEIKRATTTPAPRPPTPAPTIASQPLSLRPEACRPAAGGAVHTRGLDF

ACDIYIWAPLAGTCGVLLLSLVITLYCKRGRKKLLYIFKQPFMRPVQTT

QEEDGCSCRFPEEEEGGCELRVKFSRSADAPAYQQGQNQLYNELNLGRR

EEYDVLDKRRGRDPEMGGKPQRRKNPQEGLYNELQKDKMAEAYSEIGMK

GERRRGKGHDGLYQGLSTATKDTYDALHMQALPPR]
```

In some further embodiments, any of the CARs described above may further comprise a CD19 targeting-moiety or any other targeting moiety such as a CD20 targeting-moiety. In particular the CAR is preferably a bispecific CD22/CD19-biCAR.

In a second aspect of the invention, the present invention provides a nucleic acid encoding any one of the CARs of the present invention, including any one of the CARS disclosed above. The nucleic acid sequence that encodes the chimeric receptor links together a number of modular components that can be excised and replaced with other components in order to customize the chimeric receptor.

In some embodiments, the nucleic acid is suitable for transducing or transforming a cell. In some embodiments, the nucleic acid is suitable for transducing or transforming a T cell for use in adoptive immunotherapy.

In some embodiments, the nucleic acid is codon optimized for expression in mammalian cells. Codon optimization methods are known in the art (see, for example, Parret et al., 2016. Curr Opin Struct Biol. 39:155-162).

The nucleic acid of the present invention may be comprised in a γ-retroviral or lentiviral vector which can be used to transduce or transform a T cell (see Rivière & Sadelain, 2017. *Mol Ther.* 25 (5): 1117-1124). The nucleic acid may also be inserted into a cell through the use of DNA transposons, RNA transfection or genome editing techniques such as TALEN, ZFN and CRISPR/Cas9 (see Rivière & Sadelain, 2017. *Mol Ther.* 25 (5): 1117-1124).

A third aspect of the present invention provides a cell comprising the nucleic acid of the present invention and/or the CAR of the present invention. In some embodiments, the cell is a T-cell (referred to as a CART).

In some embodiments, the cell is a naïve T cell, memory stem T cell or central memory T cell. It is currently thought that these cells are better suited for adaptive immunotherapy (see Rivière & Sadelain, 2017. *Mol Ther.* 25 (5): 1117-1124).

In some embodiments, the cell is an autologous T cell. The term "autologous cell" refers to a cell obtained from the same patient that is to be treated using any one of the methods of the present invention.

In some embodiments, the cell is an allo-tolerant T cell. The term "all-tolerant cell" refers to a cell that has been engineered to decrease the risk of a Graft-versus-host disease response. In some embodiments, this is achieved by genomic editing-mediated deletion of TCR and/or β2-microglobulin[15,19]. Allo-tolerant cells are known in the art (see section of allogeneic T cells in Rivière & Sadelain, 2017. *Mol Ther.* 25 (5): 1117-1124).

In some further embodiment, the cell may further comprise a CAR comprising a CD19 targeting-moiety. Preferably, the CAR is preferably a bispecific CD22/CD19-biCAR.

A fourth aspect of the present invention provides a pharmaceutical composition comprising the CD22 targeting-moiety as defined in the present invention and/or a plurality of cells of the present invention and a pharmaceutically acceptable carrier or diluent.

A pharmaceutical composition as described herein may also contain other substances. These substances include, but are not limited to, cryoprotectants, surfactants, antioxidants, and stabilizing agents. The term "cryoprotectant" as used herein, includes agents which provide stability to the CARTs against freezing-induced stresses. Non-limiting examples of cryoprotectants include sugars, such as sucrose, glucose, trehalose, mannitol, mannose, and lactose; polymers, such as dextran, hydroxyethyl starch and polyethylene glycol; surfactants, such as polysorbates (e.g., PS-20 or PS-80); and amino acids, such as glycine, arginine, leucine, and serine. A cryoprotectant exhibiting low toxicity in biological systems is generally used.

In some embodiments, the cells are formulated by first harvesting them from their culture medium, and then washing and concentrating the cells in a medium and container system suitable for administration (a "pharmaceutically acceptable" carrier) in a therapeutically effective amount. Suitable infusion medium can be any isotonic medium formulation, typically normal saline, Normosol R (Abbott) or Plasma-Lyte A (Baxter), but also 5% dextrose in water or Ringer's lactate can be utilized. The infusion medium can be supplemented with human serum albumin, fetal bovine serum or other human serum components.

In one aspect, the present invention provides a cell according to the present invention or a pharmaceutical composition according to the present invention for use as a medicament.

A fifth aspect of the present invention provides a method of treating a CD22-positive cancer, wherein preferably the CD22-positive cancer is B-cell acute lymphoblastic leukemia (B-ALL), more particularly a CD19⁻ B-ALL relapse, comprising administering the cell of the present invention or the pharmaceutical composition of the present invention to a patient in need thereof.

In some embodiments, the patient is administered a therapeutically effective amount of cells. In some embodiments, the patient is administered at least $10^2$, $10^3$, $10^4$, $10^5$, $10^6$, $10^7$, $10^8$, $10^9$ or $10^{10}$ cells. The number of cells will depend upon the ultimate use for which the composition is intended as will the type of cells included therein. For example, if cells that are specific for a particular antigen are desired, then the population will contain greater than 70%, generally greater than 80%, 85% and 90-95% of such cells. For uses provided herein, the cells are generally in a volume of a liter or less, can be 500 ml or less, even 250 ml or less, or 100 ml or less. The clinically relevant number of cells can be apportioned into multiple infusions that cumulatively equal or exceed $10^2$, $10^3$, $10^4$, $10^5$, $10^6$, $10^7$, $10^8$, $10^9$ or $10^{10}$ cells.

In some embodiments, the cell or pharmaceutical composition is administered intravenously, intraperitoneally, into the bone marrow, into the lymph node, and/or into cerebrospinal fluid.

In some embodiments, the method comprises a combination therapy. In some embodiments, the method comprises further administering CD19-CAR T cells.

In some embodiments, the cell or pharmaceutical composition as described herein is administered in combination with chemotherapeutic agents and/or immunosuppressants. In an embodiment, a patient is first treated with a chemotherapeutic agent that inhibits or destroys other immune cells followed by the cell or pharmaceutical composition described herein. In some cases, chemotherapy may be avoided entirely.

In some embodiments, the patient to be treated with the method of the present invention is in complete or near-complete remission after treatment with another therapy. In some embodiments, the patient to be treated with the method of the present invention has previously been treated with another therapy which resulted in a partial response, complete response, stable disease, decrease in progressive disease, reduced time to tumor progression or any combination thereof.

The following examples merely illustrate the present invention but do not limit the same.

EXAMPLES

Example 1

Materials and Methods

Generation of a CD22 Single-Chain Variable Fragment (scFv)

MoAbs reactive with human CD22 were generated by fusion of NS-1 myeloma cells with splenocytes from a Balb/c mouse previously immunized three times with $30 \times 10^6$ CD22-transfected 300.19 cells. Supernatants from hybridoma-containing wells were screened by flow cytometry for moAbs reactive with CD22-transfected 300.19 cells. Three reactive hybridomas were chosen for further characterization and were subcloned by limiting dilution (clones hCD22.7, hCD22.316 and hCD22.401). The three antibodies were of the IgG1K isotype, as determined using a mouse moAb isotyping kit (Boehringer Mannheim, Mannheim, Germany). Antibody specificity was further validated using a CD22-transfected COS cell line (pUNO1-hCD22; Invivo-Gen, Toulouse, France), the cell lines Raji, Daudi, PRMI 82229, U266 and Jurkat, and peripheral blood (PB) mononuclear cells (PBMCs). CD22 epitope binding to the hCD22.7 clone was determined by crossblocking with an antibody against the N-terminal domain of CD22 (S-HCL-1). The CD22-specific scFv derived from the hCD22.7 clone was obtained using the mouse IgG Library Primer Set (Progen, Heidelberg, Germany).

CAR Design and Vectors, Lentiviral Production and T Cells Transduction

The CD22-specific scFv was cloned into a pCCL lentiviral-based backbone containing a human CD8 transmembrane (TM) domain, human 4-1BB and CD3ζ endodomains (second-generation CAR), and a T2A-GFP cassette. An identical lentiviral vector with the CD8 TM-4-1BB-CD3ζ domains linked to a His-Tag was used as a mock intracellular (mock-IC) control. CAR-expressing viral particles pseudotyped with VSV-G were generated by co-transfection of HEK 293T cells with the pCCL vector and the packaging plasmids VSV-G and psPAX2 using polyethylenimine (PEI, Polysciences Inc., Warrington, PA). Supernatants were collected at 48 and 72 h after transfection and concentrated by ultracentrifugation.

PBMCs were isolated from buffy coats from healthy volunteers by Ficoll-Hypaque gradient centrifugation (GE Healthcare, Chicago, IL). Buffy coats were obtained from the Barcelona Blood and Tissue Bank upon Institutional Review Board approval (HCB/2018/0030). T cells were activated by plate coating with anti-CD3 (OKT3) and anti-CD28 (CD28.2) antibodies (BD Biosciences, Franklin Lakes, NJ) for 2 days and were transduced with the CAR-expressing lentivirus at a multiplicity of infection of 10 in the presence of interleukin-7 (IL7) and IL15 (10 ng/ml; Miltenyi Biotec, Bergisch Gladbach, Germany). T cells were expanded in RPMI-1640 medium (Gibco/Invitrogen, Waltham, MA) containing 10% heat-inactivated fetal bovine serum (FBS) (Sigma, St. Louis, MO), penicillin-streptomycin (Gibco/Invitrogen), and IL7 and IL15 (10 ng/ml), for up to 10 days. Surface expression of CD22-CAR was traced by fluorescence-activated cell sorting (FACS).

Cell Lines

SEM, NALM6, MV4-11 and REH cells lines were purchased from the DSMZ cell line bank (Braunschweig, Germany). CD19-knock out (KO) and CD22-KO SEM cells were generated by CRISPR-mediated genome editing. Briefly, 200,000 cells were electroporated (Neon transfector, ThermoFisher Scientific, Waltham, MA) with a Cas9 protein/tracrRNA/crRNA complex (IDT, Coralville, IA). Two guides were designed for each gene: CD19-exon 2.1, CAGGCCTGGGAATCCACATG and CD19-exon 14.1, AGAACATGGATAATCCCGAT; and CD22-exon 3.2, TCAATGACAGTGGTCAGCTG and CD22-exon 9, CAGGTGTAGTGGGAGACGGG. After electroporation, cells were allowed to recover and then CD19⁻ or CD22⁻ cells were FACS sorted (>99% purity).

In Vitro Cytotoxicity Assays and Cytokine Release Determination

Target cells (cell lines or primary B-ALL cells; 100,000 target cells/well of a 96-well plate) were incubated with CD22-CAR or mock-IC T cells at different effector: target (E:T) ratios for the indicated time periods. Cell lines were cultured in RPMI-1640, 10% FBS and penicillin-streptomycin. Primary cells were cultured in StemSpan™ SFEM media (StemCell Technologies, Vancouver, Canada), 20% FBS, penicillin-streptomycin, insulin-transferrin-selenium (ITS) (Gibco/Invitrogen), hSCF (100 ng/ml), hFLT3L (100 ng/ml), hIL3 (10 ng/ml) and hIL7 (10 ng/ml) (all from Miltenyi Biotec, Bergisch Gladbach, Germany). CAR T cell-mediated cytotoxicity was determined by analyzing the residual live (7-aminoactinomycin D⁻; 7-AAD⁻) target cells at each time point and E:T ratio. For absolute cell counting, BD TruCount™ absolute count tubes (BD Biosciences) were used. Quantification of the pro-inflammatory cytokines IL2, TNFα and IFNγ was measured by ELISA using BD OptEIA™ Human ELISA kits (BD Biosciences), in supernatants harvested at 24 h (cell lines) and 48 h (primary cells) post T cell-exposure, using an 1:1 E:T ratio.

Flow Cytometry

Cell surface expression of the CD22-CAR was confirmed by GFP expression, binding to an AffiniPure F(ab')2 fragment goat anti-mouse IgG (H+L)-APC (Jackson ImmunoResearch, Westgrove, PA), and an anti-His-APC (J095G46; BioLegend, San Diego, CA), after prior incubation with human recombinant CD22-His (rCD22-His) (ThermoFisher Scientific). Activation of transduced T cells was confirmed 48 h after plating of PBMCs by surface staining with CD3-PE (UCHT1; BD Biosciences), CD25-APC (M-A251; BD Biosciences) and CD69-VioBlue (REA824; Miltenyi Biotec). T cells and target cells were identified in in vitro assays using the following human antibodies: CD3-PE (UCHT1), CD22-APC (HIB22), CD19-BV421 (HIB19) and CD10-PECy7 (HI10a) or CD13-PECy7 (WM15) (for SEM cell lines) or CD33-APC (WM53) (for MV4-11 cell line) (all from BD Biosciences). Dead cells were discarded by 7AAD staining. Cells collected from mouse PB, bone marrow (BM) and spleen were stained with HLA-ABC-PE (G46-2.6), CD45-BV510 (HI30), CD3-PerCP (SK7), CD22-APC, CD19-BV421 and CD10-PECy7 (all from BD Biosciences). Cells were incubated for 30 min and then lysed and fixed with the BD FACS™ Lysing solution (BD Biosciences). Fluorescence Minus One (FMO) controls were used to set the gates. A FACSCanto™-II flow cytometer equipped with FACS-Diva™ software was used for the analysis (BD Biosciences).

In Vivo Xenograft Models for B-ALL and CAR T Cells

Twelve-week-old non-obese diabetic (NOD).Cg-Prkdc$^{scid}$ Il2$^{rgtm1\,Wjl}$/SzJ (NSG) mice (The Jackson Laboratory, Bar Harbor, ME) were bred and housed under pathogen-free conditions. All in vivo procedures were approved by a local ethics committee (HRH-17-0029-P1). In total, 0.5-1.5×10⁶ PDX B-ALL cells were intra-BM transplanted in sublethally irradiated (2 Gy) NSG mice, followed by intravenous (i.v.) infusion of 4×10⁶ CD22-CAR T cells (average transduction ~51.3%) or mock-IC T cells (average transduction ~54.2%) two weeks later. B-ALL engraftment was monitored in PB every other week. BM aspirates were analyzed six weeks after transplantation and at sacrifice, along with spleens. Red blood cell (RBC) counts were determined with an hemocytometer 2800VET V-Sight (A. Menarini Diagnostics, Badalona, Spain).

Statistical Analysis

All data are expressed as the mean±SEM. Differences between groups were assessed using 2-tailed unpaired Student's t-tests unless otherway stated. All analyses were performed with Prism software, version 8.0 (GraphPad software Inc., San Diego, CA).

Results

CD22.7-CAR T Cells Efficiently Eliminate B-ALL Cells In Vitro

Figure 1:
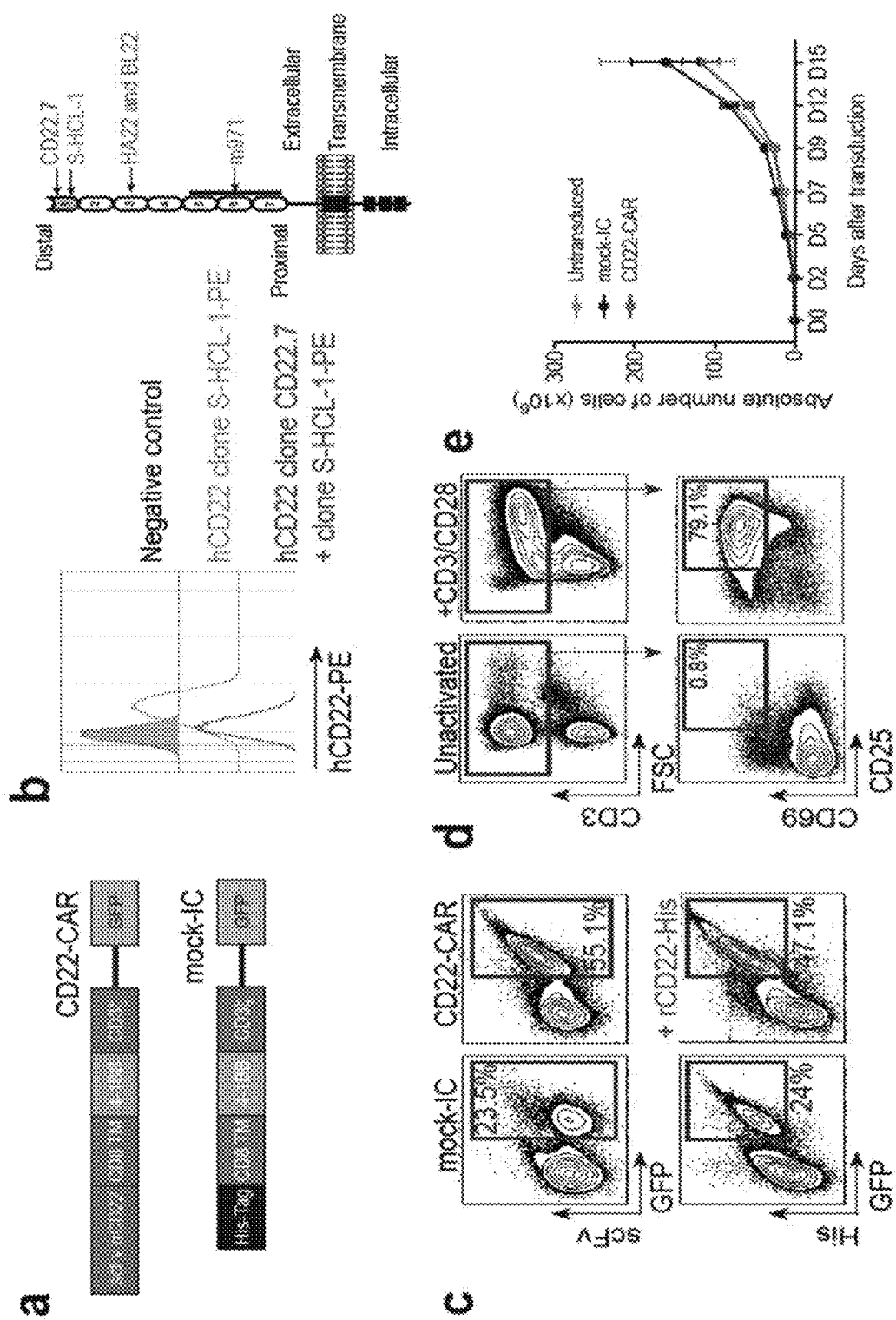
FIG. 1. Design, detection and expansion of CD22-CAR T cells. (A) Scheme of the CD22-CAR structure and the intracellular mock (mock-IC). (B) Histogram showing the blocking of the binding of the anti-CD22 S-HCL-1 clone (PE signal) when CD22+B cell line Raji cells are preincubated with the hCD22.7 clone (left panel). Right panel depicts the CD22 structure, indicating the binding site of hCD22.7 scFv (as well as m971, HA22 and BL22 scFvs). (C) Representative CAR detection in primary T cells. CD22-CAR-transduced T cells are detected as GFP+ and are co-recognized by an anti-human IgG F(ab')2 and an anti-His moAb (upon incubation with rCD22-His). (D) Proper T cell activation determined by CD25 and CD69 staining after 48 h exposure to anti-CD3/CD28 (PBMCs from n=3 healthy donors). (E) Robust expansion of activated T cells untransduced or transduced with either mock-IC or CD22-CAR (PBMCs from n=3 healthy donors). TM, transmembrane; mock-IC, mock-intracellular; scFv, single-chain variable fragment; rCD22-His, recombinant CD22-His; His, histidine; FSC, forward scatter; PBMCs, peripheral blood mononuclear cells. Plot shows mean±SEM (n=3 healthy donors).

Our novel anti-CD22 scFv (clone hCD22.7) was cloned into a second-generation CAR construct consisting of an anti-CD22 scFv, a CD8 transmembrane spacer, and intracellular signaling domains from 4-1BB and CD3ζ, coupled in-frame with GFP through a T2A sequence (FIG. 1a).

To identify the domain of CD22 recognized by the hCD22.7 moAb, we performed a crossblocking assay with the anti-CD22 clone H-SCL-1, known to bind to the most distal Ig extracellular domain 1 of CD22 (Engel P, Wagner N, Miller AS, Tedder TF. Identification of the ligand-binding domains of CD22, a member of the immunoglobulin superfamily that uniquely binds a sialic acid-dependent ligand. The Journal of experimental medicine. 1995; 181 (4): 1581-6). Binding of the labeled H-SCL-1 clone was hindered in cells pre-incubated with the antibody hCD22.7, indicating an overlapping binding of both moAbs to the most distal Ig domain of CD22 (FIG. 1b). Healthy human T cells were successfully transduced with both CD22-CAR and mock-IC lentivectors with a transduction efficiency of 20-50%. The expression of the CD22-CAR in T cells was confirmed by co-detection of scFv and GFP, and by using an anti-His moAb upon incubation with human rCD22-His (FIG. 1c). Importantly, activated (CD69+CD25+) CD22-CAR T cells (FIG. 1d) continuously expanded >100-fold over a 15-day period, similar to mock-IC T cells (FIG. 1e), demonstrating that CAR expression does not hamper T cell expansion.

Figure 2:
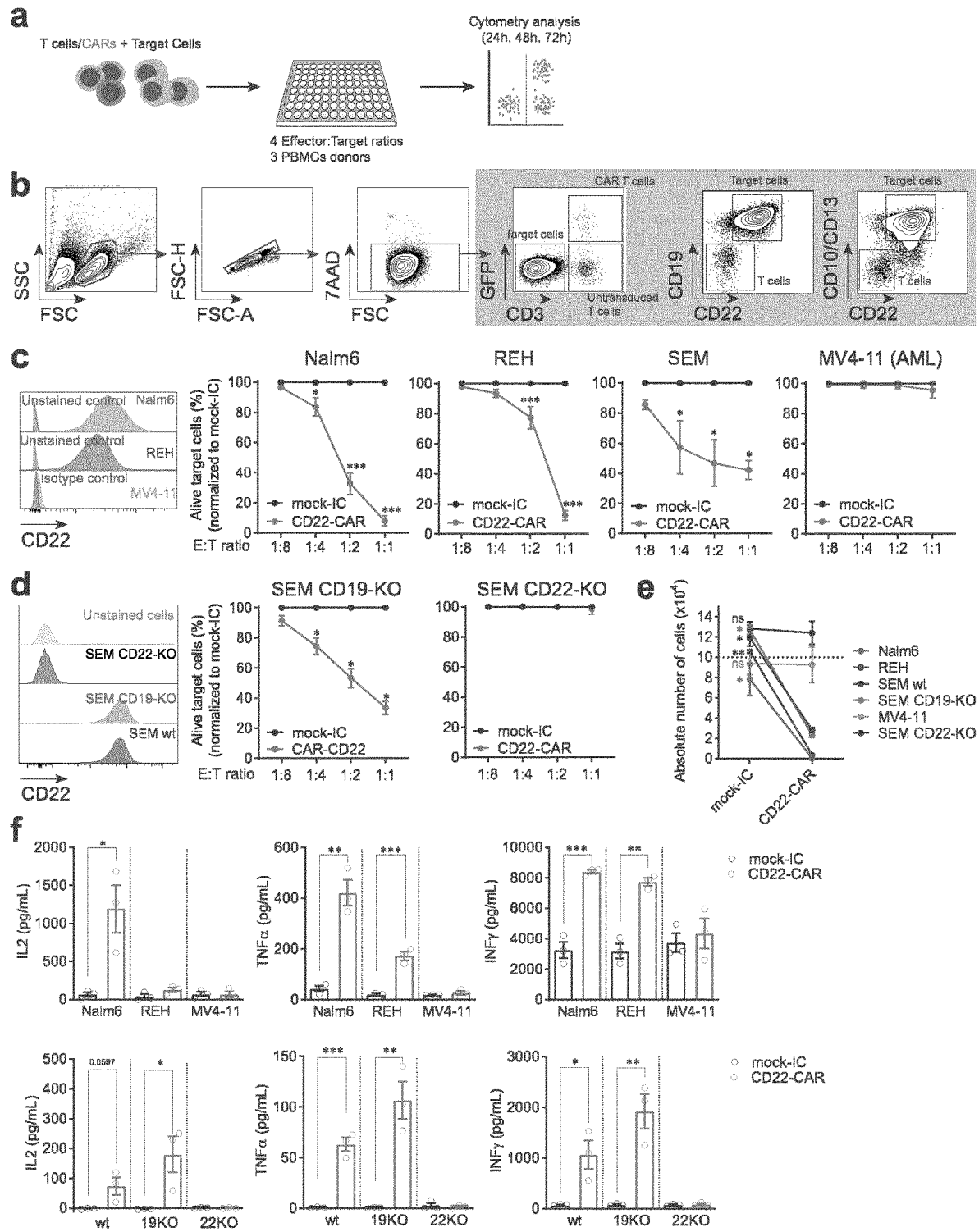
FIG. 2. CD22-CAR T cells specifically target and eliminate B-ALL cell lines in vitro. (A) Experimental design of the in vitro cytotoxicity assays. (B) Gating strategy used to FACS analyze cytotoxicity. Alive target cells were identified as 7AAD-CD3-GFP-CD19+CD10+/CD13+ (CD33+ for MV4-11 cell line). CD22 was not used to avoid confounding detection of target cells due to potential antigen loss. Duplets were removed from the analysis. (C) Percentage of alive target cells after 48 h incubation with CD22-CAR T cells at the indicated E:T ratios. Results are normalized respect to mock-IC data (PBMCs from n=3 healthy donors). CD22 expression in the different cell lines is shown previously in a histogram. (D) Specificity of CD22-CAR using CRISPR-Cas9 generated CD19-KO and CD22-KO SEM cells 529

CD22-CAR T cells from three different healthy donors were then functionally tested in vitro in cytotoxicity assays against the B-ALL cell lines NALM6, SEM and REH, and the AML cell line MV4-11 as a negative control, at increasing E:T ratios (FIG. 2a). Target cells alive after CD22-CAR T cell exposure were identified as 7AAD$^-$CD3$^-$CD19$^+$CD10$^+$ (or CD13$^+$ in the case of the SEM cell line and 7AAD$^-$CD3$^-$CD33$^+$ in the case of MV4-11 cell line) (FIG. 2b). Compared with mock-IC T cells, CD22-CAR T cells specifically eliminated CD22$^+$ B-ALL cells in a relatively low E:T ratio-dependent fashion (FIG. 2c). Specificity of the CD22-CAR T cells was further demonstrated using CRISPR/Cas9-mediated CD19-KO and CD22-KO SEM cells (FIG. 2d).

Importantly, B-ALL cells barely survived exposure to CD22-CAR T cells in a 48-h absolute number assay at a 1:1 E:T ratio (FIG. 2e). CD22-CAR T cells produced high levels of the proinflammatory cytokines IL2, TNFα, and IFNγ after co-culture with target cells, confirming their cytotoxicity (FIG. 2f).

the Expression Level of CD22 Impacts the Efficiency of CD22.7-CAR T Cells in Killing B-ALL Primary Cells It has been reported that remissions post-CD22-CAR T cell therapy are short and are associated with reduced expression of CD22, whereas high expression of CD22 favors the activity of CD22-CAR T cells. Moreover, controversy exists on whether CD22-/dim B-ALL relapses are common after CD22-CAR T cell treatment. Given this information, we next tested the efficacy of our CD22-CAR T cells in vitro, in 9 primary B-ALL samples with variable expression levels of CD22. CD22 median fluorescence intensity (MFI) levels above or below the mean value (MFI=6752) were used to categorize primary B-ALLs as CD22$^{high}$ or CD22$^{low}$ (FIG. 3a).

Cytotoxicity was measured after 24 h and 48 h exposure to CD22-CAR/mock-IC T cells. Overall, CD22-CAR T cells significantly eliminated primary B-ALL blasts (FIG. 3b). However, while CD22-CAR T cells consistently eliminated CD22$^{high}$ B-ALL blasts (n=3) across the entire CAR T cell exposure window (FIG. 3b, left panel), CD22-CAR T cell-mediated killing of CD22$^{low}$ B-ALL blasts (n=6), although significant, was less robust and exclusively occurred either during the first or the last 24 h of exposure to CD22-CAR T cells, except for ALL #7 (FIG. 3b, right panel). Nevertheless, similar robust production of the proinflammatory cytokines IL2, TNFα, and IFNγ was observed for both CD22$^{high}$ and CD22$^{low}$ B-ALL blasts (FIG. 3c), confirming an efficient recognition and killing of B-ALL primary cells by our CD22.7-CAR T cells.

Membrane-Distal CD22 Epitope-Directed CAR T Cells Efficiently Eliminate B-ALL Blasts In Vivo in Clinically Relevant Patient-Derived Xenografts We next assessed the activity of our CD22-CAR in vivo using both CD22$^{high}$ (ALL #1 and ALL #2) and CD22$^{low}$ (ALL #10) PDX B-ALL samples (FIG. 4). NSG mice were intra-BM transplanted with 0.5-1.5×10$^6$ primary CD22+B-ALL blasts, followed by infusion of 4×10$^6$ CD22-CAR/mock-IC T cells two weeks later. Leukemic engraftment and T cell persistence were monitored by FACS biweekly in PB, and analyzed in BM and spleen at sacrifice, when any animal developed signs of overt disease (FIG. 4a-b). The kinetics of leukemia reconstitution (aggressiveness) detectable between week 4-20 post-transplant was unique for each PDX, and the engraftment of both CD22$^{high}$ and CD22$^{low}$ PDXs tended progressively to increase over time in mock-IC T cell-treated mice (FIG. 4c). Importantly, however, CD22-CAR T cells fully abolished (ALL #1 and ALL #10) or largely controlled (ALL #2) the growth of the B-ALL cells (FIG. 4c, upper panel). T cell persistence adapted to the reconstitution kinetics of each PDX were detected in all three PDXs, even 26 weeks after CAR T cell infusion (range, week 6 (n=15) to week 26 (n=5): mock-IC group 2.38%±0.65-0.34%±0.34; CAR T cell group 2.79%±1.13-0.14%±0.09) (FIG. 4c, bottom panel). Disease control was further confirmed at sacrifice in ipsilateral (injected tibia) and contralateral (both femurs and non-injected tibia) BM, PB and spleen through FACS quantification of tumor burden (FIG. 4d), lack of splenomegaly (FIG. 4e), and signs of hematopoietic displacement (FIG. 4f). Importantly, persistent leukemic cells at sacrifice maintained full expression of CD22, ruling out immune escape due to antigen loss (FIG. 4g).

Finally, any engineered scFv of either murine or human origin expressed in autologous T cells may be immunogenic if presented on major histocompatibility complex class I (MHCI), because peptides derived from it may be recognized as "non self" antigens by the adaptive immune system. We have thus compared the immunogeity capacity of our hCD22.7-scFv side-by side with that of m971 and HA22 clones using the in silico tool NetMHC 4.0 which predicts the affinity of peptides to bind to the most representative HLA supertypes. As shown in FIG. 5, we found very similar numbers of total (29, 23 and 26) and strong (8, 9 and 6) binding 9-mer peptides for hCD22.7, m971 and HA22, respectively. Taken together, the presented data indicate the high performance of this novel 4-1BB-based CD22-CAR targeting a membrane-distal epitope in controlling the leukemic growth of differently aggressive primary B-ALL PDXs.

Example 2. Mapping the Epitope of Inotuzumab and of Novel Anti-CD22 scFv (Clone hCD22.7) Against CD22

The sequence of CD22 was translated into 7, 10 and 13 amino acid peptides with a peptide-peptides overlap of 6, 9 and 12 amino acids, respectively. The resulting conformational CD22 peptide microarrays contained 2,556 different peptides printed in duplicate and were framed by additional control peptides. Incubation of CD22 peptide microarray with human IgG4 antibody Inotuzumab at concentrations of 10 μg/ml and 65 μg/ml in incubation buffer was followed by staining with secondary and control antibodies as well as microarray read out with a LI COR Odyssey Imaging System at scanning intensities of 7/7 (red/green).

Quantification of spot intensities was done with PepSlide® Analyzer. Intensity maps were generated and interactions in the peptide maps highlighted. As indicated in FIGS. 11 and 12, the detected epitope for inotuzumab (blue) coincides with an exposed region adjacent to the one identified to hCD22.7 (red). Inotuzumab epitope is slightly more extended that the one recognized by hCD22.7 and is mainly composed of acid/basic residues. In addition, in FIG. 13 the structural model of the CD22 Inotuzumab scFv and CD22 hCD22.7 scFv complexes are therein illustrated. For hCD22.7 the structure is predicted based on the identified binding epitope of CD22 (in red) and the sequence of the heavy and light chains of the hCD22.7 scFv (blue and pink, respectively) For inotuzumab the structure is predicted based on the identified binding epitope of CD22 (in blue) and the sequence of the heavy and light chains of the inotuzumab scFv (yellow and green, respectively).

The different bioinformatic analysis indicate that the predicted binding energy in Kcal/mol shows that hCD22.7 has a more favorable binding energy than inotuzumab. In addition, although the contact surface of hCD22.7 is smaller than inotuzumab the energy is more favorable.

Example 3. Experiments with the B Cell Leukemia Cell Line NALM6

Materials and Methods

—CAR Vectors, Lentiviral Production and T Cells Transduction

The next CD22 scFvs were cloned into the pCCL lentiviral vector upstream of the CAR cassette (CD8 hinge and transmembrane domain, 4-1BB and CD35 endodomains and T2A-GFP): CD22.7, g5/44 (patent WO2017216561), M971 (T. J. Fry, et al.; Nat Med 2018 Vol. 24 Issue 1, pages 20-28). CAR-expressing viral particles pseudotyped with VSV-G were generated by cotransfection of HEK 293 T cells with the pCCL vector and the packaging plasmids VSV-G, pMDL/pRRE, pRSV-Rev, using polyethylenimine (PEI, Polysciences, Warrington, Pennsylvania, USA). Supernatants were collected at 48 and 72 hours after transfection and concentrated by ultracentrifugation. PBMCs were isolated from buffy coats from healthy volunteers by Ficoll-Hypaque gradient centrifugation (GE Healthcare, Chicago, Illinois, USA). T cells were activated by plate coating with anti-CD3 (OKT3) and anti-CD28 (CD28.2) antibodies (BD Biosciences, Franklin Lakes, New Jersey, USA) for 2 days and were transduced with the CAR-expressing lentivirus at a multiplicity of infection of 10 in the presence of interleukin 7 (IL-7) and IL-15 (10 ng/ml; Miltenyi Biotec, Bergisch Gladbach, Germany). T cells were expanded in RPMI-1640 medium (Gibco/Invitrogen, Waltham, MA) containing 10% heat-inactivated fetal bovine serum (FBS, Sigma, St. Louis, Missouri, USA), penicillin/streptomycin (Gibco/Invitrogen), and IL-7 and IL-15 (10 ng/mL), for up to 10 days. Expression of CD22-CARs was traced by fluorescence-activated cell sorting (FACS) by determining GFP positive cells. For a typical experiment transduction efficiency may vary from 30 to 70%. The same percentage of infected (GFP positive) cells were used in all in vitro and in vivo experiments and balanced with untransduced cells (UT) if required. The minimum percentage of transduced cells was 30%. Cell surface expression of the CD22-CARs was confirmed by green fluorescence protein (GFP) expression and binding to human recombinant CD22-His (rCD22-His, ThermoFisher Scientific) and an anti-His-APC (J095G46; BioLegend, San Diego, California, USA). Activation of transduced T cells was confirmed 48 hours after plating of PBMCs by surface staining with CD3-PE (UCHT1; BD Biosciences), CD25-APC (M-A251; BD Biosciences) and CD69-VioBlue (REA824; Miltenyi Biotec).

—In Vitro Cytotoxicity Assays, Cytokine Release Determination and In Vivo Xenograft Models The cell NALM6 were purchased from DSMZ (Germany) and expanded according to DSMZ recommendations. Target cells were incubated with the different CAR22 or MOCK T-cells at different effector: target (E:T) ratios for the indicated time periods (24 and 48 hours). CART-mediated cytotoxicity was determined by analyzing the residual alive (7-AAD-) target cells at each time point and E:T ratio. Target cells ($1 \times 10^5$) were used for all cytotoxicity assays. T cells and target cells were identified in in vitro assays by flow cytometry using the following human antibodies: CD3-PE (UCHT1), CD22-APC (HIB22), CD19-BV421 (HIB19) and CD10-PECy7 (HI10a). The production of the proinflammatory cytokines IL-2, tumor necrosis factor alpha (TNF-α) and interferon gamma (IFN-γ) was assessed by ELISA (Human ELISA SET, BD Biosciences) using in vitro supernatants harvested at 24-48 hours post-T cell exposure.

The experimental design of the in vivo experiments (xenograft model) was performed as follows. NSG mice (8-12 weeks old, Jackson Laboratory, n=4 group) were intratibial transplanted (IT) with $1 \times 10^5$ Luc-GFP (NALM6) cells 3 days before intravenous infusion (IV) of $5 \times 10^6$ of CD22-CARTs derived from healthy PBMCs. Tumor burden was monitored at the indicated time points by bioluminescence (BLI) using the Xenogen in vivo imaging system (IVIS) 50 Imaging System (Perkin Elmer). When MOCK treated animals were fully leukemic animals were euthanized and analyzed by using FACS for leukemic burden and CART persistence. Bone marrow (BM), peripheral blood (PB) and spleen were FACS-analyzed for human chimerism at sacrifice. Cells were stained with anti-HLA.ABC-PE, CD3-APC, CD10-PECy7, CD45-AmCyan and CD19-BV421 for lymphoid cells (see FIG. 15).

Results

FIG. 14 refers to cytotoxicity assays. In FIG. 14A) it is therein indicated the percentage of alive target NALM6 (CD19+) and Jurkat (as a control) cells after 24-48 hours of incubation of $1 \times 10^5$ NALM6 cells with CD22-CAR T cells at the indicated numbers (E:T ratios 1/1, 1/2, 1/4 and 1/8). Results were normalized with respect to mock data (data with PBMCs from n=3 healthy donors and from two independent experiments). Furthermore, in FIG. 14 B) it is therein shown the results from an ELISA assay showing secretion of proinflammatory cytokines by different CD22-CAR T cells after 24-48 hours exposure to NALM6 cells. Data is presented as mean±SEM (n=3 healthy donors). In addition, the results obtained from the in vivo experiments by using the xenograft model are shown in FIGS. 16 to 18.

As illustrated in FIG. 14A), the percentage of alive target NALM6 (CD19+) cells after 24-48 hours incubation of $1 \times 10^5$ NALM6 cells with CD22-CAR T cells and at E:T ratios of 1/1 and 1/2, were similarly decreased for CD22.7 (37 to 12% of alive cells at 24 and 48 h at 1/1 ratio, respectively) and CD22-M971 (gold standard) (55 to 27% of alive cells at 24 and 48 h at 1/1 ratio, respectively) but the percentage of alive target NALM6 (CD19+) cells obtained by using CD22-G5/44 was remarkably higher than the percentage obtained with any of CD22.7 or CD22-M971. As a control, Jurkat cells viability was not affected significatively by any of the CART cells used (FIG. 14A). As illustrated in FIG. 14B, the release of pro-immflamatory cytokines were higher in the presence of CD22.7 CAR-T cells that with CD22-M971 or CD22-G5/44. As illustrated in FIG. 16, the tumor burden monitored by BLI at the indicated time points was remarkably higher in the case of CD22-G5/44 in comparison to the tumor burden obtained by using any of CD22.7 or CD22-M971. Lastly, as shown in FIG. 17, leukemic burden at sacrifice in peripheral blood (PB), bone marrow (BM) and spleen was remarkably higher in the case of CD22-G5/44 in comparison to the leukemic burden obtained by using any of CD22.7 or CD22-M971.

These results clearly show that, in an in vitro (citoxicity) and in vivo model (xenograft model), CD22.7 appears to be notably more effective than CD22-G5/44. Accordingly, results also show that release of pro-immflamatory cytokines is higher in the presence of CD22.7.

Example 4. Experiments with the Acute Lymphoblastic Leukaemia Cell Line SEM (CD22 Positive)

Materials and Methods

—CAR Vectors, Lentiviral Production and T Cells Transduction pCCL vectors, lentiviral particles production and transduction of T cells methods were the same than described in example 3.

—In Vitro Cytotoxicity Assays, Cytokine Release Determination and In Vivo Xenograft Models The cells SEM were purchased from DSMZ (Germany) and expanded according to DSMZ recommendations. Target cells were incubated with the different CAR22 or MOCK T-cells at different effector: target (E:T) ratios for the indicated time periods (24 and 48 hours). CART-mediated cytotoxicity was determined by analyzing the residual alive (7-AAD-) target cells at each time point and E:T ratio. Target cells (1×10$^5$) were used for all cytotoxicity assays. T cells and target cells were identified in in vitro assays by flow cytometry using the following human antibodies: CD3-PE (UCHT1), CD22-APC (HIB22), CD19-BV421 (HIB19) and CD13-PECy7 (WM15) (see FIG. 19A). The production of the proinflammatory cytokines IL-2, tumor necrosis factor alpha (TNF-α) and interferon gamma (IFN-v) was assessed by ELISA (Human ELISA SET, BD Biosciences) using in vitro supernatants harvested at 24-48 hours post-T cell exposure (see FIG. 19B).

The experimental design of the in vivo experiments (xenograft model) was performed as follows. NSG mice (8-12 weeks old, Jackson Laboratory, n=4 group) were intratibial transplanted (IT) with 1×10$^5$ Luc-mCherry (SEM) cells 3 days before intravenous infusion (IV) of 5×10$^6$ of CD22-CARTs derived from healthy PBMCs. Tumor burden was monitored at the indicated time points by bioluminescence (BLI) using the Xenogen in vivo imaging system (IVIS) 50 Imaging System (Perkin Elmer). When MOCK treated animals were fully leukemic animals were euthanized and analyzed by using FACS for leukemic burden and CART persistence. Bone marrow (BM), peripheral blood (PB) and spleen were FACS-analyzed for human chimerism at sacrifice. Cells were stained with anti-HLA.ABC-PE, CD3-PerCP, CD45-AmCyan, and CD19-BV421 for lymphoid cells (see FIG. 20).

Results

The in vitro results are shown in FIG. 19 where cytotoxicity assays (A) with 1×10$^5$ SEM WT cells (left) and SEM cells KO for CD22 (CD22 KO) as target cells (T) at the indicated times, were performed. In FIG. 19 B) it is therein shown the results from an ELISA assay showing secretion of proinflammatory cytokines by different CD22-CAR T cells after 24-48 hours exposure to SEM WT or CD22 KO cells. In vivo results are shown in FIGS. 20 to 23.

As illustrated in FIG. 19A), the percentage of alive target SEM WT but not CD22 KO cells after 24-48 hours, were similarly decreased in the presence of CD22.7 and CD22-M971 (gold standard) and the percentage of alive target SEM WT cells obtained by using CD22-G5/44 was remarkably higher, specially at ratios of 1:4 and 1:8, than the percentage obtained with any of CD22.7 or CD22-M971 (see results with SEM WT cells (left)). According with this, as illustrated in FIG. 19B, the release of pro-immflamatory cytokines was strongly and similarly induced by CD22.7 or CD22-M971. As illustrated in FIG. 20, the tumor burden monitored by BLI at the indicated time points was remarkably higher in the case of CD22-G5/44 in comparison to the tumor burden obtained by using any of CD22.7 or CD22-M971. Furthermore, as shown in FIG. 21, leukemic burden at sacrifice in peripheral blood (PB), bone marrow (BM) and spleen was remarkably higher in the case of CD22-G5/44 in comparison to the leukemic burden obtained by using any of CD22.7 or CD22-M971.

Example 5. Humanization of the scFvs of the Novel Anti-CD22 (Clone hCD22.7)

for the Humanization Two Different Approaches were Used:
1. Sequence-based (and structure-assisted) CDR-grafting; and
2. 'De-murinenization'

Sequence-based (and structure-assisted) CDR-grafting is strictly speaking the only "humanization" approach, i.e. moving the CDRs of murine to a human scFv chassis. 'De-murinenization' is not per se a humanization of the scFv. The approach relies on identifying regions on the murine sequence that are immunologically liable and make individual changes (i.e. point-mutations) on the sequence to remove such liability.

The Sequence-based (and structure-assisted) CDR-grafting approach gave the following humanized heavy and light chains:

```
Heavy chain (SEQ ID NO 20):
QVQLQESGPGLVKPSQTLSLTCSVTGDSITSGYWNWIRKFPGNKLEWIG
YISYSGSTYYNPSLKSRITISRDTSKNQYSLKLSSVTTEDTATYYCARY
PSPDAMNYWGQGTSVTVSS Light chain (SEQ ID NO 21):
DVVMTQTPLTLPVTLGQPASISCKSSQSLLDSDGKTYLNWLQQRPGQSP
KRLIYLVSKLDSGVPDRFSGSGSGTDFTLKISRVEAEDVGVYYCWQGTH
FWTFGGGTKLEIKRA
```

FIG. 24 illustrates a comparison between the murine and humanized version of the the heavy and light chains of the novel anti-CD22 (clone hCD22.7).

The 'De-murinenization' approach gave the following humanized heavy and light chains:

```
Heavy chain
                                        (SEQ ID NO 22)
QVQLQESGPSLVKPGQTLSLTCSVTGDSITSGYWNWIRQSPGNKLEYMG
YISYSGSTYYNPTLKGRISITRDNSSSQYYLQLKSVTSEDTATFYCARY
PSPDAMNYWGQGTSVTVSS Light chain
                                        (SEQ ID NO 23)
DVVMTQTPLTLSVTIGQPASISCKSSQSLLDSDGKTYLNWLLQRPGQSP
KLLIYLVSKLDSGVPDRFTGSGSGTDFTLKISRVEADDLGVYFCWQGTH
FWTFGGGTKLEIKRA
```

FIG. 25 illustrates the identification of those regions on the murine sequence that are immunologically liable and the individual changes (i.e. point-mutations) on the sequence to remove such liability.

The invention claimed is:

1. A CD22 targeting-moiety, wherein the CD22 targeting-moiety has binding affinity for the region of the first Ig extracellular domain of the CD22 antigen defined as SEQ ID NO 15, and wherein the CD22 targeting-moiety comprises a VL domain and VH domain, wherein the VL domain comprises LCDR1, LCDR2 and LCDR3 polypeptides and the VH domain comprises HCDR1, HCDR2 and HCDR3 polypeptides, and wherein LCDR1 consists of [QSLLDSDGKTY] (SEQ ID NO: 1), LCDR2 consists of [LVS] (SEQ ID NO: 2), LCDR3 consists of [WQGTHFPWT] (SEQ ID NO: 3), HCDR1 consists of [GDSITSGY] (SEQ ID NO: 4, HCDR2 consists of [ISYSGST] (SEQ ID NO: 5), and HCDR3 consists of [ARYPSPDAMNY] (SEQ ID NO: 6).

2. A CD22 targeting-moiety according to claim 1, wherein the CD22 targeting-moiety is an antibody, F(ab')$_2$, Fab, scFab or scFv, and wherein the VL domain consists of SEQ ID NO: 21 and the VH domain consists of SEQ ID NO: 20.

3. The CD22 targeting-moiety of claim 1, wherein the CD22 targeting-moiety is an antibody, F(ab')$_2$, Fab, scFab or scFv, comprising a VL domain and VH domain, wherein the VL domain consists of SEQ ID NO: 7 and the VH domain consists of SEQ ID NO: 8.

4. The CD22 targeting-moiety of claim 3, wherein the CD22 targeting-moiety is a scFv comprising a VL domain and VH domain, wherein the VL domain consists of SEQ ID NO: 7 and the VH domain consists of SEQ ID NO: 8.

5. The CD22 targeting-moiety of claim 1, wherein the CD22 targeting-moiety is a scFv consisting of SEQ ID NO: 9.

6. A chimeric antigen receptor (CAR) comprising:
   a. an extracellular domain comprising a CD22 targeting-moiety, wherein the CD22 targeting-moiety is as defined in claim 1;
   b. a transmembrane domain; and
   c. an intracellular signaling domain.

7. The CAR according to claim 6, wherein the transmembrane domain comprises the transmembrane domain of CD28, CD3, CD45, CD4, CD8, CD9, CD16, CD22, CD33, CD37, CD64, CD80, CD86, CD134, CD137, or CD154.

8. The CAR according to claim 7, wherein the transmembrane domain comprises the transmembrane domain of CD8.

9. The CAR according to claim 6, wherein the intracellular signaling domain comprises the intracellular domain of CD3ζ, FcRγ, CD3γ, CD3δ, CD3ε, CD5, CD22, CD79a, CD79b or CD66b.

10. The CAR according to claim 9, wherein the intracellular signaling domain comprises the intracellular domain of CD3ζ.

11. The CAR according to claim 6, wherein the CAR further comprises a costimulatory signaling domain, preferably the costimulatory signaling domain comprises the intracellular domain of CD27, CD28, CD137, CD134, CD30, CD40, lymphocyte function-associated antigen-1 (LFA-1), CD2, CD7, LIGHT, NKG2C, or CD276.

12. The CAR according to claim 11, wherein the costimulatory signaling domain comprises the intracellular domain of CD137.

13. The CAR according to claim 6, wherein the CD22 targeting moiety is a scFV, preferably, the scFV comprises a VL domain consisting of SEQ ID NO: 7 and a VH domain consisting of SEQ ID NO: 8.

14. A nucleic acid encoding the CAR according to claim 6.

15. A T-cell comprising the nucleic acid according to claim 14.

16. A method of treating a CD22-positive cancer, wherein the method comprises administering the CD22 targeting moiety of claim 1 to a patient in need thereof, and wherein the CD22-positive cancer is B-cell acute lymphoblastic leukemia (B-ALL).

17. A method of treating a CD22-positive cancer, wherein the method comprises administering the T-cell of claim 15 to a patient in need thereof, and wherein the CD22-positive cancer is B-cell acute lymphoblastic leukemia (B-ALL).

18. The method of claim 16, wherein the CD22-positive cancer, wherein the CD22-positive cancer is B-cell acute lymphoblastic leukemia (B-ALL), which is a CD19⁻ B-ALL relapse.

19. The method of claim 17, wherein the CD22-positive cancer, wherein the CD22-positive cancer is B-cell acute lymphoblastic leukemia (B-ALL), which is a CD19⁻ B-ALL relapse.

* * * * *